(12) United States Patent
Kajiyama et al.

(10) Patent No.: US 6,940,787 B2
(45) Date of Patent: Sep. 6, 2005

(54) DISK CHANGER

(75) Inventors: Yoshihiro Kajiyama, Saitama (JP); Renji Tamura, Kanagawa (JP); Shinji Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 10/238,065

(22) Filed: Sep. 10, 2002

(65) Prior Publication Data

US 2003/0048702 A1 Mar. 13, 2003

(30) Foreign Application Priority Data

Sep. 11, 2001 (JP) ........................................ 2001-275664

(51) Int. Cl.[7] .............................................. G11B 17/22
(52) U.S. Cl. .................................................. 369/30.86
(58) Field of Search ........................ 369/30.86, 98.05, 369/98.06, 178.01, 30.56

(56) References Cited

U.S. PATENT DOCUMENTS

| | | | | |
|---|---|---|---|---|
| 4,791,626 A | * | 12/1988 | Staar ........................ | 369/30.86 |
| 5,528,566 A | * | 6/1996 | McGee et al. ............ | 369/30.86 |
| 6,452,893 B1 | * | 9/2002 | Wahl ........................ | 369/178.01 |
| 6,456,572 B1 | * | 9/2002 | Sakamoto ................. | 369/30.56 |
| 6,690,627 B2 | * | 2/2004 | Fukushima et al. ....... | 369/30.86 |

FOREIGN PATENT DOCUMENTS

JP 05342740 A * 12/1993

* cited by examiner

Primary Examiner—Tianjie Chen
(74) Attorney, Agent, or Firm—Oblon, Spivak, McClelland, Maier & Neustadt, P.C.

(57) ABSTRACT

The invention provides a disk changer which is improved in convenience in use and functionality. The disk changer includes a rotatable tray having a plurality of annularly arranged accommodation portions, a tray rotating mechanism, first and second recording and/or reproduction sections each for recording and/or reproducing an information signal onto and/or from one of the disk-type recording media, and first and second disk takeout mechanisms each for taking out a disk-type recording medium accommodated in an accommodation portion of the rotatable tray and transporting the disk-type recording medium to the corresponding recording and/or reproduction section and for taking out the disk-type recording medium from the corresponding recording and/or reproduction section and transporting the disk-type recording medium to an accommodation portion of the rotatable tray. Any of the disk-type recording media transported to the recording and/or reproduction sections by the disk takeout mechanisms is disposed at a position retracted from a locus of movement of the disk-type recording media accommodated in the accommodation portions when the rotatable tray rotates.

13 Claims, 56 Drawing Sheets

F I G. 1
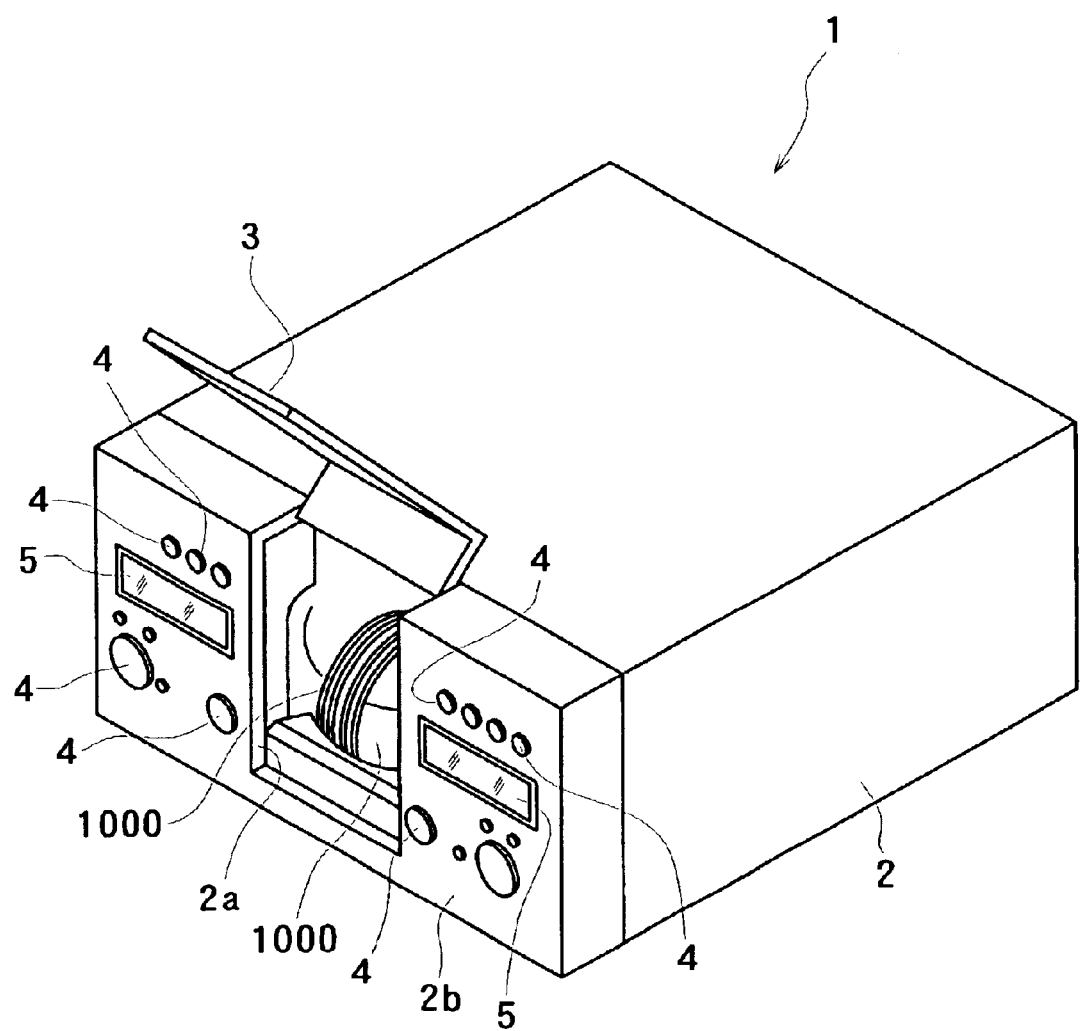

F I G. 4
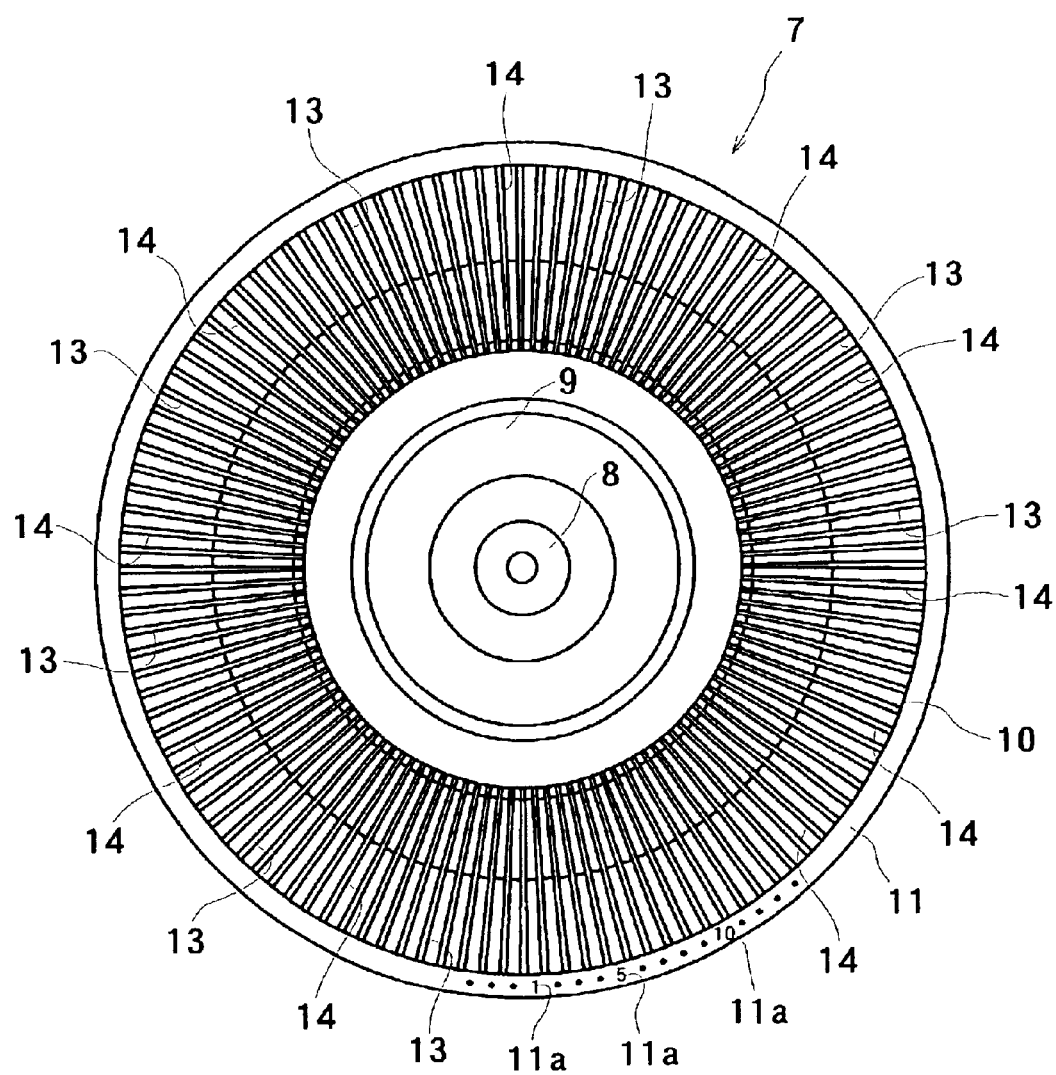

F I G. 7
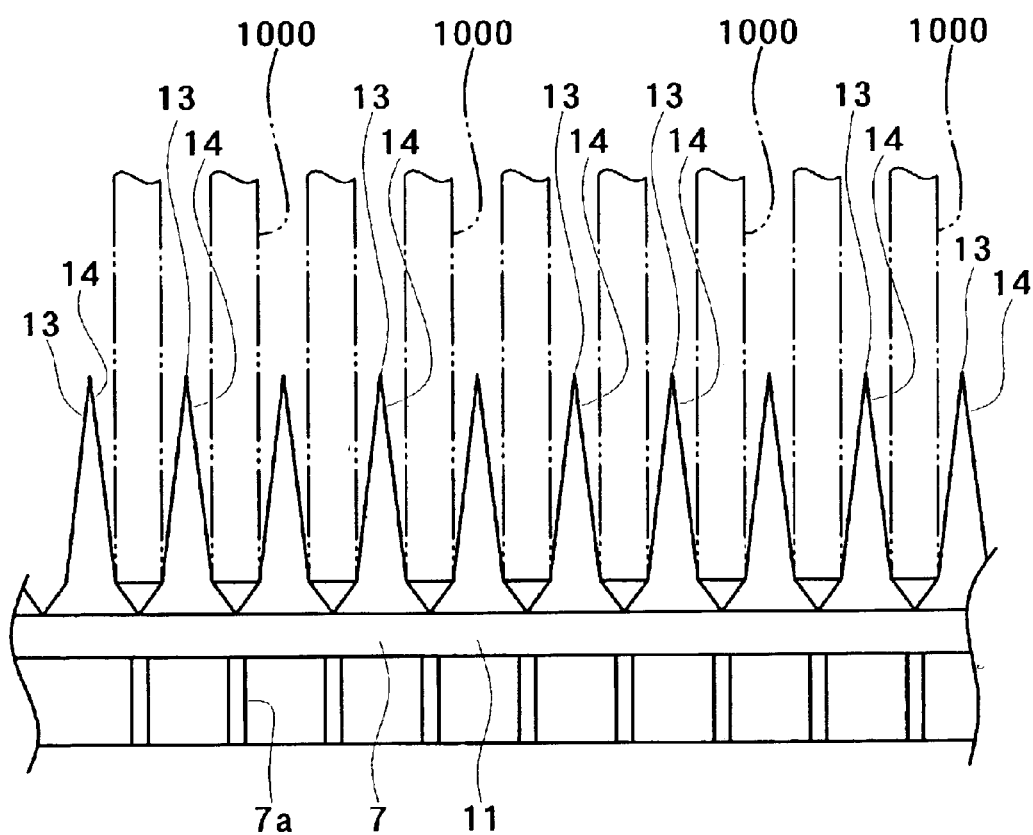

F I G. 19
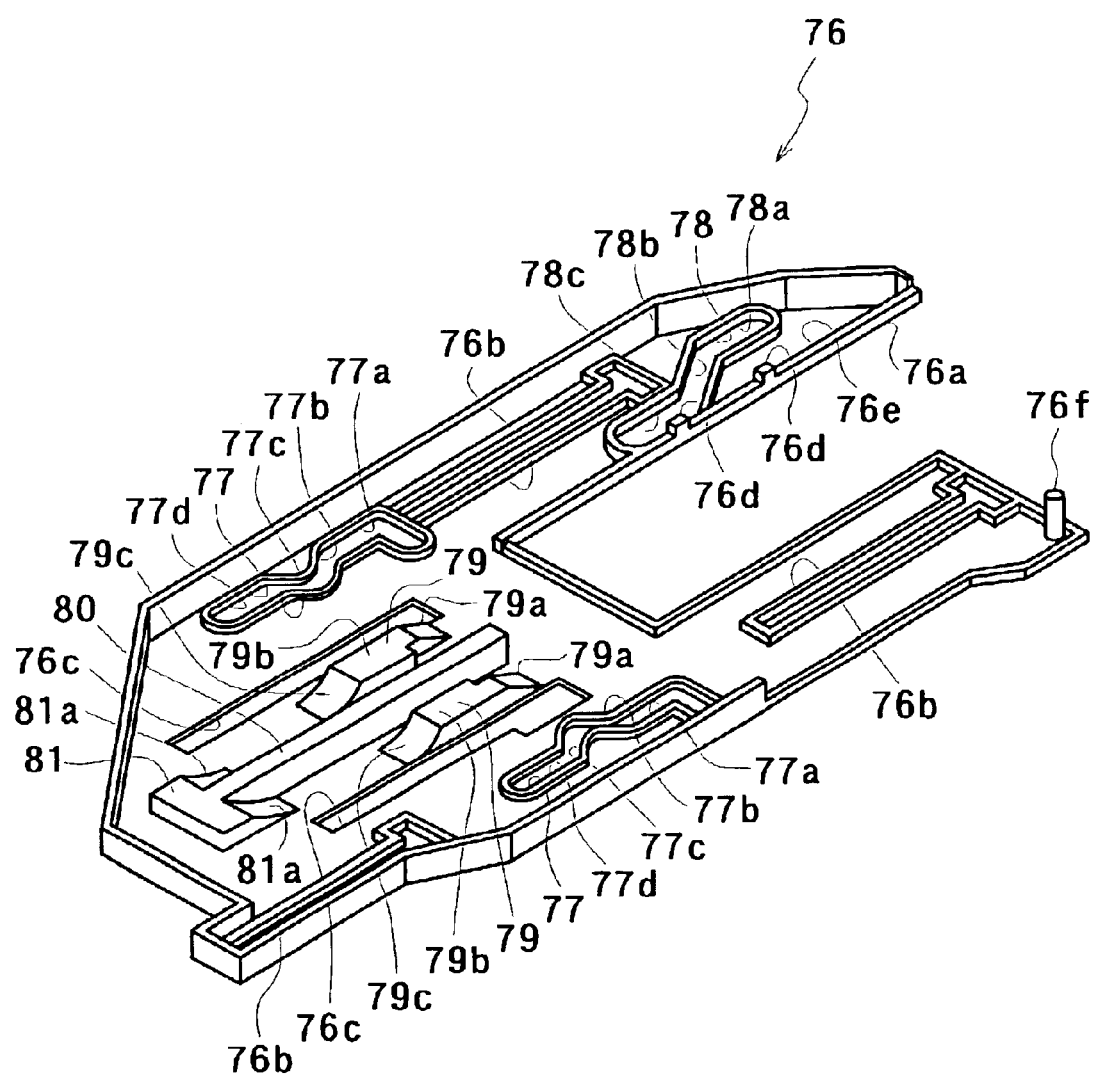

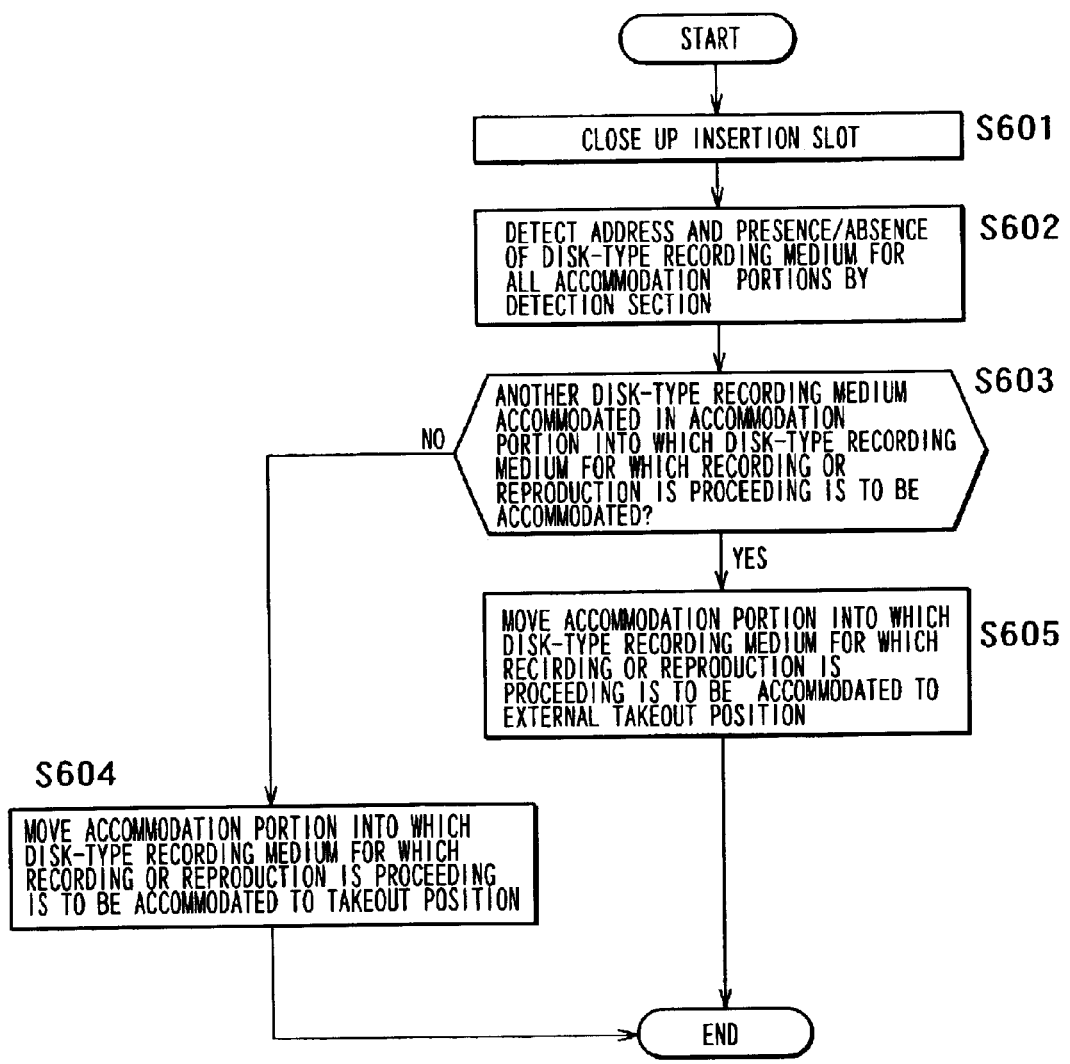

DISK CHANGER

BACKGROUND OF THE INVENTION

This invention relates to a disk changer, and more particularly to a disk changer which includes a rotatable tray having a plurality of accommodation portions arranged in a ring-like configuration. A disk-type recording medium is suitably selected from among disk-type recording media accommodated in the accommodation portions so as to perform recording and/or reproduction and so forth for the selected disk-type recording medium.

A disk changer is conventionally available which includes a rotatable tray having a plurality of accommodation portions arranged in a ring-like configuration for accommodating a plurality of disk-type recording media therein such that major faces of the disk-type recording media oppose each other. The rotatable tray is rotated and a desired one of the disk-type recording media is taken out by a disk takeout mechanism so that recording or reproduction of an information signal onto or from the disk-type recording medium may be performed.

Such a conventional disk changer as described above includes only one recording and reproduction section having an optical pickup, to which a disk-type recording medium taken out from one of the accommodation portions of the rotatable tray is transported by the disk takeout mechanism so that an information signal is recorded onto or reproduced from the disk-type recording medium by the recording and reproduction section.

Accordingly, in the conventional disk changer, since it includes only one recording and reproduction section, in order to record or reproduce different disk-type recording media successively, it is necessary to first take out the disk-type recording medium, whose recording or reproduction has come to an end, from the recording and reproduction section once by means of the disk takeout mechanism and accommodate the disk-type recording medium into an accommodation portion of the rotatable tray, and rotate the rotatable tray until the accommodation portion in which the disk-type recording medium to be recorded or reproduced next is accommodated comes to the disk takeout position and take out the disk-type recording medium from the accommodation portion by means of the disk takeout mechanism, and then transport the disk-type recording medium to the recording and reproduction section by means of the disk takeout mechanism to perform recording or reproduction for the disk-type recording medium.

However, when it is intended to perform recording or reproduction for different disk-type recording media successively as described above, two times of transporting operation of the disk takeout mechanism and a rotating operation of the rotatable tray are required before recording or reproduction of the later one of the disk-type recording media is started. Therefore, the conventional disk changer cannot record or reproduce different disk-type recording media incessantly and continuously and is disadvantageous in that it is inferior in convenience in use.

Further, the conventional disk changer does not have a dubbing function of recording an information signal recorded on a disk-type recording medium onto another disk-type recording medium and therefore is disadvantageous also in that it is inferior in functionality.

Furthermore, in the conventional disk changer, a disk-type recording medium transported to and being recorded or reproduced by the recording and reproduction section rotates in such a state that part thereof overlaps with some of the disk-type recording media accommodated in the accommodation portions of the rotatable tray. Therefore, the conventional disk changer is disadvantageous in that, during recording or reproduction of a disk-type recording medium, the rotatable tray cannot be rotated and a new disk-type recording medium cannot be accommodated into a desired one of the accommodation portions of the rotatable tray either, and besides a disk-type recording medium cannot be replaced into the rotatable tray readily.

Further, the conventional disk changer includes a detection section for detecting whether or not a disk-type recording medium is accommodated in each of the accommodation portions of the rotatable tray and the address of each of the accommodation portions to which addresses beginning with the first address and ending with the nth address are applied.

In the disk changer, after a disk-type recording medium to be recorded or reproduced is inserted through a disk insertion opening and accommodated into one of the accommodation portions of the rotatable tray, the rotatable tray is rotated. Then, detection of presence or absence of a disk-type recording medium in each of the accommodation portions and detection of the address of each accommodation portion are performed successively in order by the detection section disposed below the rotatable tray. After the address of the accommodation portion into which the disk-type recording medium inserted through the disk insertion opening has been accommodated is detected by the detection section, the rotatable tray is rotated in a direction based on a result of the detection until the accommodation portion having the detected address comes to a disk takeout position at which the disk-type recording medium can be taken out from the accommodation portion by the disk takeout mechanism. Then, the disk-type recording medium is taken out from the accommodation portion by the disk takeout mechanism and transported to the recording and reproduction section, by which recording or reproduction of an information signal onto or from the disk-type recording medium is performed.

However, if it is tried to provide a plurality of recording and reproduction sections and a plurality of disk takeout mechanisms in such a conventional disk changer as described above in order to augment the functionality and so forth, depending upon the position of the detection section with respect to the rotatable tray, the distances from the recording and reproduction sections to the detection section may be different from each other. If the distances are different in this manner, then the accessing time before recording or reproduction of a disk-type recording medium is started after detection of the same may exhibit a significant difference between the recording and reproduction sections, and in some cases, the convenience in use of the disk changer is deteriorated.

SUMMARY OF THE INVENTION

It is an object of the present invention to provide a disk changer which is improved in convenience in use and functionality.

In order to attain the object described above, according to an aspect of the present invention, there is provided a disk changer, comprising a rotatable tray supported for rotation on a chassis and having a plurality of accommodation portions arranged in a ring-type configuration for accommodating a plurality of disk-type recording media therein such that major faces of the disk-type recording media oppose each other, a tray rotating mechanism for rotating the rotatable tray, a first recording and/or reproduction section for recording and/or reproducing an information signal onto and/or from one of the disk-type recording media, a second recording and/or reproduction section for recording and/or reproducing an information signal onto and/or from one of the disk-type recording media, a first disk takeout mechanism for taking out one of the disk-type recording media accommodated in the accommodation portions of the rotatable tray and transporting the disk-type recording medium to the first recording and/or reproduction section and for taking out the disk-type recording medium from the first recording and/or reproduction section and transporting the disk-type recording medium to one of the accommodation portions, and a second disk takeout mechanism for taking out one of the disk-type recording media accommodated in the accommodation portions of the rotatable tray and transporting the disk-type recording medium to the second recording and/or reproduction section and for taking out the disk-type recording medium from the second recording and/or reproduction section and transporting the disk-type recording medium to one of the accommodation portions. Any of the disk-type recording media transported to the first and second recording and/or reproduction sections by the first and second disk takeout mechanisms are disposed at a position retracted from a locus of movement of the disk-type recording media accommodated in the accommodation portions when the rotatable tray rotates.

In the disk changer, while an information signal is recorded or reproduced by one of the first and second recording and reproduction sections, the rotatable tray can be rotated. Consequently, also during recording or reproduction of a disk-type recording medium, it is possible to accommodate a new disk-type recording medium into a desired one of the accommodation portions of the rotatable tray and replace a disk-type recording medium into another accommodation portion of the rotatable tray readily.

Preferably, the disk changer further comprises control means for controlling, while the first recording and/or reproduction section records and/or produces a first one of the disk-type recording media, the tray rotating mechanism to rotate the rotatable tray until one of the accommodation portions in which a second one of the disk-type recording media designated by a user is accommodated comes to a position at which the accommodation portion opposes the second disk takeout mechanism and controlling the second disk takeout mechanism to transport the second disk-type recording medium to the second recording and/or reproduction section and then controlling the second recording and/or reproduction section to start recording and/or reproduction of the second disk-type recording medium after the recording and/or the reproduction of the first disk-type recording medium by the first recording and/or reproduction section come to an end.

In the disk changer, while an information signal is recorded or reproduced by one of the first and second recording and reproduction sections, the rotatable tray can be rotated. Further, recording and/or reproduction of the second disk-type recording medium is started immediately after recording and/or reproduction of the first disk-type recording medium by the first recording and/or reproduction section come to an end. Consequently, different disk-type recording media can be recorded or reproduced continuously and incessantly, and the disk changer can be used in improved convenience in use.

The control means may control the first recording and/or reproduction section to reproduce an information signal recorded on the first disk-type recording medium and control the second recording and/or reproduction section to record the information signal reproduced by the first recording and/or reproduction section onto the second disk-type recording medium.

In the disk changer, an information signal recorded on a disk-type recording medium and reproduced by one of the recording and/or reproduction sections can be recorded, that is, dubbed, onto another disk-type recording medium to be recorded by the other recording and/or reproduction section.

Preferably, the disk changer further comprises a lock lever provided in the first and second disk takeout mechanisms for locking the rotatable tray from rotation while any of the disk-type recording media is transported from one of the accommodation portions to the first or second recording and/or reproduction section by the first or second disk takeout mechanism and unlocking the rotatable tray when the disk-type recording medium is transported to the first or second recording and/or reproduction section.

In the disk changer, takeout of a disk-type recording medium from the rotatable tray or any of the first and second recording and/or reproduction sections by the corresponding disk takeout mechanism and accommodation of a disk-type recording medium into one of the accommodation portions of the rotatable tray can be performed without any trouble. Further, while recording or reproduction of an information signal onto or from a disk-type recording medium is proceeding, accommodation, takeout or replacement of another disk-type recording medium into, from or into one of accommodation portions can be performed. Consequently, the disk changer can be used in improved convenience in use.

Preferably, the disk changer may further comprise address detection section for detecting an address of each of the accommodation portions of the rotatable tray, and disk detection section for detecting whether or not one of the disk-type recording media is present in each of the accommodation portions corresponding to the addresses.

In the disk changer, the accommodation position of each disk-type recording medium and presence or absence of a disk-type recording medium in any accommodation portion of the rotatable tray can be detected with certainty. Consequently, the disk changer can be used in augmented reliability in operation.

Where the first and second recording and/or reproduction sections are disposed in a spaced relationship from each other in a circumferential direction of the rotatable tray, preferably the address detection section and the disk detection section are disposed in an opposing relationship to one of the accommodation portions which is positioned in a substantially equally spaced relationship from the first and second recording and/or reproduction sections along the circumferential direction of the rotatable tray.

In the disk changer, since the distances from the first and second recording and reproduction sections to the address and disk detection section are equal to each other, inconvenience in use of the disk changer which may originate otherwise from some difference between the distances is eliminated.

According to another aspect of the present invention, there is provided a disk changer, comprising a rotatable tray supported for rotation on a chassis and having a plurality of accommodation portions arranged in a ring-like configuration for accommodating a plurality of disk-type recording media therein such that major faces of the disk-type recording media oppose each other, detection section for detecting whether or not one of the disk-type recording media is present in each of the accommodation portions of the rotatable tray and detecting an address of each of the accommodation portions, a tray rotating mechanism for rotating the rotatable tray, a plurality of recording and/or reproduction sections each for recording and/or reproducing an information signal onto and/or from one of the disk-type recording media, and a plurality of disk takeout mechanisms each for taking out one of the disk-type recording media accommodated in the accommodation portions of the rotatable tray and transporting the disk-type recording medium to one of the recording and/or reproduction sections and for taking out the disk-type recording medium from the recording and/or reproduction section and transporting the disk-type recording medium to one of the accommodation portions. The detection section is disposed at a substantially middle position between those two ones of the recording and/or reproduction sections which are disposed in a spaced relationship by the greatest distance from each other.

In the disk changer, when the address of an accommodation portion is detected and presence or absence of a disk-type recording medium in the accommodation portion are detected by the detection section, the access time after such detection to recording or reproduction for the disk-type recording medium does not become unnecessarily long with regard to a particular one of the recording and/or reproduction sections. Consequently, the disk changer can be used in improved convenience in use.

Preferably the disk changer further comprise control means for controlling the tray rotating mechanism to rotate the rotatable tray until one of the accommodation portions in which one of the disk-type recording media designated by a user is accommodated comes to a position at which the accommodation portion opposes the detection section, controlling, when the detection section detects that the disk-type recording medium is accommodated in the accommodation portion, the tray rotating mechanism to rotate the rotatable tray until the accommodation portion comes to a position at which the accommodation portion opposes one of the recording and/or reproduction sections, and controlling one of the disk takeout mechanisms to transport the disk-type recording medium accommodated in the accommodation portion to one of the recording and/or reproduction sections and controlling the recording and/or reproduction section to start recording and/or reproduction of the disk-type recording medium.

The recording and/or reproduction sections may include first and second recording and/or reproduction sections while the disk takeout mechanisms include first and second disk takeout mechanisms, and the disk changer may further comprise control means for controlling, while the first recording and/or reproduction section records and/or produces a first one of the disk-type recording media, the tray rotating mechanism to rotate the rotatable tray until one of the accommodation portions in which a second one of the disk-type recording media designated by a user is accommodated comes to a position at which the accommodation portion opposes the second disk takeout mechanism and controlling the second disk takeout mechanism to transport the second disk-type recording medium to the second recording and/or reproduction section and then controlling the second recording and/or reproduction section to start recording and/or reproduction of the second disk-type recording medium immediately after the recording and/or the reproduction of the first disk-type recording medium by the first recording and/or reproduction section come to an end.

In the disk changer, while an information signal is recorded or reproduced by one of the first and second recording and reproduction sections, the rotatable tray can be rotated. Further, recording and/or reproduction of the second disk-type recording medium is started immediately after recording and/or reproduction of the first disk-type recording medium by the first recording and/or reproduction section come to an end. Consequently, different disk-type recording media can be recorded or reproduced continuously and incessantly, and the disk changer can be used in improved convenience in use.

The control means may control the first recording and/or reproduction section to reproduce an information signal recorded on the first disk-type recording medium and control the second recording and/or reproduction section to record the information signal reproduced by the first recording and/or reproduction section onto the second disk-type recording medium.

In the disk changer, an information signal recorded on a disk-type recording medium and reproduced by one of the recording and/or reproduction sections can be recorded, that is, dubbed, onto another disk-type recording medium to be recorded by the other recording and/or reproduction section.

Preferably, the disk changer further comprise a lock lever provided in the disk takeout mechanisms for locking the rotatable tray from rotation while any of the disk-type recording media is transported from one of the accommodation portions to any of the recording and/or reproduction sections by any of the disk takeout mechanisms and unlocking the rotatable tray when the disk-type recording medium is transported to the recording and/or reproduction section.

In the disk changer, takeout of a disk-type recording medium from the rotatable tray or any of the first and second recording and/or reproduction sections by the corresponding disk takeout mechanism and accommodation of a disk-type recording medium into one of the accommodation portions of the rotatable tray can be performed without any trouble. Further, while recording or reproduction of an information signal onto or from a disk-type recording medium is proceeding, accommodation, takeout or replacement of another disk-type recording medium into, from or into one of accommodation portions can be performed. Consequently, the disk changer can be used in improved convenience in use.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a perspective view of a disk changer to which the present invention is applied;

FIG. 4 is a plan view of a rotatable tray of the disk changer;

FIG. 7 is an enlarged side elevational view of the rotatable tray wherein disk-type recording media are accommodated in accommodation portions;

FIG. 19 is an enlarged perspective view of a slider of the mechanism unit;

FIG. 56 is a flow chart illustrating another procedure of operation of the disk changer when it prevents an overlapping error.

DESCRIPTION OF THE PREFERRED EMBODIMENTS

Figure 2:
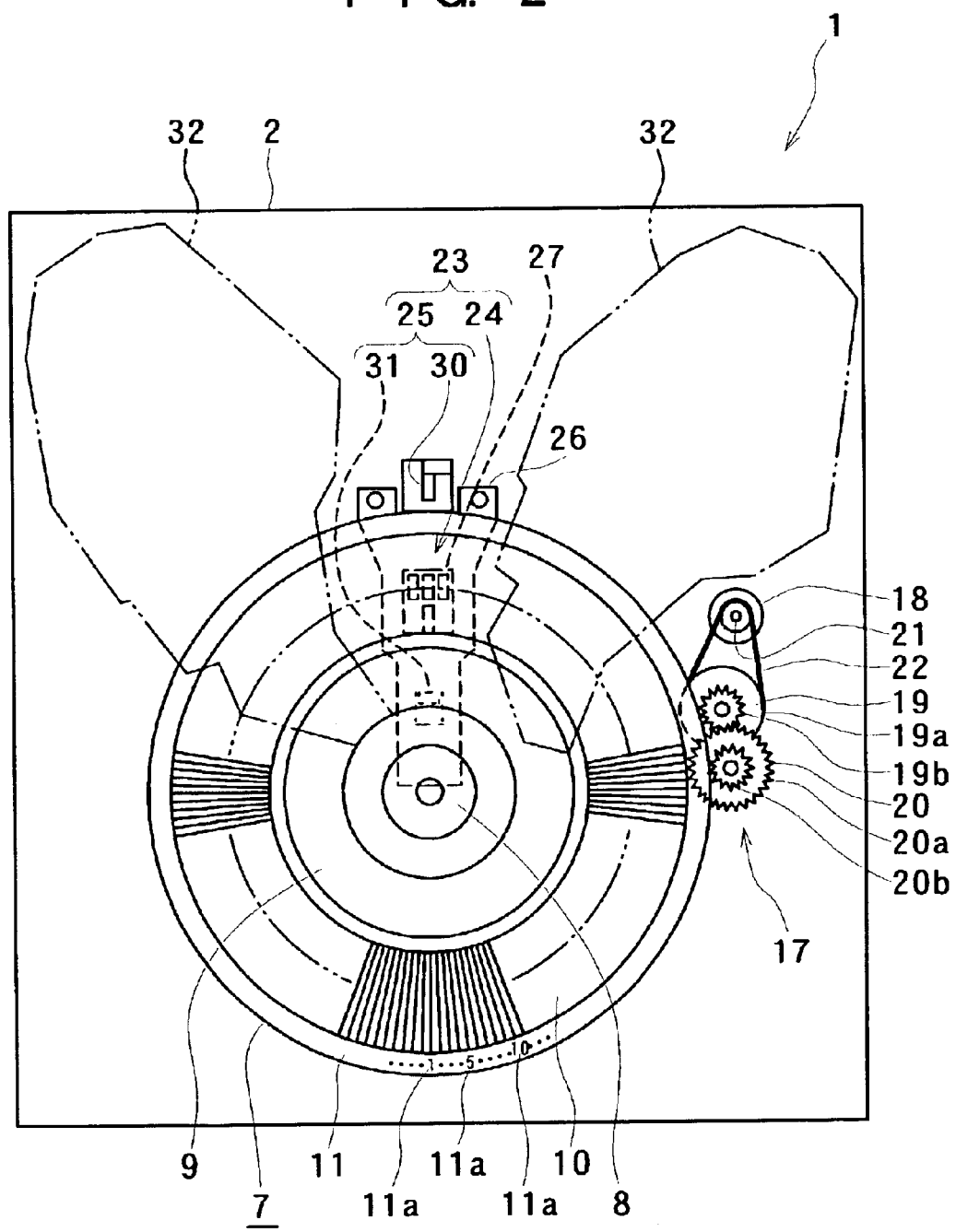
FIG. 2 is a schematic plan view of the disk changer.

Referring first to FIG. 1, there is shown a disk changer to which the present invention is applied. The disk changer 1 shown constitutes by various members and mechanisms disposed in the outer housing 2 having a box-like configuration.

A door 3 is supported for pivotal motion on the outer housing 2 such that a disk insertion opening 2a formed on the front end side of the outer housing 2 is opened or closed by pivotal motion of the door 3 as seen in FIG. 1. When the disk insertion opening 2a is open, a disk-type recording medium 1000 can be inserted into the inside of the outer housing 2 and conversely taken out from the inside of the outer housing 2 through the disk insertion opening 2a.

A plurality of operation keys 4 for executing various functions provided for the disk changer 1 are disposed on a front wall 2b of the outer housing 2. The operation keys 4 may include, for example, a power supply key for switching on or off a power supply, first and second reproduction keys for reproducing an information signal from a disk-type recording medium 1000, first and second recording keys for recording an information signal onto a disk-type recording medium 1000, a pause key for temporarily stopping reproduction or recording, a stop key for stopping reproduction or recording, a track jump key for performing track jumping during reproduction, a rotating key for rotating a rotatable tray, which is hereinafter described, a registration key for registering an accommodation position (address) of a disk-type recording medium 1000 accommodated in the outer housing 2, a plurality of inputting keys for inputting a registered accommodation position of the disk-type recording medium 1000 or a designated address, a reproduction reservation key for reserving a disk-type recording medium 1000 or disk-type recording media 1000 to be successively reproduced subsequently, a recording reservation key for reserving a disk-type recording medium 1000 or disk-type recording media 1000 to be successively recorded subsequently, a dubbing key for recording information recorded on a disk-type recording medium 1000 onto another disk-type recording medium 1000, a mode selection key for selecting one of predetermined modes, a plurality of sort keys for sorting disk-type recording media 1000 accommodated in the outer housing 2 in accordance with predetermined sorting rules, a search key for searching for the position of a disk-type recording medium 1000 accommodated in the rotatable tray, and a storage key for storing TOC (Table Of Contents) of a disk-type recording medium 1000.

A pair of display sections 5 each formed from a liquid crystal display unit are disposed in a leftwardly and rightwardly spaced relationship from each other on the front wall 2b of the outer housing 2. Various kinds of information such as information of a disk-type recording medium 1000 being currently reproduced, information of another disk-type recording medium 1000 to be reproduced next and information regarding disk-type recording media 1000 accommodated in the rotatable tray are displayed on the display sections 5.

Figure 3:
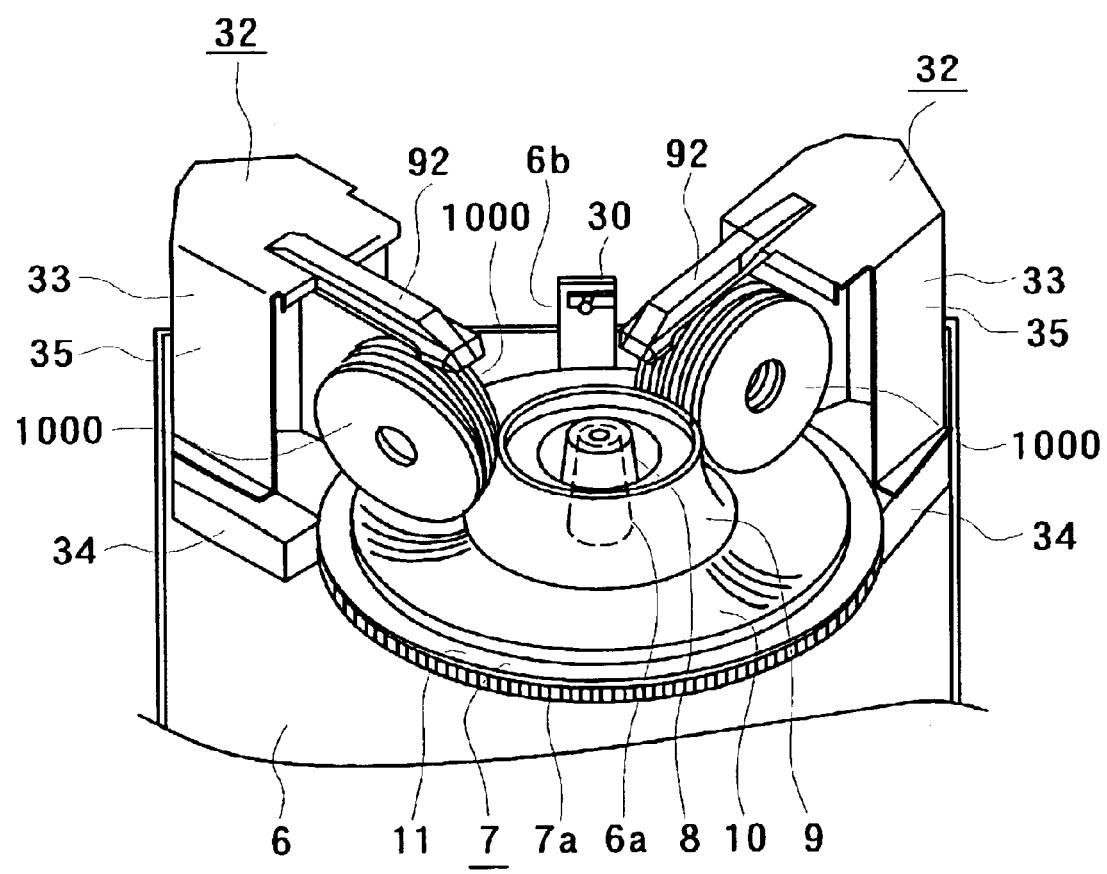
FIG. 3 is a schematic perspective view of an internal structure of the disk changer.

Referring now to FIGS. 2 and 3, a chassis 6 is disposed in the inside of the outer housing 2, and a rotatable tray 7 is supported for rotation on the chassis 6. More particularly, the rotatable tray 7 is supported on a support shaft 6a provided at and projecting upwardly from a substantially central portion of the chassis 6 and has a bearing portion 8, a connection portion 9, a holding portion 10 and an outer peripheral portion 11 formed integrally in order from the inner circumference side thereof as seen in FIGS. 2 to 6.

Figure 5:
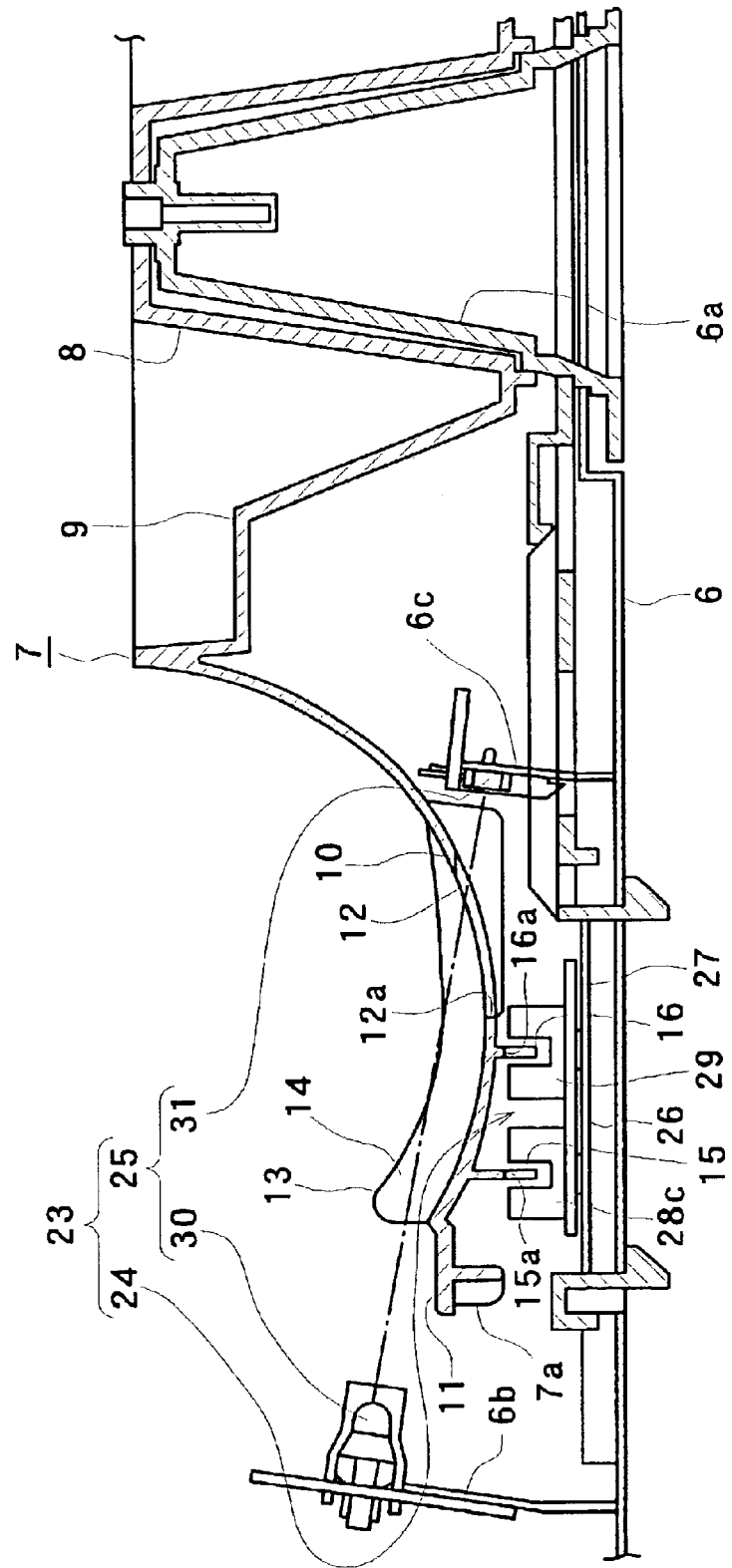
FIG. 5 is a side elevational sectional view showing a positional relationship of the rotatable tray and a detection section of the disk changer.

The holding portion 10 includes an arcuate face portion 12 having a curvature substantially equal to that of an outer circumference of the disk-type recording medium 1000 as viewed in a shape of a vertical cross section, and a plurality of partition walls 13 provided in an equally spaced relationship from each other in a circumferential direction at a substantially half portion of the front side of the arcuate face portion 12 (refer to FIGS. 4, 5 and 7). Spaces defined by adjacent ones of the partition walls 13 of the holding portion 10 are formed as accommodation portions 14 in which disk-type recording media 1000 are to be accommodated. Transmission holes 12a are formed in the arcuate face portion 12 of the holding portion 10 between the partition walls 13 (refer to FIG. 8).

The disk-type recording media 1000 are accommodated in the accommodation portions 14 such that outer circumferences thereof are fitted in the accommodation portions 14. When the disk-type recording media 1000 are accommodated in the accommodation portions 14, the transmission holes 12a are masked by the disk-type recording media 1000.

The outer peripheral portion 11 is provided continuously to the front end of the arcuate face portion 12 of the holding portion 10 and formed as an annular ring, which extends radially outwardly from the holding portion 10 (refer to FIGS. 2 to 8). Address indications 11a representing addresses from the first to nth addresses, from example, from the first to 400th addresses, are applied to the accommodation portions 14 on the upper face of the outer peripheral portion 11 (refer to FIGS. 2 to 4).

A gear portion 7a is formed along an overall circumference on a lower face of the outer peripheral portion 11 of the rotatable tray 7 (refer to FIGS. 5 to 8).

Figure 6:
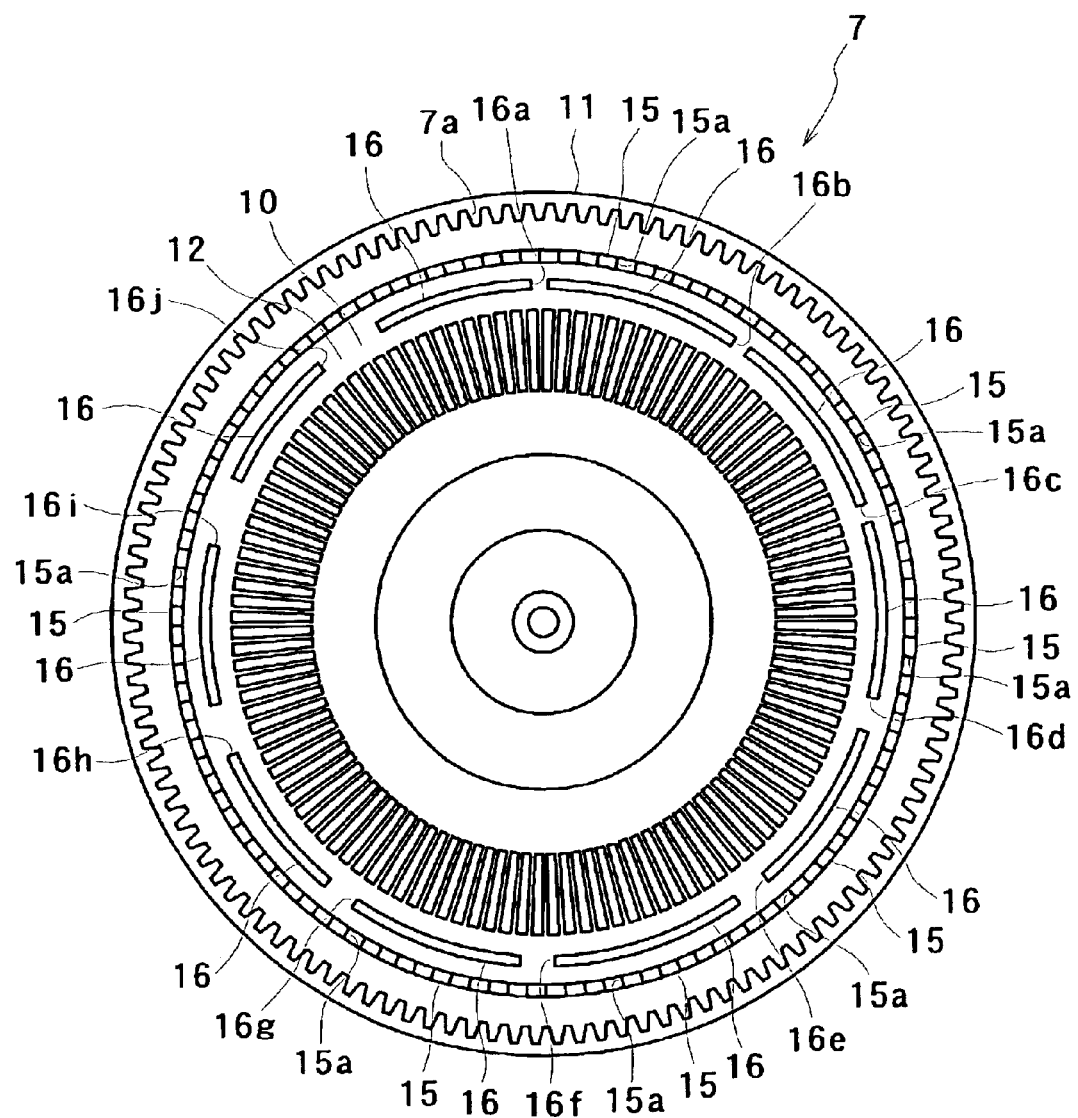
FIG. 6 is a bottom plan view of the rotatable tray.
Figure 8:
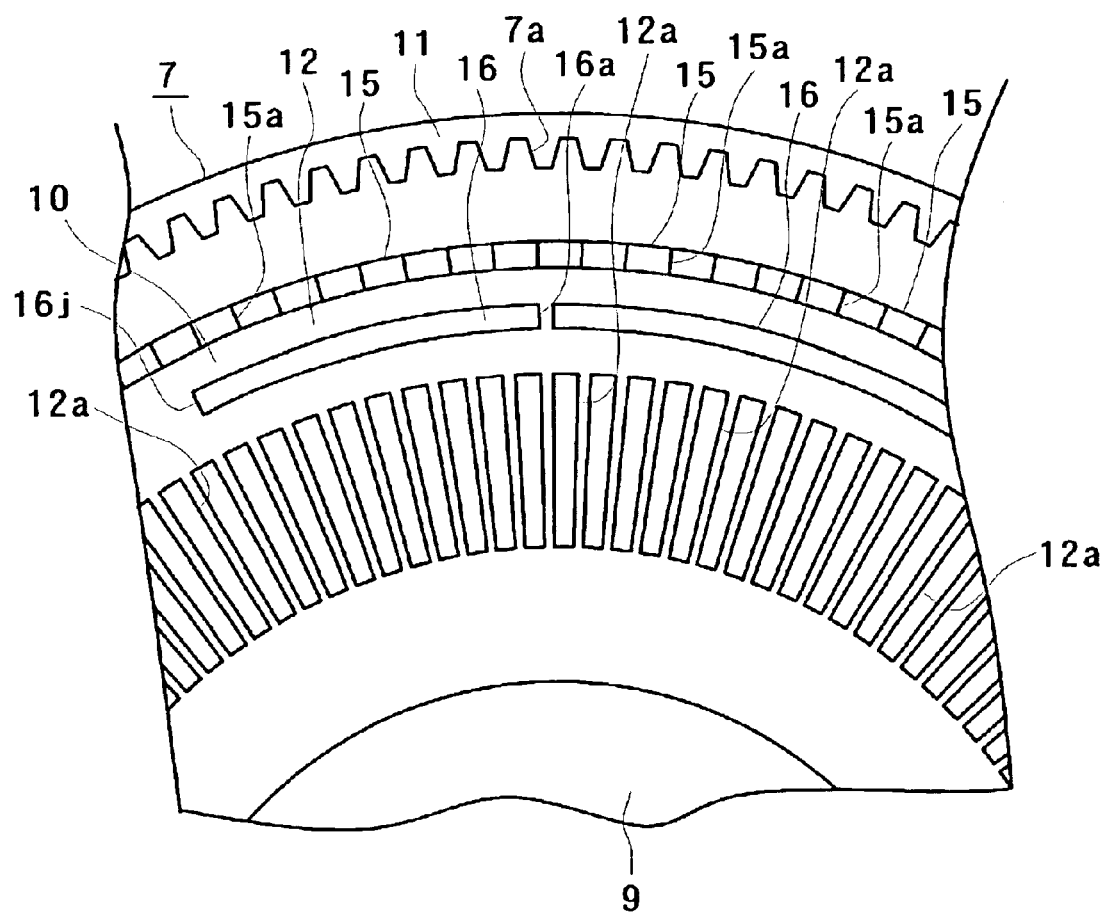
FIG. 8 is an enlarged bottom plan view showing part of the rotatable tray.

The rotatable tray 7 has first detecting projections 15 provided on the inner side of the gear portion 7a thereof such that they are juxtaposed in a circumferential direction around the center of rotation of the rotatable tray 7 and project downwardly (refer to FIGS. 5, 6 and 8). The first detecting projections 15 are provided in an equally spaced relationship from each other such that first detecting slits 15a are defined therebetween.

Second detecting projections 16 are provided on the rotatable tray 7 on the inner side of the first detecting projections 15 such that they extend in a circumferential direction around the center of rotation of the rotatable tray 7 and project downwardly (refer to FIGS. 5, 6 and 8). Second detecting slits 16a, 16b, . . . , 16j are formed in order between the second detecting projections 16 (refer to FIG. 6). The second detecting slits 16a, 16b, . . . , 16j are formed such that they have a distance increasing in this order such that the second detecting slit 16a has the smallest distance while the second detecting slit 16j has the greatest distance.

A tray rotating mechanism 17 is provided at a right end portion of the chassis 6 (refer to FIG. 2). The tray rotating mechanism 17 includes a rotating motor 18, a pulley gear 19, and a driving gear 20 in the form of a two-stage gear. A pulley 21 is secured to a motor shaft of the rotating motor 18.

A belt 22 extends between and around the pulley 21 and a pulley portion 19a of the pulley gear 19. The driving gear 20 is held in meshing engagement at a larger gear portion 20a thereof with a gear portion 19b of the pulley gear 19 and at a smaller gear portion 20b thereof with the gear portion 7a of the rotatable tray 7.

When the rotating motor 18 rotates, the driving force is transmitted to the pulley 21, belt 22, pulley gear 19 and driving gear 20 in order, and the gear portion 7a held in meshing engagement with the smaller gear portion 20b of the driving gear 20 is fed in a direction corresponding to the direction of rotation of the rotating motor 18 to rotate the rotatable tray 7.

A detection section 23 is disposed at a substantially central position in the leftward and rightward direction of the chassis 6. The detection section 23 includes an address detection section 24 and a disk detection section 25 (refer to FIGS. 2, 5 and 9).

The address detection section 24 includes four photo-sensors 28A, 28B, 28C and 29 disposed on a circuit board 27 provided on a base 26. The photo-sensors 28A, 28B and 28C are fine address detecting photo-sensors, which detect the first detecting slits 15a of the rotatable tray 7. The photo-sensor 29 is a rough address detecting photo-sensor, which detects the second detecting slits 16a, 16b, . . . , 16j of the rotatable tray 7.

When the rotatable tray 7 is rotated, the first detecting projections 15 pass the slits of the photo-sensors 28A, 28B and 28C. Thereupon the second detecting projections 16 pass the slit of the photo-sensor 29. As a result, predetermined waveforms are obtained (refer to FIG. 10).

Figure 10:
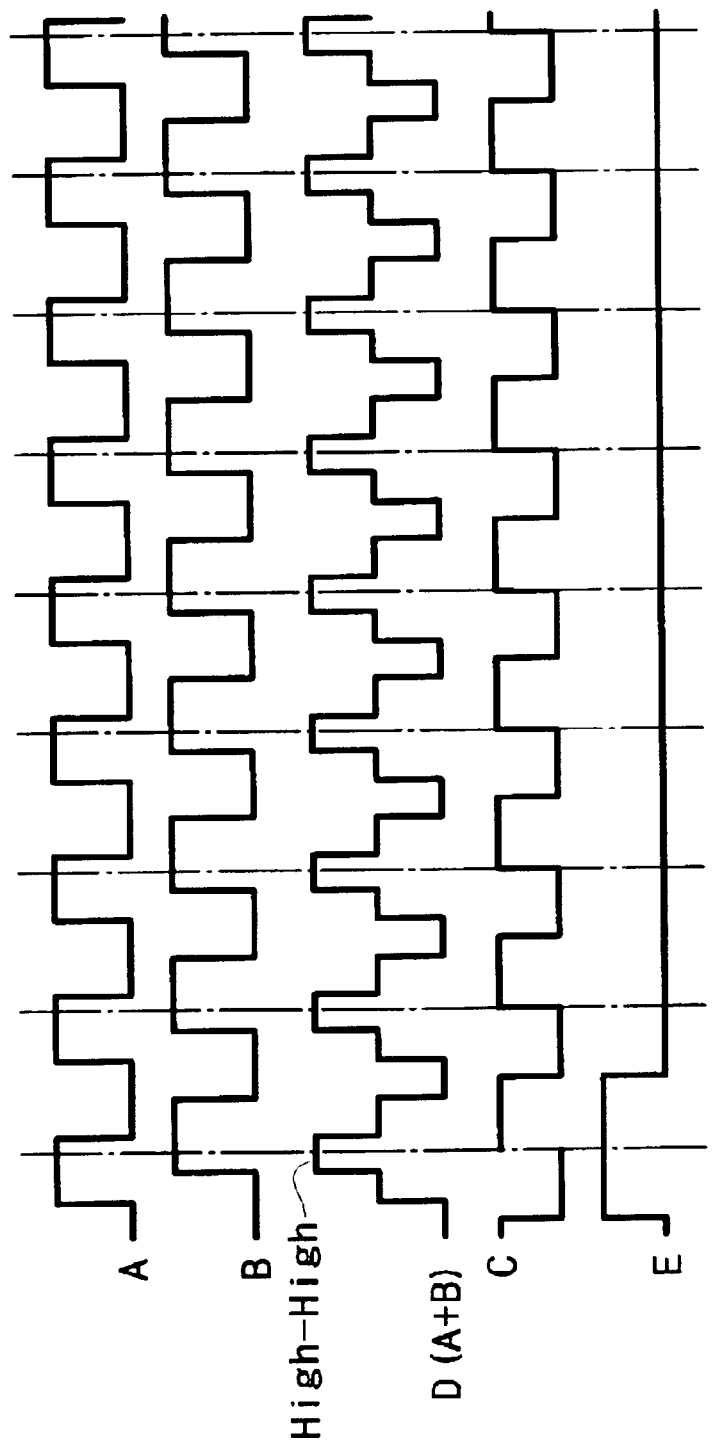
FIG. 10 is a waveform diagram illustrating signals of the detection section.

The waveform detected by the photo-sensor 28A is represented by A in FIG. 10; the waveform detected by the photo-sensor 28B is represented by B in FIG. 120; and the waveform detected by the photo-sensor 28C is represented by C in FIG. 10. When each of the first detecting slits 15a passes any of the slits of the photo-sensors 28A, 28B and 28C, the output waveform of the photo-sensor exhibits the "High" level, and when each of the first detecting projections 15 passes any of the slits of the photo-sensors 28A, 28B and 28C, the output waveform of the photo-sensor exhibits the "Low" level. A waveform obtained by synthesis of the waveform A and the waveform B is represented by D in FIG. 10. Within the range of the "High-High" level of the waveform D, the rotatable tray 7 is stopped.

The waveform detected by the photo-sensor 29 is represented by E in FIG. 10. The output waveform of the photo-sensor 29 exhibits the "High" level when each of the second detecting slits 16a, 16b, . . . , 16j passes the slit of the photo-sensor 29. The output waveform of the photo-sensor 29 exhibits the "Low" level, when each of the second detecting projections 16 passes the slit of the photo-sensor 29. If the "High-High" level of the waveform D is detected only once within a region of the "High" level of the waveform E, then it is detected that the rough address ranges, for example, from the first to 40th addresses; if the "High-High" level of the waveform D is detected twice within a region of the "High" level of the waveform E, then it is detected that the rough address ranges from the 41st to 80th addresses; and if the "High-High" level of the waveform D is detected ten times within a region of the "High" level of the waveform E, then it is detected that the rough address ranges from the 361st to 400th addresses.

A rough address is detected by the photo-sensor 29, a fine address in each rough address is detected by the photo-sensors 28A, 28B and 28C, and the address of each of the accommodation portions 14 formed on the rotatable tray 7 is thereby detected.

Figure 9:
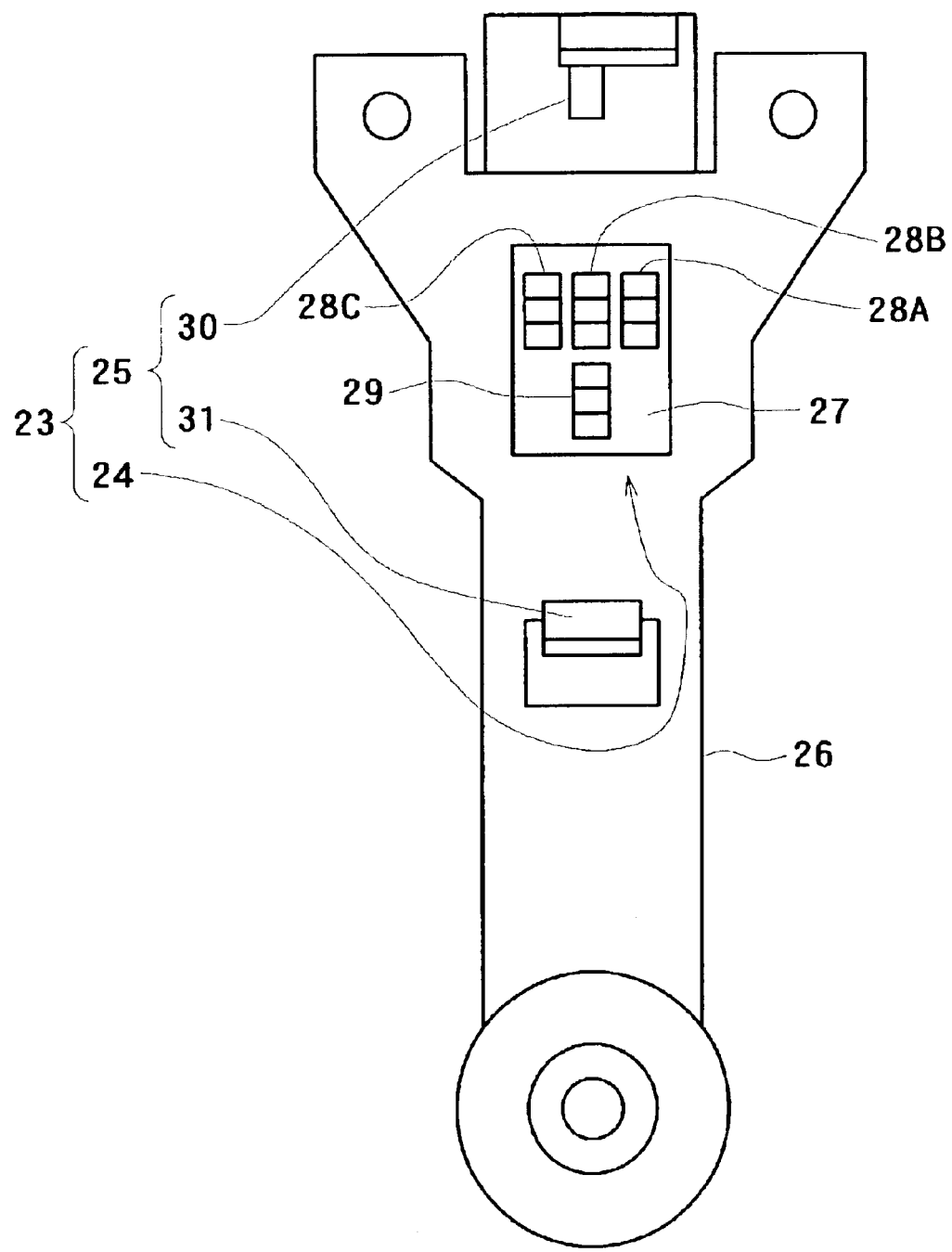
FIG. 9 is an enlarged plan view of the detection section.

The disk detection section 25 is formed from a photo-sensor composed of a light emitting element 30 and a light receiving element 31 (refer to FIGS. 5 and 9).

The light emitting element 30 is attached to an upper end portion of a first mounting projection 6b, which is provided on the rear side of the address detection section 24 and projects upwardly from the chassis 6, and is positioned on the outer side of the rotatable tray 7. The light receiving element 31 is attached to an upper end portion of a second mounting projection 6c, which is provided on the front side of the address detection section 24 and projects upwardly from the chassis 6, and is positioned on the lower side of the holding portion 10 of the rotatable tray 7.

When detection light is emitted from the light emitting element 30 toward the light receiving element 31, if no disk-type recording medium 1000 is accommodated in the corresponding accommodation portion 14 of the rotatable tray 7, then the detection light passes through the transmission hole 12a formed in the arcuate face portion 12 of the rotatable tray 7 and is received by the light receiving element 31. Consequently, it is detected that no disk-type recording medium 1000 is accommodated in the accommodation portion 14. On the other hand, when detection light is emitted from the light emitting element 30 toward the light receiving element 31, if a disk-type recording medium 1000 is accommodated in the corresponding accommodation portion 14 of the rotatable tray 7, then the detection light is intercepted by the disk-type recording medium 1000 accommodated in the accommodation portion 14 and is not received by the light receiving element 31. Consequently, it is detected that a disk-type recording medium 1000 is accommodated in the accommodation portion 14.

A pair of mechanism units 32 are disposed in a leftwardly and rightwardly spaced relationship from each other at rear end portions of the chassis 6 (refer to FIGS. 2 and 3). The mechanism units 32 are positioned on the opposite sides to each other with respect to the detection section 23 and are spaced away by a substantially equal distance from the detection section 23. Accordingly, the detection section 23 is disposed at a substantially middle position between the mechanism units 32.

Figure 11:
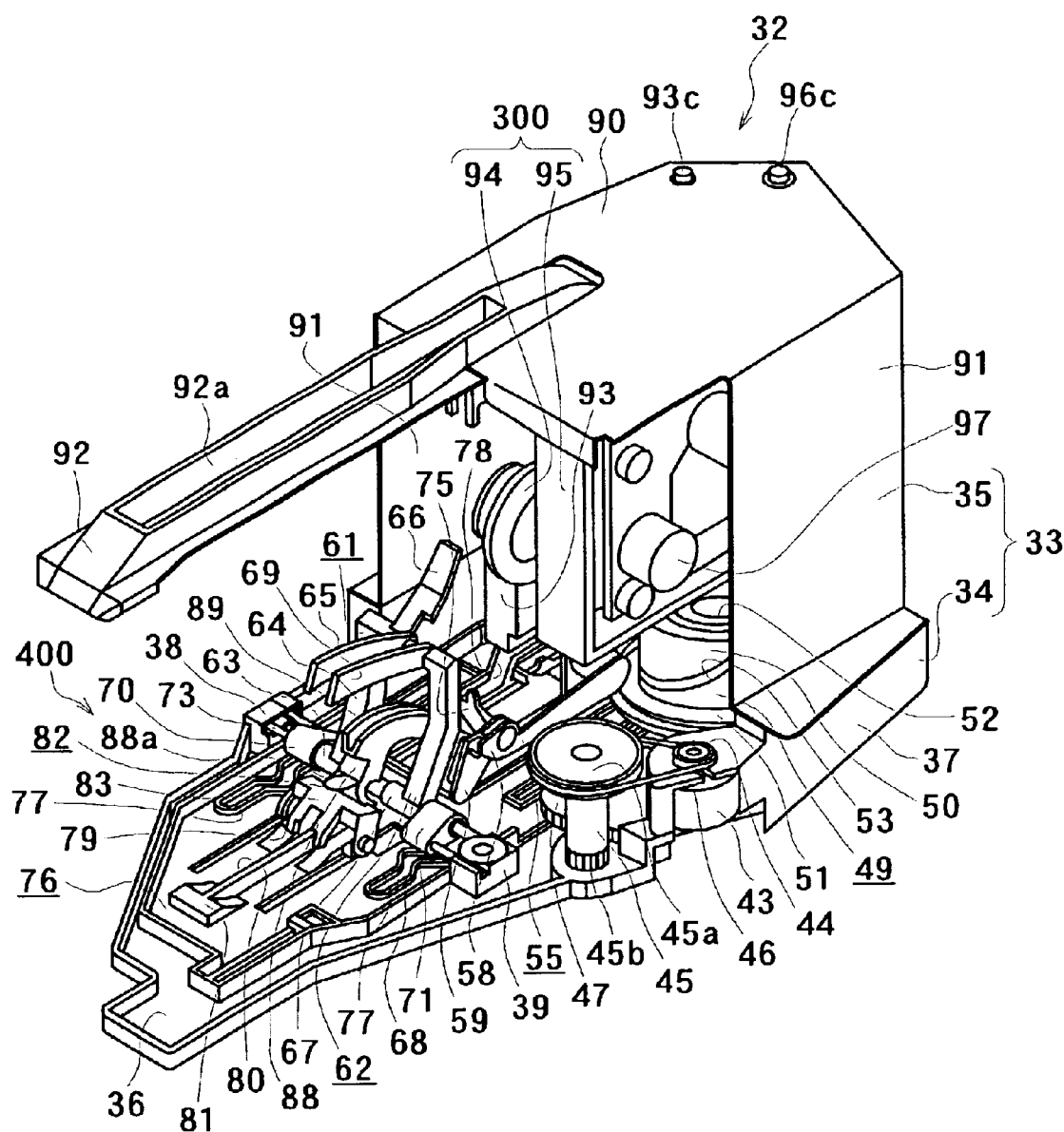
FIG. 11 is a perspective view of a mechanism unit of the disk changer.

Components of each of the mechanism units 32 are disposed on a housing 33 (refer to FIG. 11). The housing 33 includes a base portion 34 and a roof portion 35 attached to the upper side of the base portion 34 (refer to FIGS. 11, 13 and 14).

The base portion 34 includes a bottom face arrangement portion 36 formed long substantially in the forward and rearward direction, and a peripheral wall portion 37 provided uprightly from a peripheral edge of the bottom face arrangement portion 36 and formed integrally with the bottom face arrangement portion 36. The peripheral wall portion 37 is provided at a substantially rear half portion of the bottom face arrangement portion 36.

A pair of supporting projections 38 and 39 are provided on the opposite left and right side edges of the bottom face arrangement portion 36 and extend upwardly at a position little forwardly of a central portion of the bottom face arrangement portion 36 in the forward and rearward direction. A plurality of slider supporting pieces 40 are provided on the bottom face arrangement portion 36 such that they extend upwardly. A pair of lever supporting pieces 41 are provided in a leftwardly and rightwardly spaced relationship from each other and project upwardly at positions between the supporting projections 38 and 39.

Figure 14:
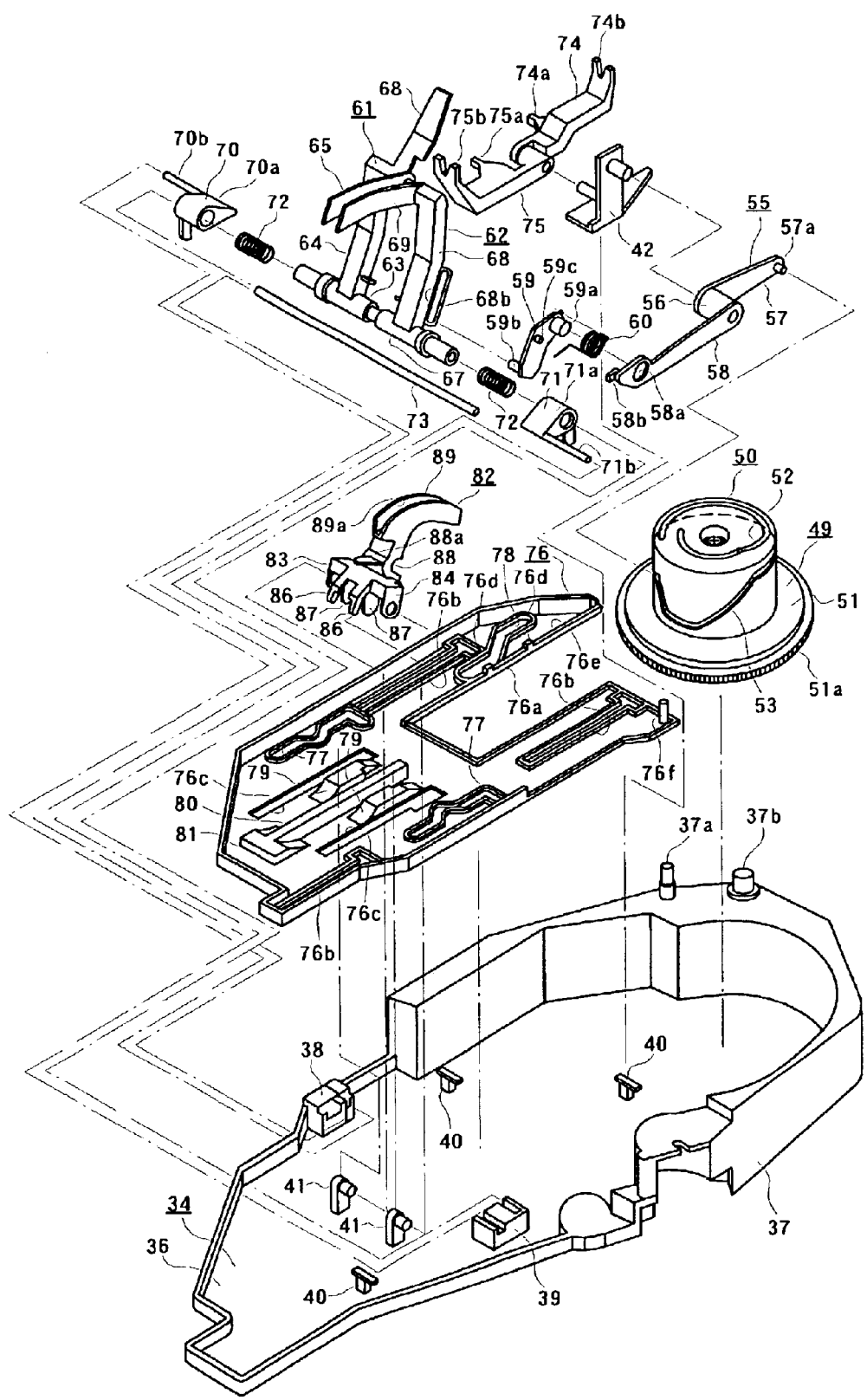
FIG. 14 is an exploded perspective view showing a base member of the mechanism unit and several members disposed on the base member.

A supporting member 42 in the form of a plate is attached to an upper face of the bottom face arrangement portion 36 at a position on the rear side of the lever supporting pieces 41 (refer to FIG. 14).

A first supporting pin 37a is provided integrally on the left side at a rear end portion of the peripheral wall portion 37 and projects upwardly. A second supporting pin 37b is provided integrally on the right side at the rear end portion of the peripheral wall portion 37 and projects upwardly (refer to FIGS. 13 and 14).

Figure 12:
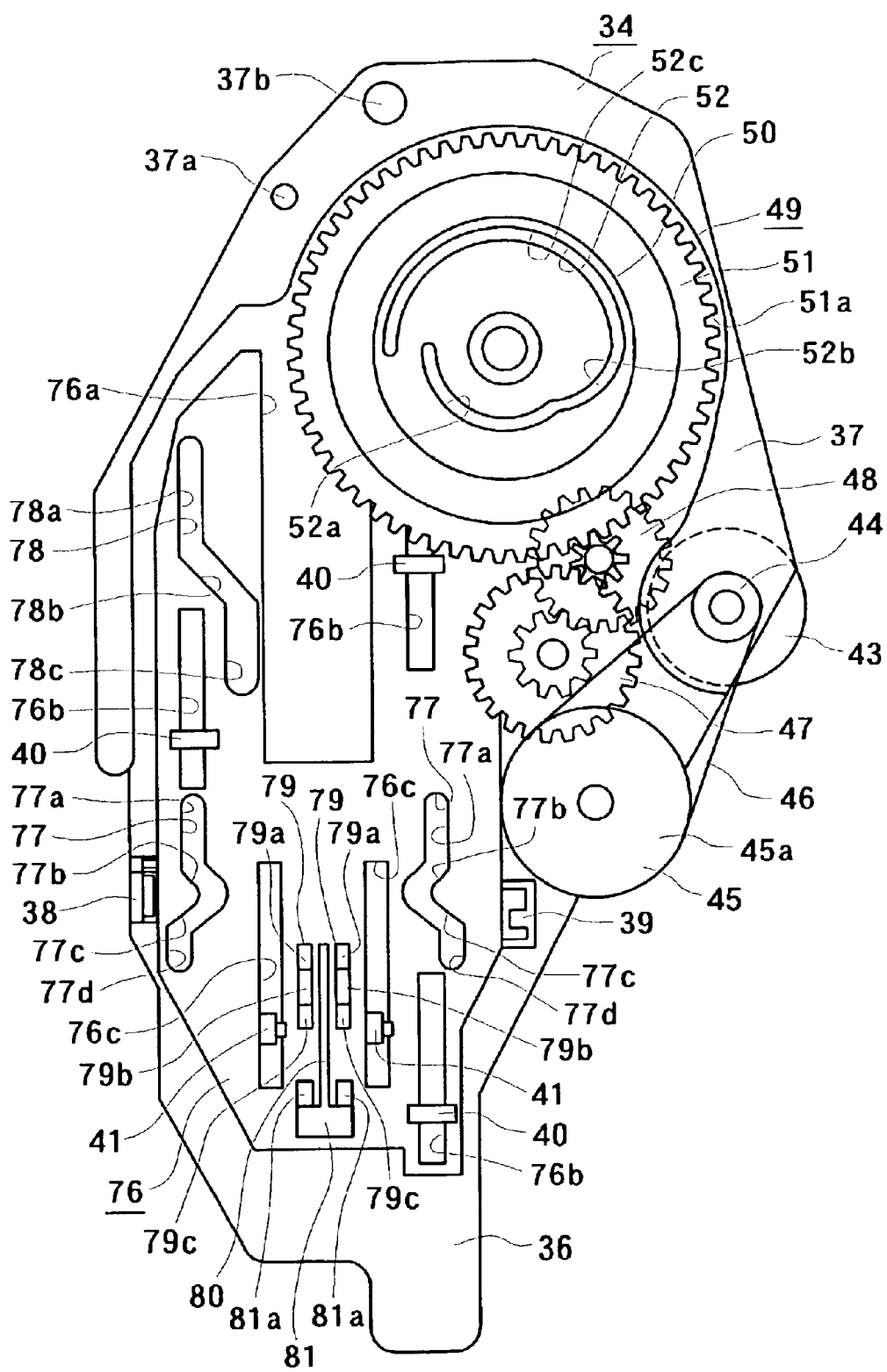
FIG. 12 is a schematic plan view of the mechanism unit.
Figure 13:
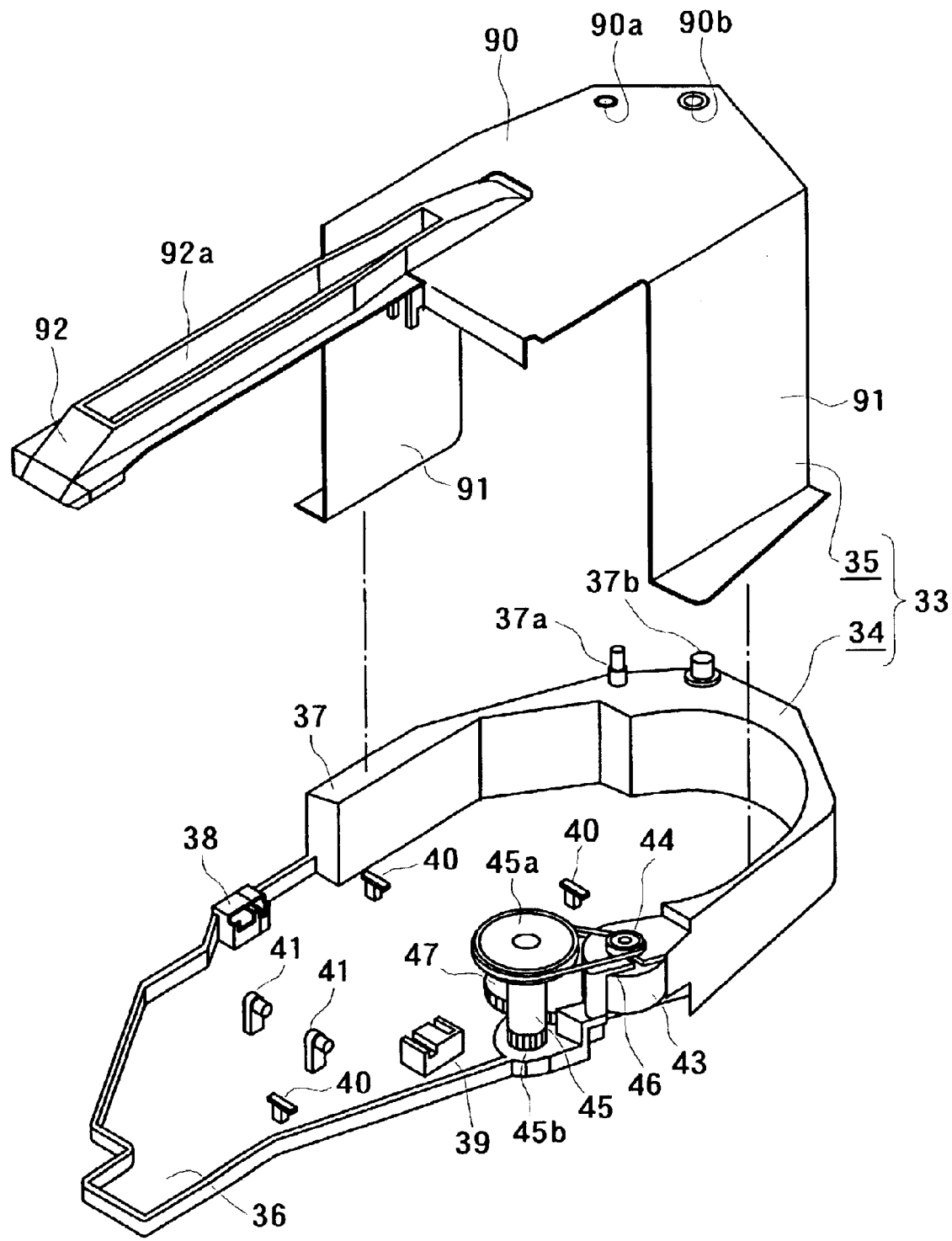
FIG. 13 is an exploded perspective view showing a housing of the mechanism unit.

A driving motor 43 is attached to a front end portion of a right end portion of the peripheral wall portion 37, and a pulley member 44 is secured to a motor shaft of the driving motor 43 (refer to FIGS. 11 to 13). A pulley gear member 45 is supported for rotation at a right end portion of the bottom face arrangement portion 36 on the front side of the peripheral wall portion 37. The pulley gear member 45 has a pulley portion 45a positioned on the upper side and a gear portion 45b positioned on the lower side. A transmission belt 46 extends between and around the pulley portion 45a of the pulley gear member 45 and the pulley member 44.

A first intermediate gear 47 is held in meshing engagement with the gear portion 45b of the pulley gear member 45, and a second intermediate gear 48 is held in meshing engagement with the first intermediate gear 47.

The second intermediate gear 48 is held in meshing engagement with a cam gear 49 (refer to FIG. 12). The cam gear 49 is supported for rotation at a rear end portion of the bottom face arrangement portion 36 of the base portion 34, and includes an upper portion 50 in the form of a column positioned on the upper side and a lower portion 51 in the form of a disk positioned on the lower side (refer to FIGS. 14 and 15).

A unit cam groove 52 is formed on an upper face of the upper portion 50. The unit cam groove 52 has an inner side no-displacement portion 52a, a displacement portion 52b and an outer side no-displacement portion 52c connected continuously in this order (refer to FIGS. 12 and 15). The inner side no-displacement portion 52a is formed in an arc centered at the center of rotation of the upper portion 50, and the displacement portion 52b is formed so as to be displaced to the outer circumference side away from the inner side no-displacement portion 52a while the outer side no-displacement portion 52c is formed in another arc extending along the outer circumferential edge of the upper face of the upper portion 50.

A lever cam groove 53 is formed on a circumferential face of the upper portion 50. The lever cam groove 53 has an intermediate side horizontal portion 53a, a first inclined portion 53b, a lower side horizontal portion 53c, a second inclined portion 53d, a first upper side horizontal portion 53e, a third inclined portion 53f and a second upper side horizontal portion 53g formed continuously in this order (refer to FIGS. 15 and 16). The intermediate side horizontal portion 53a is formed at a substantially central portion of the upper portion 50 in the upward and downward direction while the first inclined portion 53b is inclined such that it is displaced downwardly away from the intermediate side horizontal portion 53a. Further, the lower side horizontal portion 53c is formed at a lower end portion of the upper side portion 50, and the second inclined portion 53d is inclined such that it is displaced upwardly away from the lower side horizontal portion 53c. The first upper side horizontal portion 53e is formed at a position near to an upper end portion of the upper portion 50. The third inclined portion 53f is inclined such that it is displaced upwardly away from the first upper side horizontal portion 53e, and the second upper side horizontal portion 53g is formed at a position rather near to the upper end portion of the upper portion 50.

Figure 15:
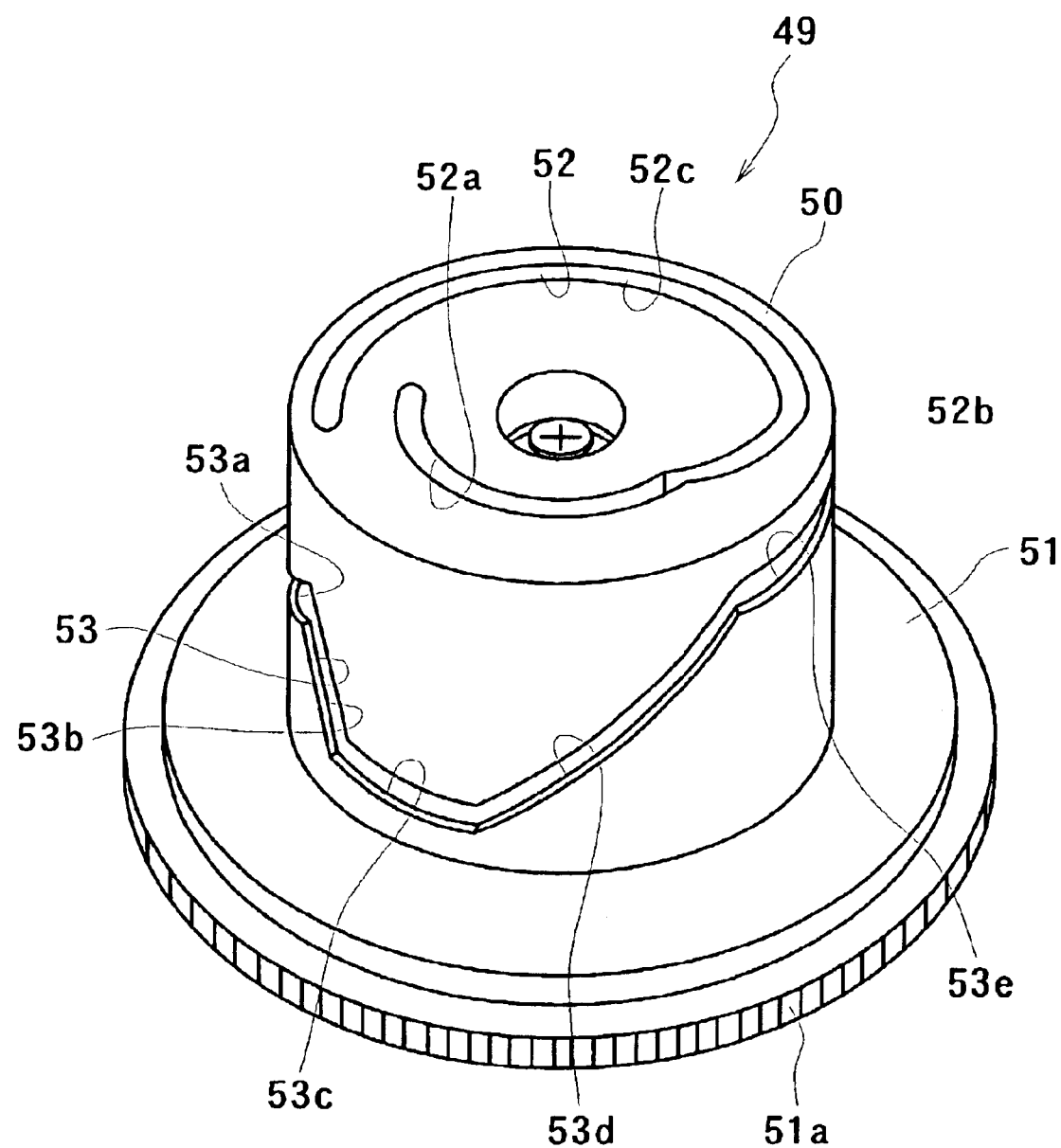
FIG. 15 is an enlarged perspective view of a cam gear of the mechanism unit.
Figure 16:
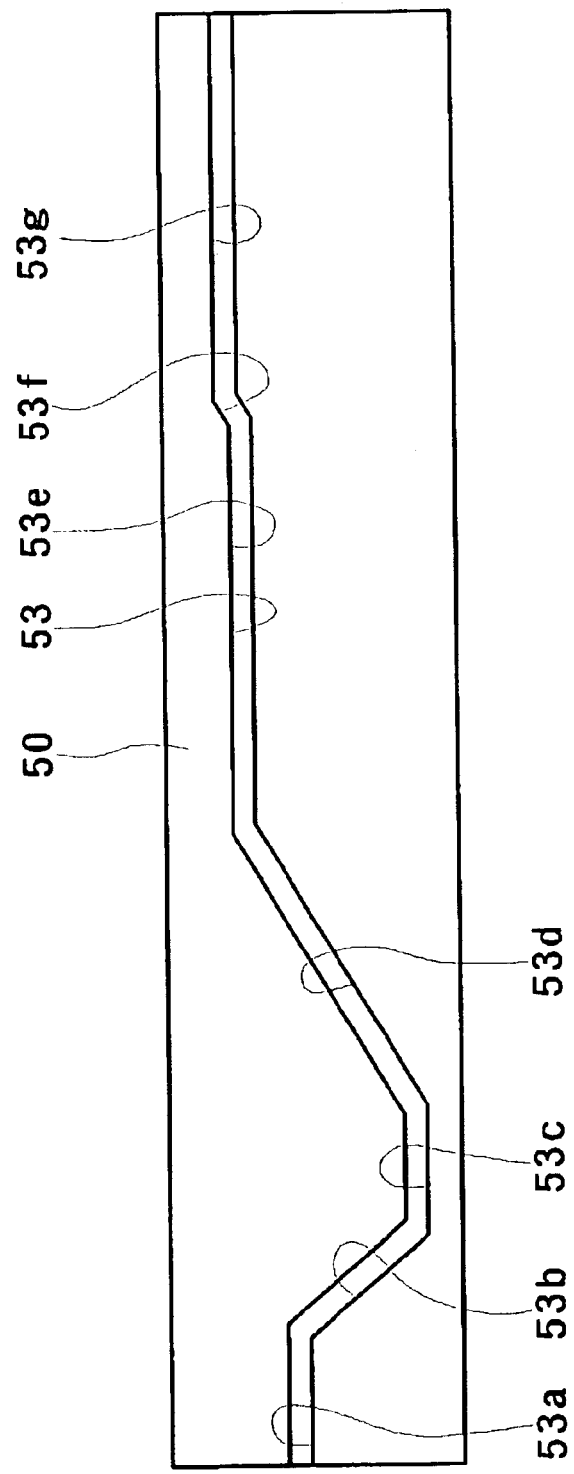
FIG. 16 is a development showing a cam groove for a lever formed on the cam gear.

A gear portion 51a is formed on an outer circumference of the lower portion 51 (refer to FIGS. 12, 14 and 15).

Figure 17:
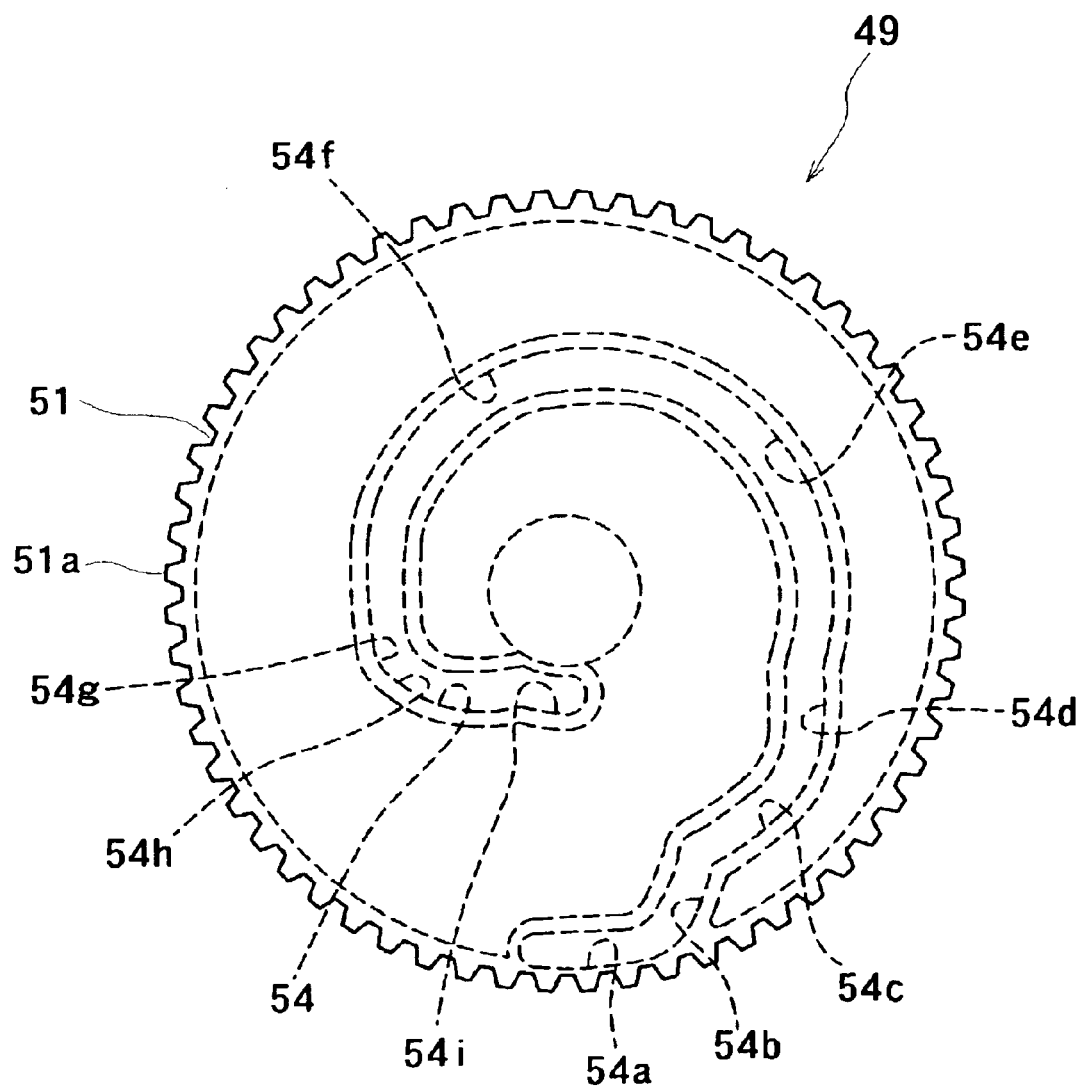
FIG. 17 is an enlarged plan view showing a cam groove for a slider formed on a lower face of the cam gear.

A slider cam groove 54 is formed on a lower face of the lower portion 51. The slider cam groove 54 has a starting edge portion 54a, a first operation portion 54b, an outer side no-operation portion 54c, a second operation portion 54d, an intermediate side no-operation portion 54e, a third operation portion 54f, a inner side no-operation portion 54g, a fourth operation portion 54h and a termination edge portion 54i formed continuously in this order (refer to FIG. 17). The starting edge portion 54a is formed in a short arc extending along the outer circumferential edge of the lower portion 51, and the first operation portion 54b is formed in a curve, which is displaced toward the center of the cam gear 49 away from the starting edge portion 54a. The outer side no-operation portion 54c is formed in another short arc centered at the center of rotation of the cam gear 49, and the second operation portion 54d is formed in a curve, which is displaced to the inner circumference side away from the outer side no-operation portion 54c. The intermediate side no-operation portion 54e is formed in a long arc centered at the center of rotation of the cam gear 49, and the third operation portion 54f is formed in a curve, which is displaced moderately toward the inner circumference side away from the intermediate side no-operation portion 54e. The inner side no-operation portion 54g is formed in a further short art centered at the center of rotation of the cam gear 49, and the fourth operation portion 54h is formed in a curve, which is displaced suddenly to the inner circumference side away from the inner side no-operation portion 54g. The termination edge portion 54i is formed in a still further short arc centered at the center of rotation of the cam gear 49.

Referring to FIG. 14, an arm lever 55 has a supported shaft portion 56, a first arm portion 57 and a second arm portion 58. A first arm portion 57 and a second arm portion 58 integrally formed by projecting the substantially opposite sides each other from the supported shaft portion 56. The supported shaft portion 56 is supported at a position rather near to an upper end of the supporting member 42 attached to the bottom face arrangement portion 36 of the base portion 34 for rotation in directions in which the first arm portion 57 and the second arm portion 58 are moved in substantially upward and downward directions.

The first arm portion 57 projects substantially rearwardly from the supported shaft portion 56, and an engaging shaft 57a is provided at an end portion of the first arm portion 57 and projects rightwardly. The engaging shaft 57a engages for sliding movement in the lever cam groove 53 of the cam gear 49.

The second arm portion 58 projects substantially forwardly from the supported shaft portion 56, and a support hole 58a is formed at an end portion of the second arm portion 58. A stopper lug 58b is provided at an end portion of the second arm portion 58 and projects substantially forwardly.

A connection lever 59 is supported for pivotal motion on the second arm portion 58 of the arm lever 55 (refer to FIGS. 11 and 14). The second arm portion 58 has a substantially isosceles triangular shape having an obtuse vertical angle, and a supported shaft 59a is provided on the connection lever 59 adjacent one of the two basic angles of the triangle and projects rightwardly. Another supported shaft 59b is provided on the connection lever 59 adjacent the another basic angle and projects leftwardly. The connection lever 59 is supported on the arm lever 55 with the supported shaft 59a thereof inserted in the support hole 58a of the arm lever 55. A counter-stopper lug 59c is provided on the connection lever 59 and projects rightwardly.

An engaging pin 59b of the connection lever 59 is biased substantially upwardly by a torsion coil spring 60 supported on the supported shaft 59a of the connection lever 59 in a state wherein the connection lever 59 is supported on the arm lever 55. The counter-stopper lug 59c of the connection lever 59 is engaged from below by the stopper lug 58b of the second arm portion 58 of the arm lever 55 to restrict unnecessary pivotal motion of the connection lever 59 biased by the torsion coil spring 60 with respect to the arm lever 55.

A first handling lever 61 and a second handling lever 62 are supported for pivotal motion between the supporting projections 38 and 39 provided on the bottom face arrangement portion 36 of the base portion 34 (refer to FIGS. 11 and 14).

The first handling lever 61 includes a supported tubular portion 63 positioned rather near to the supporting projection 38 and extending in the substantially leftward and rightward direction, an arm portion 64 extending in a direction perpendicular to the axial direction of the supported tubular portion 63 from a position of the supported tubular portion 63 rather near to the right end, a handling portion 65 extending from an end portion of the arm portion 64 in a direction perpendicular to the direction in which the arm portion 64 extends, and a supporting portion 66 extending from an end portion of the arm portion 64 in a direction substantially same as the direction in which the arm portion 64 extends. An insertion hole 64a is formed at an end portion of the arm portion 64 and extends leftwardly and rightwardly (refer to FIG. 18).

The second handling lever 62 includes a supported tubular portion 67 positioned rather near to the supporting projection 39 and extending substantially in the leftward and rightward direction, an arm portion 68 extending in a direction perpendicular to the axial direction of the supported tubular portion 67 from a position of the supported tubular portion 67 rather neat to a left end, and a handling portion 69 extending from an end portion of the arm portion 68 in a direction perpendicular to the direction in which the arm portion 68 extends. An insertion pin 68a is provided at an end portion of the arm portion 68 and projects leftwardly. An engaging hole 68b is formed at a base end portion of the arm portion 68 and elongated in the direction in which the arm portion 68 extends.

Figure 18:
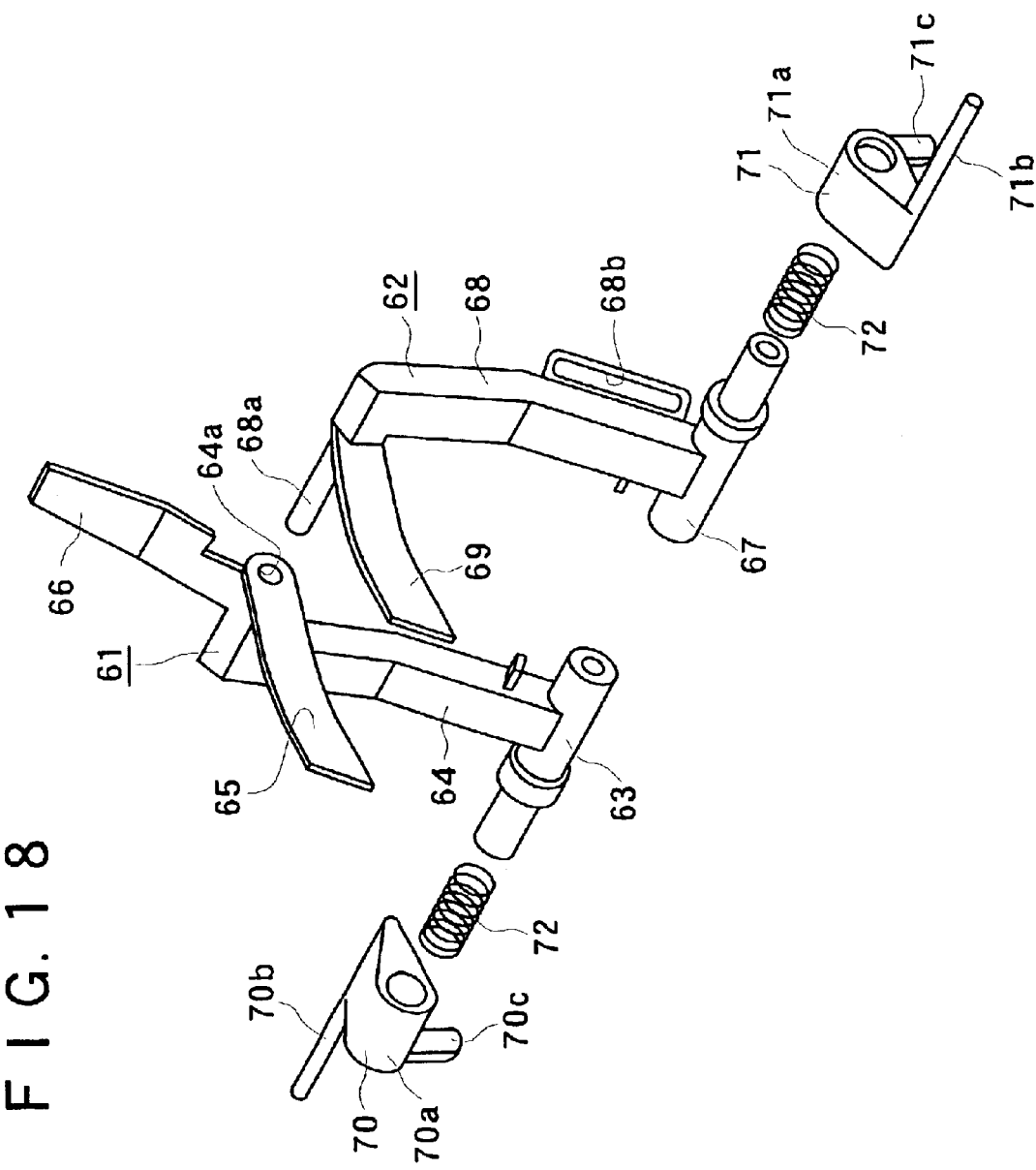
FIG. 18 is an enlarged exploded perspective view showing a handling lever and a holding lever of the mechanism unit.

A holding lever 70 is formed as a unitary member from an outer fitting supporting portion 70a, a supported shaft portion 70b extending leftwardly from a rear end portion of the outer fitting supporting portion 70a, and a cam pin 70c extending downwardly from the outer fitting supporting portion 70a (refer to FIGS. 11, 14 and 18). Another holding lever 71 is formed as a unitary member from an outer fitting supporting portion 71a, a supported shaft portion 71b extending rightwardly from a front end portion of the outer fitting supporting portion 71a, and a cam pin 71c extending downwardly from the outer fitting supporting portion 71a (refer to FIGS. 11, 14 and 18).

The supported tubular portion 63 of the first handling lever 61 is inserted at a left half portion thereof in the outer fitting supporting portion 70a of the holding lever 70 such that the first handling lever 61 can be pivoted with respect to the holding lever 70. A compression coil spring 72 is provided in a compressed state in the inside of the outer fitting supporting portion 70a so as to bias the first handling lever 61 rightwardly in a state wherein the supported tubular portion 63 is inserted in the outer fitting supporting portion 70a (refer to FIG. 14).

The supported tubular portion 67 of the second handling lever 62 is inserted at a right half portion thereof in the outer fitting supporting portion 71a of the holding lever 71 such that the second handling lever 62 can be pivoted with respect to the holding lever 71. A compression coil spring 72 is provided in a compressed state in the inside of the outer fitting supporting portion 71a so as to bias the second handling lever 62 leftwardly in a state wherein the supported tubular portion 67 is inserted in the outer fitting supporting portion 71a (refer to FIG. 14).

The first handling lever 61 and the second handling lever 62 are moved in the leftward and rightward directions integrally with the holding levers 70 and 71.

The first handling lever 61 and the second handling lever 62 are supported for pivotal motion on the supporting projections 38 and 39 through a shaft member 73 such that the shaft member 73 extends between and through the supported tubular portions 63 and 67 and is supported at the opposite end portions thereof on the supporting projections 38 and 39 provided on the bottom face arrangement portion 36 of the base portion 34 (refer to FIGS. 11 and 14). The first handling lever 61 and the second handling lever 62 are movable in the axial direction of the shaft member 73 with respect to the shaft member 73.

In a state wherein the first handling lever 61 and the second handling lever 62 are supported on the supporting projections 38 and 39, the supported shaft portions 70b and 71b of the holding levers 70 and 71 are supported for movement in the leftward and rightward directions between the supporting projections 38 and 39.

In the state wherein the first handling lever 61 and the second handling lever 62 are supported between the supporting projections 38 and 39, the insertion pin 68a is inserted for sliding movement in the insertion hole 64a of the first handling lever 61 (refer to FIG. 14). Accordingly, the first handling lever 61 and the second handling lever 62 are pivoted integrally with each other with respect to the shaft member 73.

In the state wherein the first handling lever 61 and the second handling lever 62 are supported between the supporting projections 38 and 39, the engaging pin 59b of the connection lever 59 is engaged for sliding movement in the engaging hole 68b of the second handling lever 62 (refer to FIG. 14).

A pair of supporting arms 74 and 75 are supported for pivotal motion at a lower end portion of the supporting member 42 attached to the bottom face arrangement portion 36 of the base portion 34 (refer to FIG. 14).

The supporting arms 74 and 75 are disposed such that they individually extend in the forward and rearward direction and are supported such that portions thereof, which are positioned near to each other, are overlapped leftwardly and rightwardly with the supporting member 42. The operated pieces 74a and 75a are provided at positions rather near to the turning fulcrum thereof, respectively, and extend leftwardly. Supporting portions 74b and 75b are provided at end portions of the supporting arms 74 and 75, respectively, and each has a recessed groove open upwardly.

A slider 76 is supported for movement in the substantially forward and rearward directions on the bottom face arrangement portion 36 (refer to FIGS. 11, 12, 14 and 19).

The slider 76 is formed long substantially in the forward and rearward direction, and an arranging cutaway portion 76a is formed at a central portion in the leftward and rightward direction of a rear half portion of the slider 76 and is open rearwardly. A plurality of supported holes 76b are formed in a spaced relationship from each other in the forward and rearward direction and in the leftward and rightward direction and are elongated forwardly and rearwardly. A pair of escapement holes 76c are formed in a leftwardly and rightwardly spaced relationship from each other on the front side of the arranging cutaway portion 76a of the slider 76 and elongated in the forwardly and rearwardly.

A pair of lever cam holes 77 are formed at left and right end portions in the forward and rearward direction of the slider 76 at positions a little forward of the central portion. Each of the lever cam holes 77 has a rear straight portion 77a, a rear inclined portion 77b, a front inclined portion 77c and a front straight portion 77d formed continuously in this order from the rear side. The rear straight portion 77a extends in the forward and rearward direction. The rear inclined portion 77b is inclined such that it is displaced to the inner side towards the front. The front inclined portion 77c is inclined such that it is displaced to the outer side toward the front. The front straight portion 77d extends in the forward and rearward direction.

A plate cam hole 78 is formed at a left end portion of a rear end portion of the slider 76. The plate cam hole 78 has a first straight portion 78a positioned on the rear side and extending in the forward and rearward direction, an inclined portion 78b formed continuously to a front end of the first straight portion 78a and inclined such that it is displaced rightwardly toward the front, and a second straight portion 78c formed continuously to a front end of the inclined portion 78b and extending forwardly and rearwardly.

A pair of rear operating projections 79 are provided between the escapement holes 76c of the slider 76 and project upwardly. The rear operating projections 79, which is provided in a leftwardly and rightwardly spaced relationship from each other, have rear inclined faces 79a inclined such that they are displaced upwardly toward the front, horizontal faces 79b formed continuously to front ends of the rear inclined faces 79a, and front inclined faces 79c formed continuously to front ends of the horizontal faces 79b and inclined such that they are displaced downwardly to the front.

A guide rib 80 is provided in the slider 76 between the rear operating projections 79 such that it projects upwardly and is elongated forwardly and rearwardly. The guide rib 80 extends up to a position rather near to the front end of the slider 76.

A front operating projection 81 is provided on the slider 76 contiguously to a front end of the guide rib 80. The front operating projection 81 has a pair of inclined faces 81a formed leftwardly and rightwardly of the guide rib 80 thereon such that they have a width in the leftward and rightward direction greater than that of the guide rib 80 and are inclined such that they are displaced downwardly toward the rear.

A pair of operating projections 76d are formed in a forwardly and rearwardly spaced relationship from each other on a right side edge portion of the plate cam hole 78 of the slider 76 and project upwardly such that those portions of the right side edge of the plate cam hole 78 at which the operating projections 76d are not provided serve as a no-operation edge 76e. A sliding shaft 76f is provided on the right side edge at a rear end portion of the slider 76 and extends upwardly.

The slider 76 is supported for sliding movement in the forward and rearward directions on the bottom face arrangement portion 36 such that the slider supporting pieces 40 provided on the bottom face arrangement portion 36 are inserted in the supported holes 76b. In a state wherein the slider 76 is supported on the bottom face arrangement portion 36, the sliding shaft 76f is engaged for sliding movement in the slider cam groove 54 of the cam gear 49. In the state wherein the slider 76 is supported on the bottom face arrangement portion 36, the supporting arms 74 and 75 are disposed in the arranging cutaway portion 76a and the operated pieces 74a and 75a of the supporting arms 74 and 75 are engaged with the no-operation edge 76e of the slider 76. The lever supporting pieces 41 provided on the bottom face arrangement portion 36 individually project upwardly through and from the escapement holes 76c of the slider 76.

Figure 20:
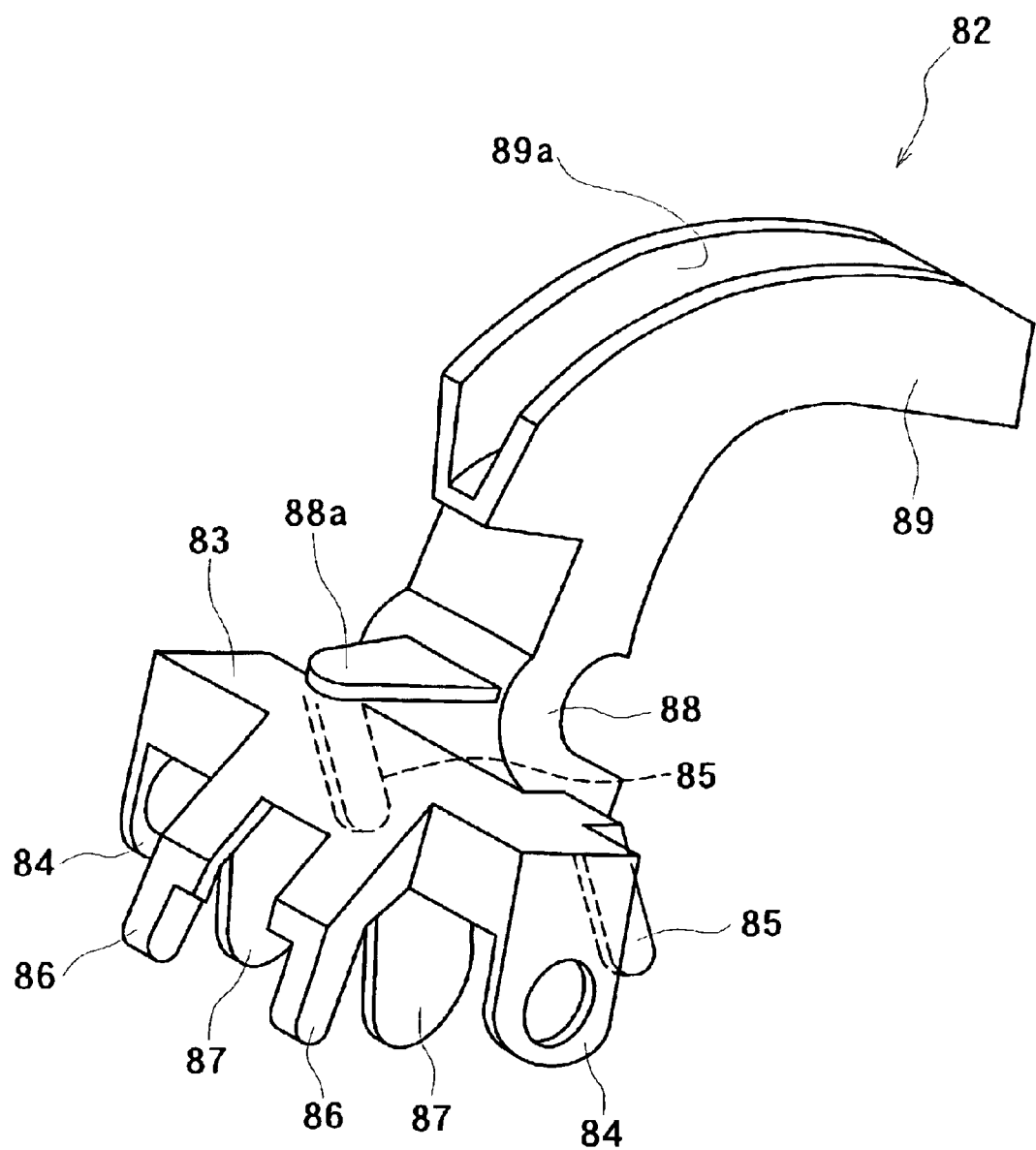
FIG. 20 is an enlarged perspective view of a lock lever of the mechanism unit.

A lock lever 82 is supported for pivotal motion on the lever supporting pieces 41 (refer to FIGS. 11 and 14). The lock lever 82 is formed as a unitary member from a base portion 83 having a horizontally elongated substantially rectangular shape, a pair of supported pieces 84 depending in a leftwardly and rightwardly spaced relationship from each other from a left and right edges of the base portion 83, a pair of rear operated pieces 85 depending in a leftwardly and rightwardly spaced relationship from each other from a rear edge of the base portion 83, a pair of front operated pieces 86 depending in a leftwardly and rightwardly spaced relationship from each other from a front edge of the base portion 83, a pair of guided pieces 87 depending in a leftwardly and rightwardly spaced relationship from each other from a substantially central portion in the leftward and rightward direction of a lower face of the base portion 83, a projecting portion 88 extending upwardly from a rear edge of the base portion 83, and a guide portion 89 provided at an end portion of the projecting portion 88 and having a moderate arcuate shape (refer to FIG. 20).

A locking portion 88a is provided at a position rather near to a lower end of the projecting portion 88 and extends substantially forwardly. A guide groove 89a is formed in the guide portion 89 such that it is open upwardly and extends in the substantially forward and rearward direction.

The lock lever 82 is supported at the supported pieces 84 thereof for pivotal motion on the lever supporting pieces 41 provided on the bottom face arrangement portion 36 of the base portion 34. In a state wherein the lock lever 82 is supported on the lever supporting pieces 41, the guided pieces 87 hold the guide rib 80 of the slider 76 from the left and the right therebetween.

The roof portion 35, which composes the housing 33 of each of the mechanism units 32, is formed as a unitary member from a top plate portion 90 and a pair of side face portions 91 depending from the opposite left and right side edges of the top plate portion 90 (refer to FIG. 13). A first supporting hole 90a and a second supporting hole 90b are formed in a leftwardly and rightwardly spaced relationship from each other at positions rather near to a rear end of the top plate portion 90. The roof portion 35 is attached at lower end portions of the side face portions 91 thereof to an upper face of the peripheral wall portion 37 of the base portion 34 (refer to FIG. 11).

A disk guide member 92 is attached to the top plate portion 90 of the roof portion 35 (refer to FIGS. 11 and 13). The disk guide member 92 is formed long forwardly and rearwardly, and is attached at a rear end portion thereof to a front end portion of the top plate portion 90 while the remaining portion thereof extends forwardly from the top plate portion 90. A disk guide groove 92a having a horizontal width greater than the thickness of the disk-type recording medium 1000 is formed on the disk guide member 92 and is formed long forwardly and rearwardly.

Figure 21:
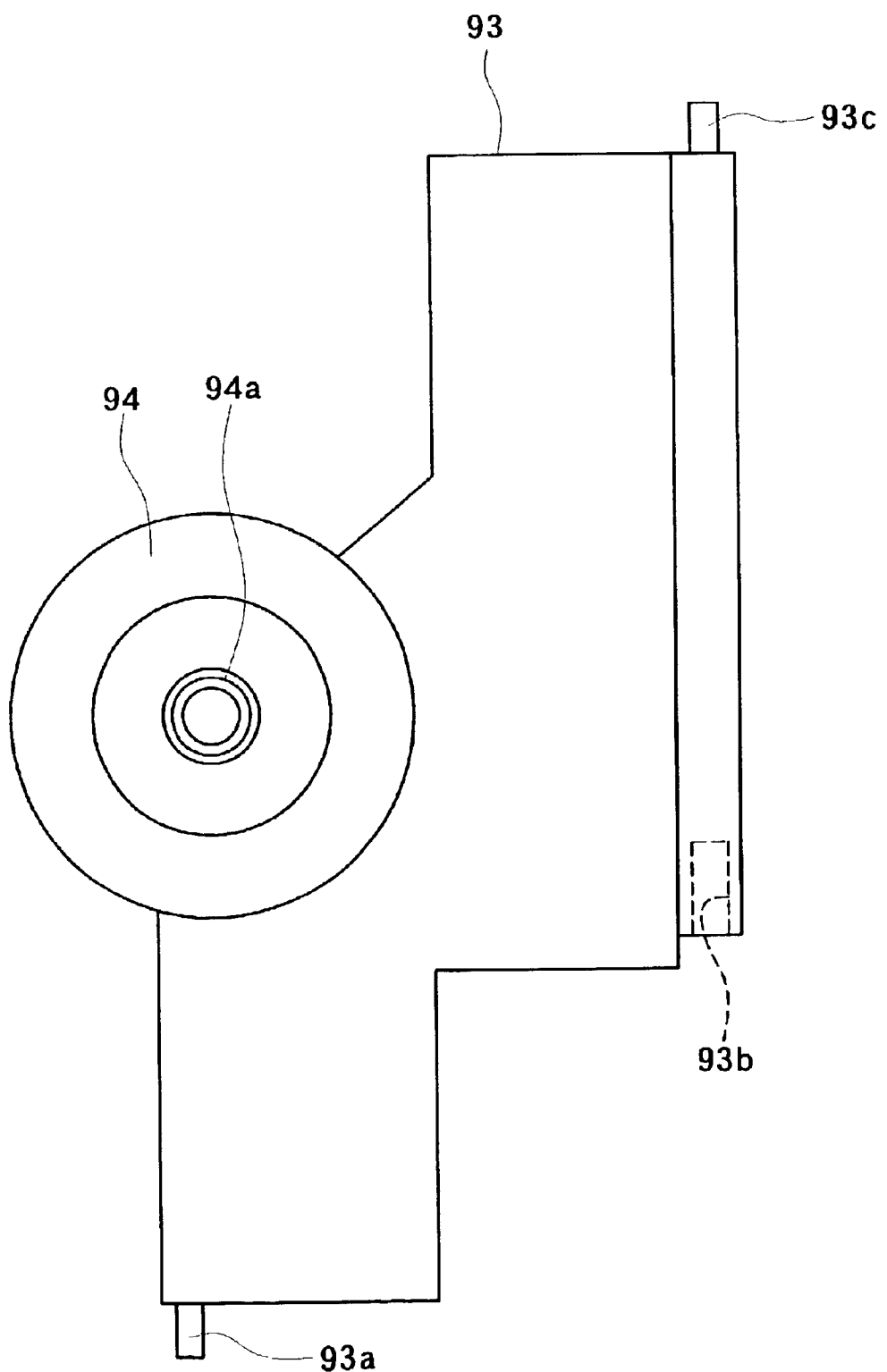
FIG. 21 is an enlarged side elevational view of a pulley supporting member of the mechanism unit.

A pulley supporting member 93 is supported for pivotal motion on the housing 33 (refer to FIG. 11). The pulley supporting member 93 is formed long in the vertical direction, and a cam engaging shaft 93a is provided on a lower face of a front end portion of the pulley supporting member 93 and extends downwardly (refer to FIG. 21). A supported hole 93b is formed on a lower face of a rear end portion of the pulley supporting member 93 and is open downwardly, and a supported shaft 93c is provided at an upper face of the rear end portion of the pulley supporting member 93 and projects upwardly.

A chucking pulley 94 is supported at a substantially middle portion in the upward and downward direction of a front end portion of the pulley supporting member 93. A magnet 94a having a ring-like shape is attached to a central portion of the chucking pulley 94. The chucking pulley 94 is supported on the pulley supporting member 93 for rotation around and for movement along an axis thereof such that a major face thereof is directed in the substantially leftward and rightward direction.

The pulley supporting member 93 is supported for pivotal motion on the housing 33 such that the first supporting pin 37a provided on the peripheral wall portion 37 of the base portion 34 is inserted in the supported hole 93b, and the supported shaft 93c is inserted in the first supporting hole 90a of the roof portion 35. Therefore, the chucking pulley 94 may be moved in the substantially leftward and rightward direction.

In a state wherein the pulley supporting member 93 is supported on the housing 33, the cam engaging shaft 93a is engaged for sliding movement in the plate cam hole 78 of the slider 76.

Figure 22:
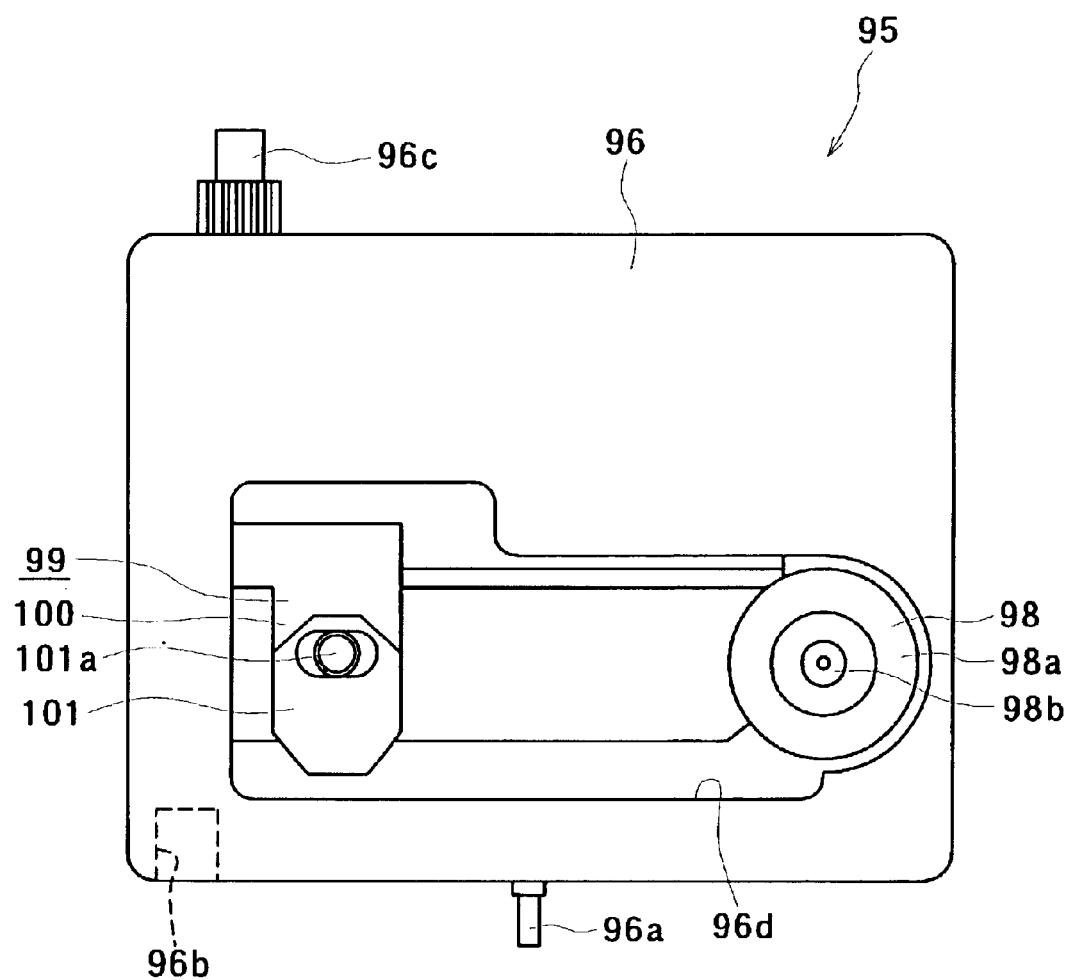
FIG. 22 is an enlarged side elevational view of a base unit of the mechanism unit.

A base unit 95 is supported for pivotal motion on the housing 33 (refer to FIG. 11). The base unit 95 includes a base chassis 96 having a substantially rectangular shape and several elements attached to or supported on the base chassis 96 (refer to FIG. 22).

A cam engaging pin 96a is provided on a lower face of a substantially middle portion in the forward and rearward direction of the base chassis 96 and extends downwardly. A supported hole 96b is formed on a lower face of a rear end portion of the base chassis 96 and is open downwardly, and also a supported shaft 96c is provided on an upper face of a rear end portion of the base chassis 96 and extends upwardly. The base chassis 96 has a large opening 96d formed therein.

A spindle motor 97 is mounted on the base chassis 96. A motor shaft of the spindle motor 97 projects leftwardly from the opening 96d, and a disk table 98 is secured to the motor shaft. The disk table 98 has a disk holding portion 98a in the form of a disk, and a centering projection 98b extending leftwardly from a central portion of the disk holding portion 98a. The centering projection 98b is formed from a magnetic metal material.

An optical pickup 99 is supported on the base chassis 96 for movement in the forward and rearward direction, that is, a radial direction of a disk-type recording medium 1000 mounted on the disk table 98. The optical pickup 99 includes a movable base 100, a required optical element including a light emitting element and a light receiving element, and a two-axis actuator 101 supported on the movable base 100. An objective lens 101a is provided on the two-axis actuator 101.

The base unit 95 is supported for pivotal motion on the housing 33 such that the second supporting pin 37b provided on the peripheral wall portion 37 of the base portion 34 is inserted in the supported hole 96b of the base chassis 96, and the supported shaft 96c is inserted in the second supporting hole 90b of the roof portion 35. Therefore, the disk table 98 can be moved in the substantially leftward and rightward directions in an opposing relationship to the chucking pulley 94 supported on the pulley supporting member 93.

In a state wherein the base unit 95 is supported on the housing 33, the cam engaging pin 96a is engaged for sliding movement in the unit cam groove 52 of the cam gear 49 supported on the base portion 34.

A recording and reproduction section 300 for performing recording from or reproduction onto a disk-type recording medium 1000 is formed from the chucking pulley 94 and the base unit 95 described above (refer to FIG. 11). Further, a disk takeout mechanism 400 for taking out a disk-type recording medium 1000 from an accommodation portion 14 of the rotatable tray 7 and transporting the disk-type recording medium 1000 to the recording and reproduction section 300 and for taking out a disk-type recording medium 1000 from the recording and reproduction section 300 and transporting the disk-type recording medium 1000 to an accommodation portion 14 is formed from the cam gear 49, arm lever 55, connection lever 59, first handling lever 61, second handling lever 62, supporting arms 74 and 75, slider 76 and so forth described above.

In the following, operation of the recording and reproduction section 300 and the disk takeout mechanism 400 of the each of the unit mechanisms 32 is described.

Figure 23:
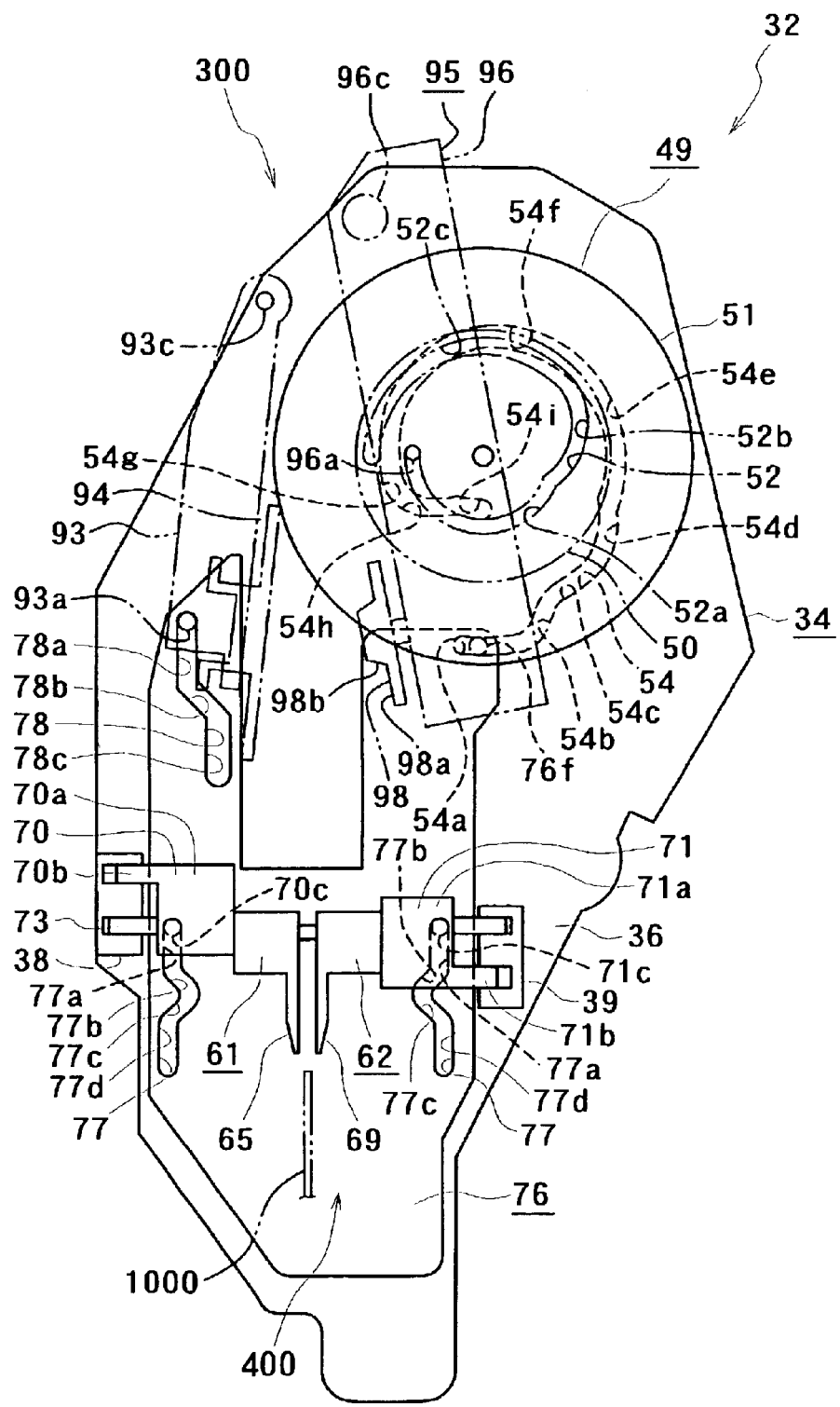
FIG. 23 is a schematic plan view showing the mechanism unit in an initial state in operation.
Figure 24:
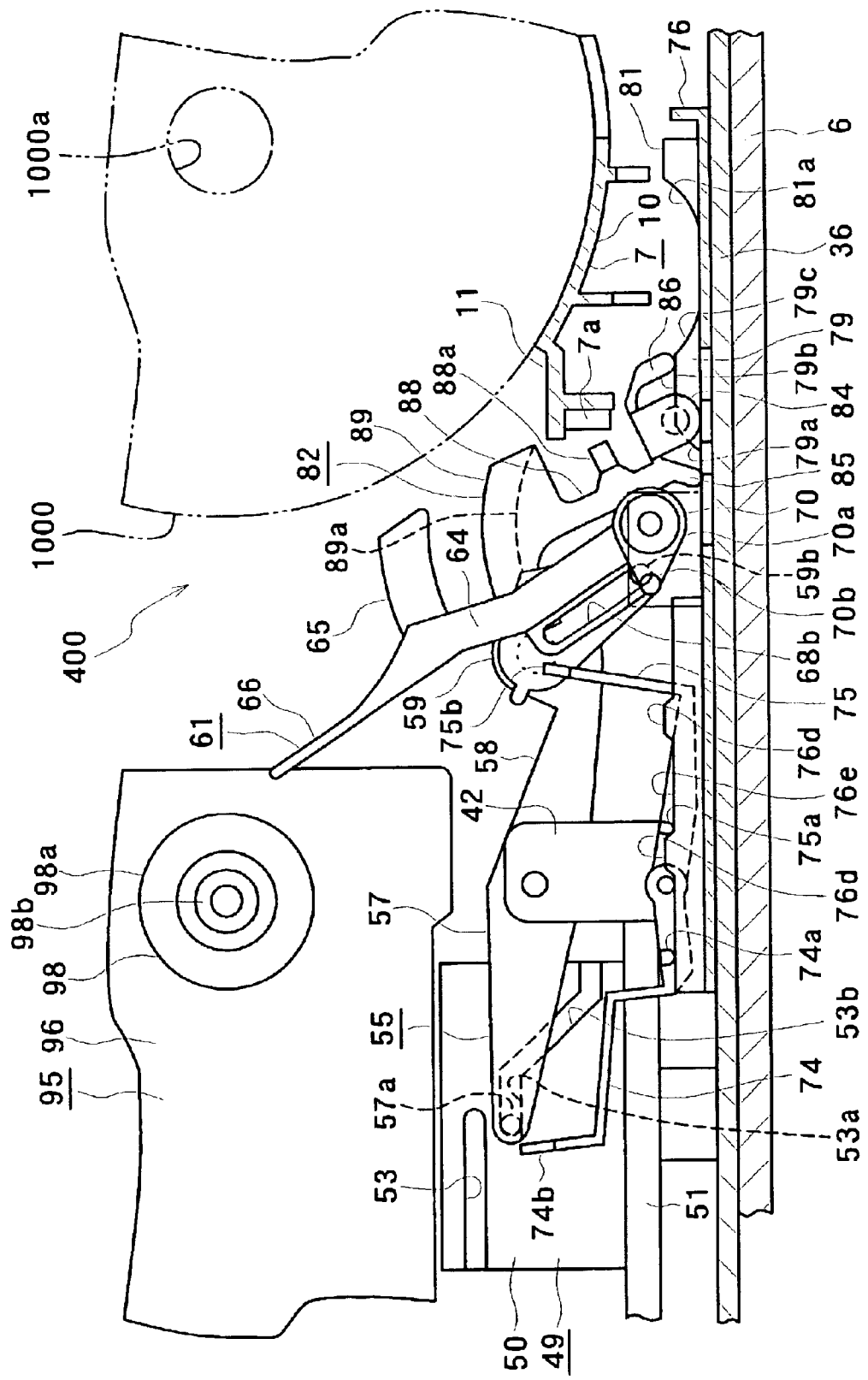
FIG. 24 is a schematic side elevational sectional view showing part of the mechanism unit in its initial state.
Figure 25:
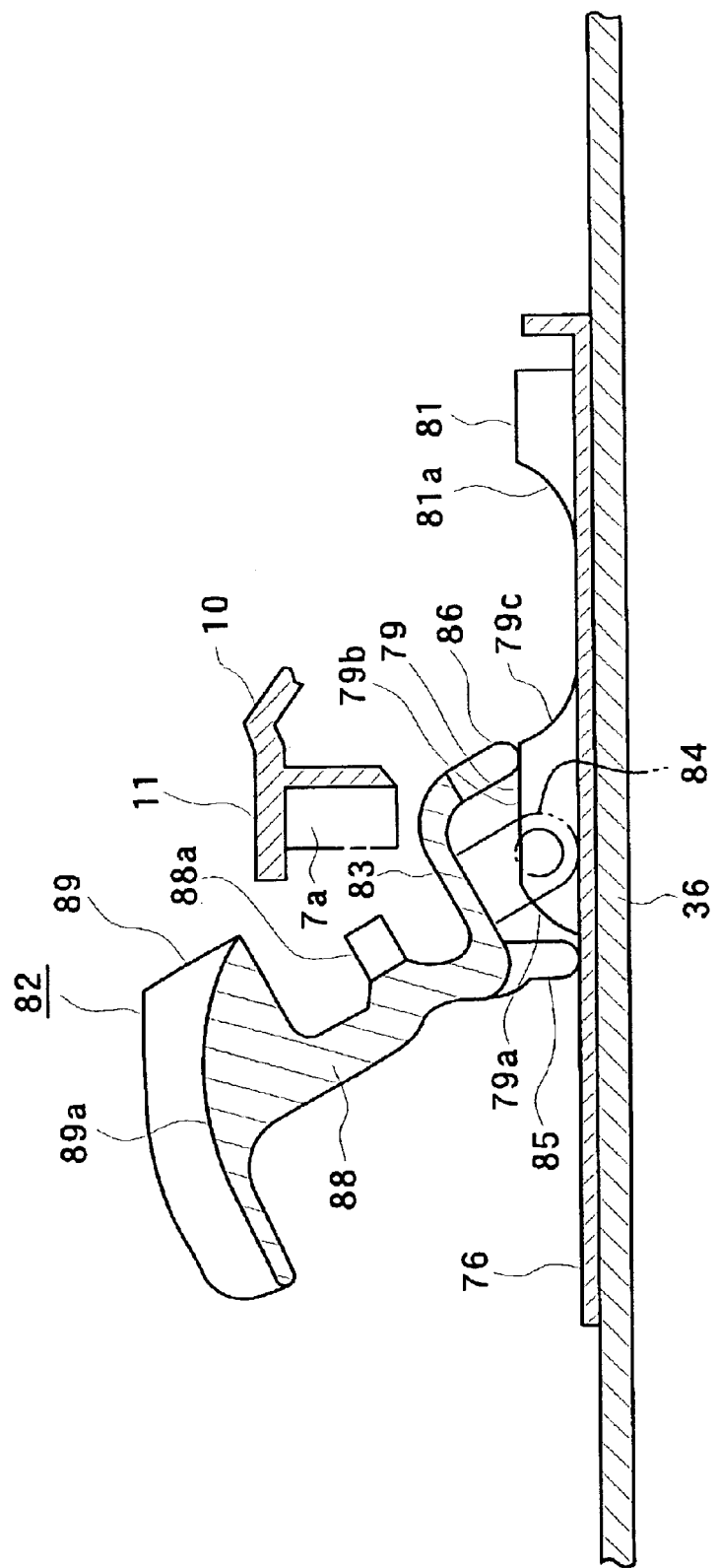
FIG. 25 is a schematic enlarged side elevational sectional view showing the rotatable tray in a state wherein it is not locked by the lock lever.

First, an initial state of the recording and reproduction section 300 and the disk takeout mechanism 400, that is, a state before a disk-type recording medium 1000 is taken out from an accommodation portion 14 of the rotatable tray 7, is described (refer to FIGS. 23 to 25).

The slider 76 is positioned on the front side end of the range of movement thereof, and the sliding shaft 76f engages with the starting edge portion 54a of the slider cam groove 54 of the cam gear 49 (refer to FIG. 23).

The arm lever 55 engages at the engaging shaft 57a of the first arm portion 57 thereof with an end portion of the intermediate side horizontal portion 53a of the lever cam groove 53 remote from the first inclined portion 53b (refer to FIG. 24).

The connection lever 59 engages at the engaging pin 59b thereof with a lower end portion of the engaging hole 68b of the second handling lever 62 (refer to FIG. 24).

The holding levers 70 and 71 on which the first handling lever 61 and the second handling lever 62 are supported engage at the cam pins 70c and 71c thereof with rear end portions of the rear straight portions 77a of the lever cam holes 77 of the slider 76 (refer to FIG. 23). Accordingly, the arm portion 64 of the first handling lever 61 and the arm portion 68 of the second handling lever 62 are inclined a little to the rear side (refer to FIG. 24), and the handling portions 65 and 69 are spaced away from each other in the leftward and rightward direction (refer to FIG. 23).

The supporting arms 74 and 75 are positioned at ends of the ranges of pivotal motion thereof spaced away from each other, and the operated pieces 74a and 75a thereof engage with the no-operation edge 76e of the slider 76 (refer to FIG. 24).

The lock lever 82 engages at the rear operated pieces 85 thereof with portions directly on the rear side of the rear operating projections 79 and engage at the front operated pieces 86 thereof with front end portions of the horizontal faces 79b of the rear operating projections 79 (refer to FIGS. 24 and 25). Accordingly, the lock lever 82 is in a state inclined a little to the rear side, and a portion of the guide portion 89 is disposed between the first handling lever 61 and the second handling lever 62. The locking portion 88a is spaced rearwardly away from the rotatable tray 7 (refer to FIG. 23).

The pulley supporting member 93 engages at the cam engaging shaft 93a thereof with a rear end portion of the first straight portion 78a of the plate cam hole 78 of the slider 76 (refer to FIG. 23). Accordingly, the pulley supporting member 93 is held at a left side end of the range of movement thereof.

The base unit 95 engages at the cam engaging pin 96a thereof with an end portion of the inner side no-displacement portion 52a of the unit cam groove 52 of the cam gear 49 remote from the displacement portion 52b (refer to FIG. 23). Accordingly, the base unit 95 is held at the right side end of the range of movement thereof, and the chucking pulley 94 supported on the pulley supporting member 93 and the disk table 98 provided on the base unit 95 are spaced away from each other in the leftward and rightward direction.

If the rotatable tray 7 is stopped after rotation and one of the accommodation portions 14 is positioned at a disk takeout position, then the driving motor 43 is rotated so that the disk-type recording medium 1000 is taken out from the accommodation portion 14 by the disk takeout mechanism 400 in such a manner as described below.

In particular, when the driving motor 43 is driven to rotate, then the driving force thereof is transmitted to the cam gear 49 so that the cam gear 49 is rotated in the clockwise direction as viewed in plan.

When the cam gear 49 rotates, the sliding shaft 76f of the slider 76 is relatively moved within the first operation portion 54b of the slider cam groove 54 of the cam gear 49 from the starting edge portion 54a to the outer side no-operation portion 54c, whereupon the slider 76 is moved rearwardly. As the slider 76 moves rearwardly, the rear operated pieces 85 of the lock lever 82 are slidably moved on the rear inclined faces 79a of the rear operating projections 79 up to the rear ends of the horizontal faces 79b while the front operated pieces 86 are slidably moved on the front inclined faces 79c of the rear operating projections 79 until they come to positions immediately forwardly of the front inclined faces 79c (refer to FIGS. 27 and 28). Accordingly, the lock lever 82 which has been inclined a little to the rear side is brought to a vertical position, whereupon the locking portion 88a is engaged with the gear portion 7a of the rotatable tray 7 to lock the rotatable tray 7.

Figure 27:
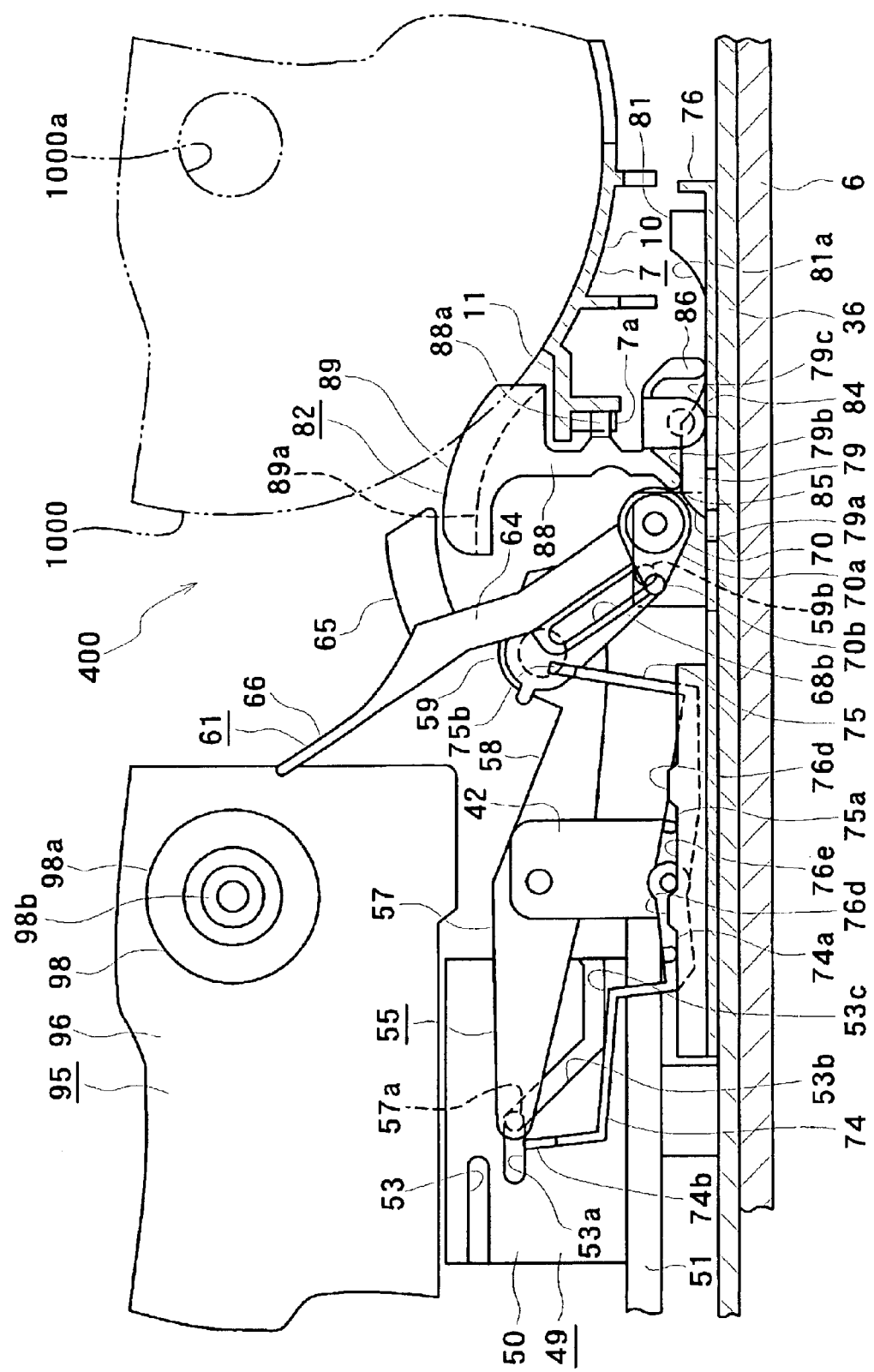
FIG. 27 is a schematic side elevational view showing the lock lever pivoted through rotation of the cam gear from its initial state position.
Figure 28:
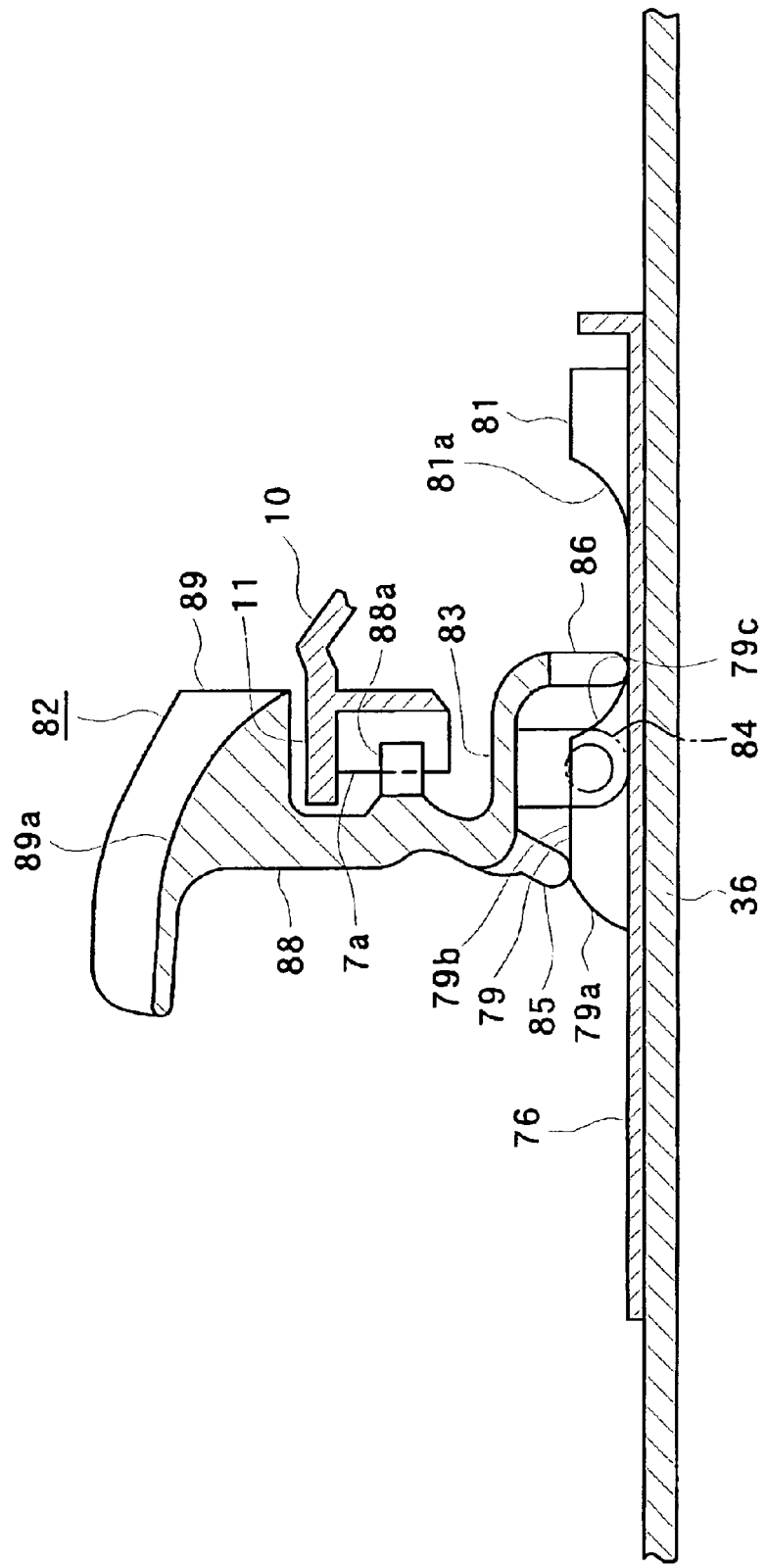
FIG. 28 is a schematic enlarged side elevational sectional view showing the rotatable tray in a state wherein it is locked by the lock lever.

When the cam gear 49 is rotated as described above, since the engaging shaft 57a of the cam lever 55 is moved relatively within the intermediate side horizontal portion 53a of the lever cam groove 53 of the cam gear 49 toward the first inclined portion 53b, the arm lever 55 is not pivoted (refer to FIG. 27).

Figure 26:
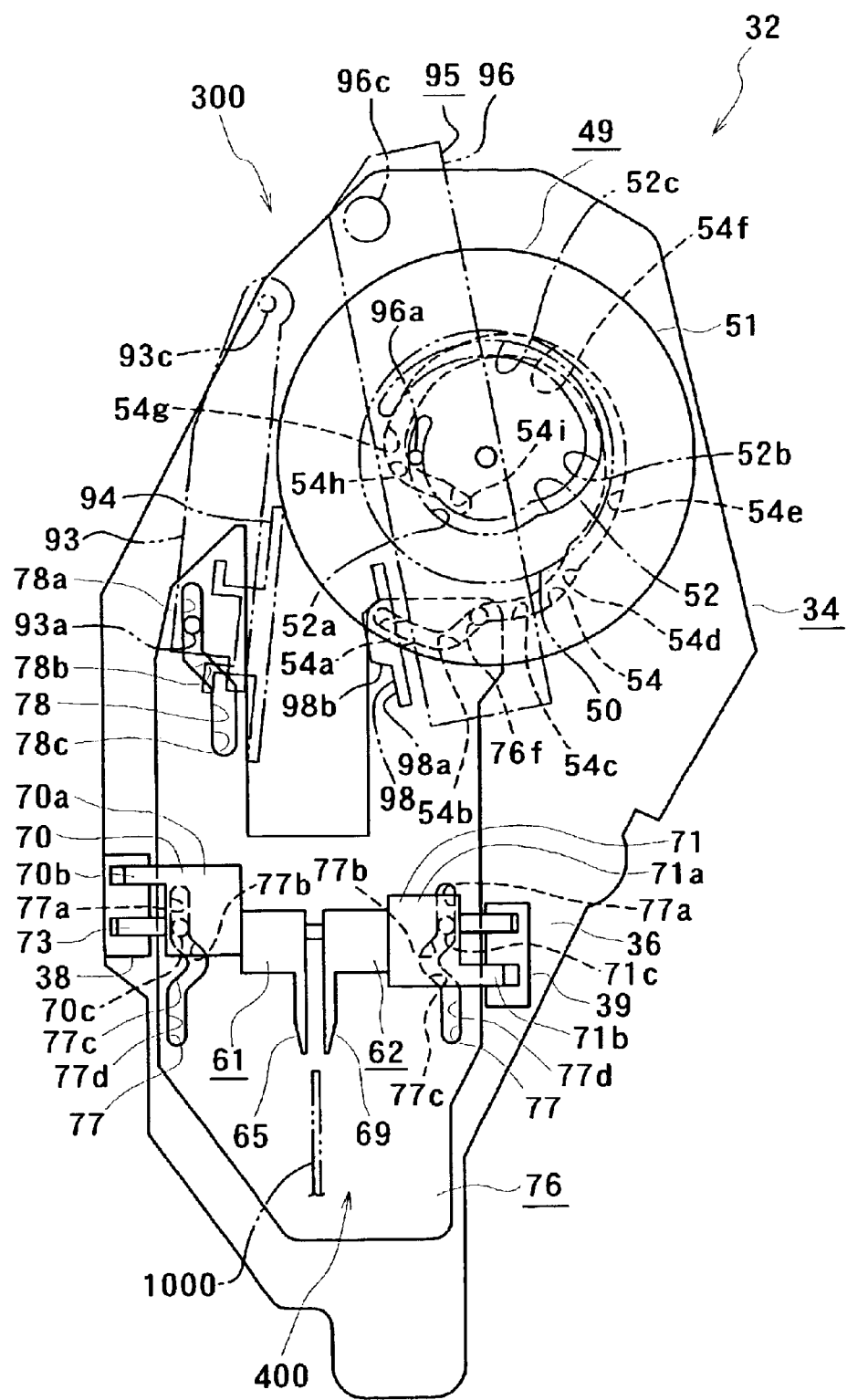
FIG. 26 is a schematic plan view showing the slider moved rearwardly through rotation of the cam gear from its initial state position.

At this time, since the holding levers 70 and 71 on which the first handling lever 61 or the second handling lever 62 is supported are moved at the cam pins 70c and 71c thereof relatively within the rear straight portions 77a of the lever cam holes 77 of the slider 76 toward the rear inclined portions 77b, also the first handling lever 61 and the second handling lever 62 are not pivoted (refer to FIG. 26).

Also the supporting arms 74 and 75 are not pivoted because the operated pieces 74a and 75a thereof are slidably moved on the no-operation edge 76e of the slider 76 (refer to FIG. 27).

The pulley supporting member 93 remains held at the left side end of the range of movement thereof because the cam engaging shaft 93a is moved relatively within the first straight portion 78a of the plate cam hole 78 of the slider 76 toward the inclined portion 78b (refer to FIG. 26).

The base unit 95 remains held at the right side end of the range of movement thereof because the cam engaging pin 96a is moved relatively within the inner side no-displacement portion 52a of the unit cam groove 52 of the cam gear 49 toward the displacement portion 52b (refer to FIG. 26).

Figure 29:
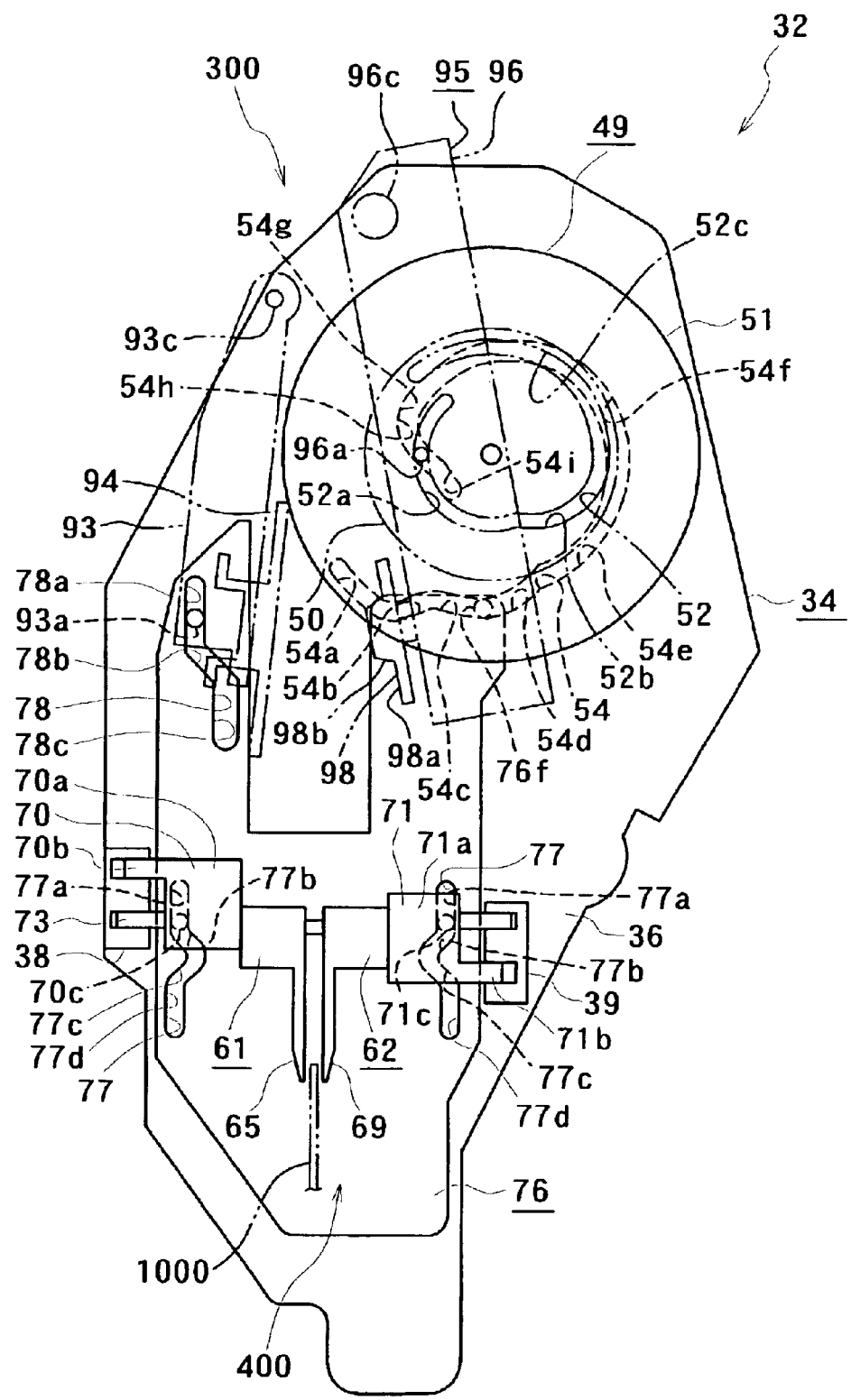
FIG. 29 is a schematic plan view showing first and second handling levers pivoted to a position at which a disk-type recording medium can be taken out from the rotatable tray through further rotation of the cam gear from the position shown in FIG. 26.

When the driving motor 43 is rotated to rotate the cam gear 49 further, the sliding shaft 76f of the slider 76 is moved relatively within the outer side no-operation portion 54c of the slider cam groove 54 of the cam gear 49 from the first operation portion 54b toward the second operation portion 54d and the rearward movement of the slider 76 is stopped (refer to FIG. 29).

At this time, the cam pins 70c and 71c of the holding levers 70 and 71 engage with the front end portions of the rear straight portions 77a of the lever cam holes 77 of the slider 76 respectively, and the first handling lever 61 and the second handling lever 62 are not moved in the leftward or rightward direction (refer to FIG. 29). The supporting arms 74 and 75 are held at their initial position because the operated pieces 74a and 75a thereof engage with the no-operation edge 76e of the slider 76 (refer to FIG. 30). The lock lever 82 remains locking the rotatable tray 7 since the rear operated pieces 85 engage with the rear ends of the horizontal faces 79b of the rear operating projections 79 and the front operated pieces 86 engage immediately forwardly of the front inclined faces 79c (refer to FIG. 30). The pulley supporting member 93 remains held at the left side end of the range of movement thereof because the cam engaging shaft 93a engages with the portion rather near the front end of the first straight portion 78a of the plate cam hole 78 of the slider 76 (refer to FIG. 29).

Figure 30:
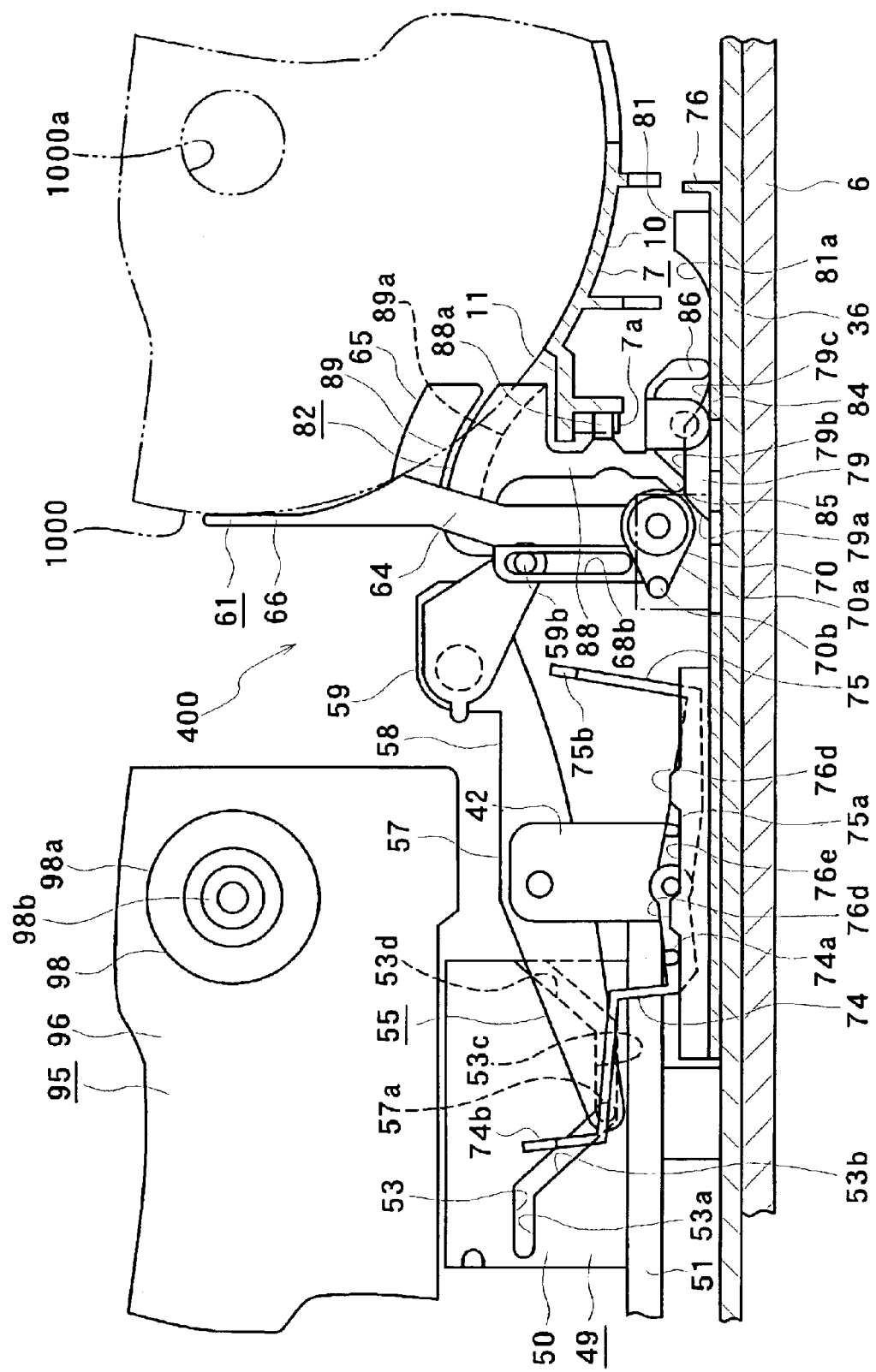
FIG. 30 is a schematic side elevational view showing the first and second handling levers pivoted through further rotation of the cam gear from the position shown in FIG. 27.

When the cam gear 49 is rotated and the sliding shaft 76f of the slider 76 is moved relatively within the outer side no-operation portion 54c as described above, the arm lever 55 is moved at the engaging shaft 57a thereof relatively within the first inclined portion 53b of the lever cam groove 53 of the cam gear 49 from the intermediate side horizontal portion 53a toward the lower side horizontal portion 53c (refer to FIG. 30). Accordingly, the arm lever 55 is pivoted in a direction in which the second arm portion 58 is moved substantially upwardly, whereupon the engaging pin 59b of the connection lever 59 is moved substantially upwardly and the second handling lever 62 inclined to the rear side is pressed forwardly. The second handling lever 62 pressed forwardly is pivoted integrally with the first handling lever 61 in a direction in which the handling portions 65 and 69 are moved substantially forwardly until they come to a vertical position (refer to FIG. 30). Accordingly, the handling portion 65 and the handling portion 69 are positioned on the opposite sides to each other with an outer periphery of the disk-type recording medium 1000 positioned therebetween. The engaging pin 59b of the connection lever 59 is moved to a position of the engaging hole 68b of the second handling lever 62 rather near to the upper end (refer to FIG. 30).

At this time, the base unit 95 remains held at the right side end of the range of movement thereof because the cam engaging pin 96a is moved relatively within the inner side no-displacement portion 52a of the unit cam groove 52 of the cam gear 49 toward the displacement portion 52b (refer to FIG. 29).

When the driving motor 43 is rotated to rotate the cam gear 49 further, the sliding shaft 76f of the slider 76 is moved relatively within the second operation portion 54d of the slider cam groove 54 of the cam gear 49 from the outer side no-operation portion 54c toward the intermediate side no-operation portion 54e, whereupon the slider 76 is moved rearwardly again (refer to FIG. 31). As the slider 76 moves rearwardly, the lock lever 82 is moved at the rear operated pieces 85 thereof on the horizontal faces 79b of the rear operating projections 79 until they come to substantially central portions in the forward and rearward direction, and is moved at the front operated pieces 86 thereof on front side portions of the rear operating projections 79 (refer to FIGS. 32 and 33). Accordingly, the lock lever 82 remains held in the vertical position and the rotatable tray 7 is held in the locked condition.

Figure 31:
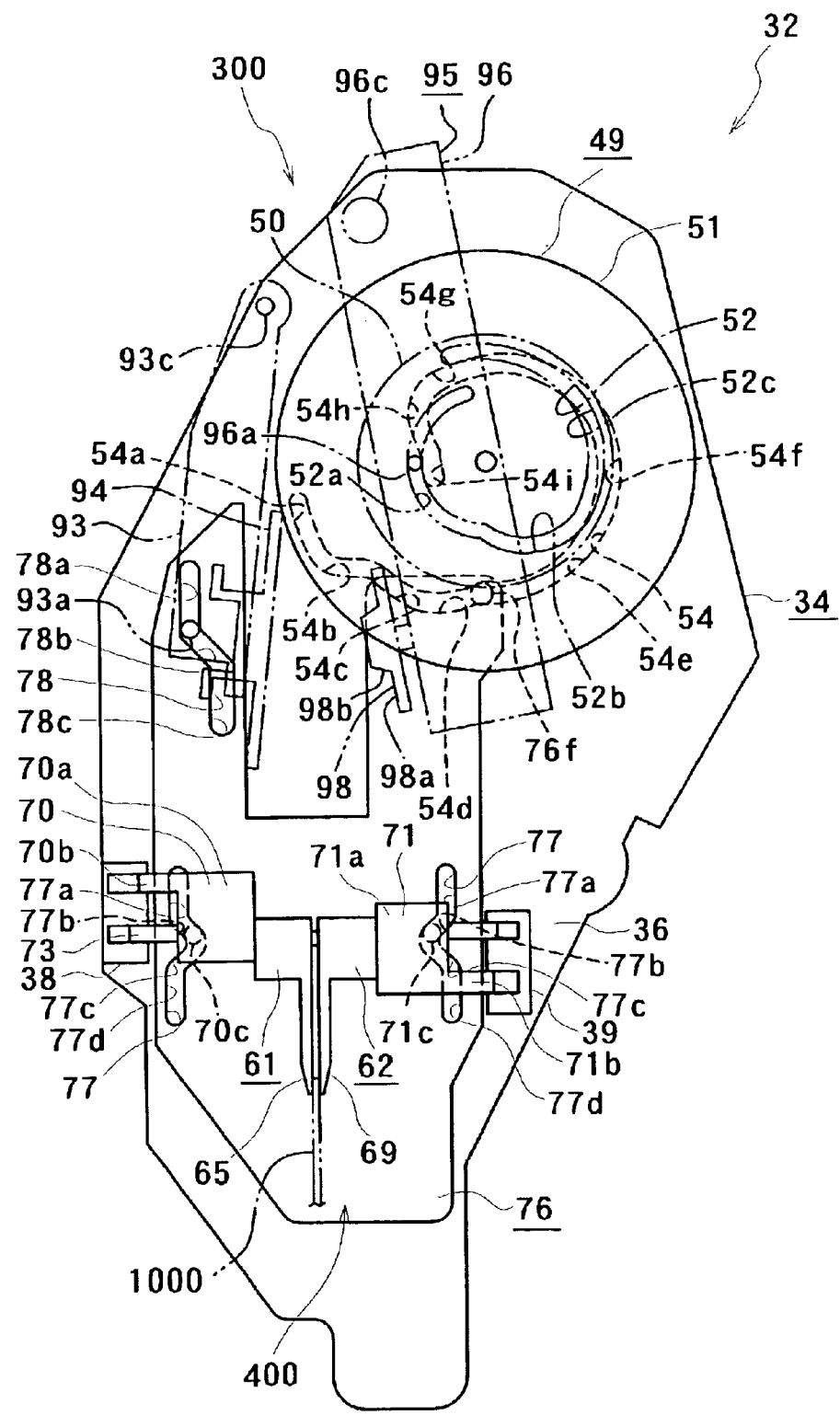
FIG. 31 is a schematic plan view showing a disk-type recording medium held by and between the first and second handling levers through further rotation of the cam gear from the position shown in FIG. 29.

When the slider 76 moves rearwardly, the holding levers 70 and 71 on which the first handling lever 61 or the second handling lever 62 is supported are relatively moved at the cam pins 70c and 71c thereof within the rear inclined portions 77b of the lever cam holes 77 of the slider 76 from the rear straight portions 77a to the front inclined portions 77c (refer to FIG. 31). Accordingly, the first handling lever 61 and the second handling lever 62 are moved toward each other until the outer periphery of the disk-type recording medium 1000 accommodated in the accommodation portion 14 positioned at the disk takeout position is held by and between the handling portions 65 and 69. Thereupon, since the first handling lever 61 and the second handling lever 62 are biased in the mutually approaching direction by the compression coil springs 72 disposed in the outer fitting supporting portions 70a and 71a of the holding levers 70 and 71, the disk-type recording medium 1000 is held with high holding force by the handling portions 65 and 69 and prevented from being let off from the handling portions 65 and 69.

Figure 32:
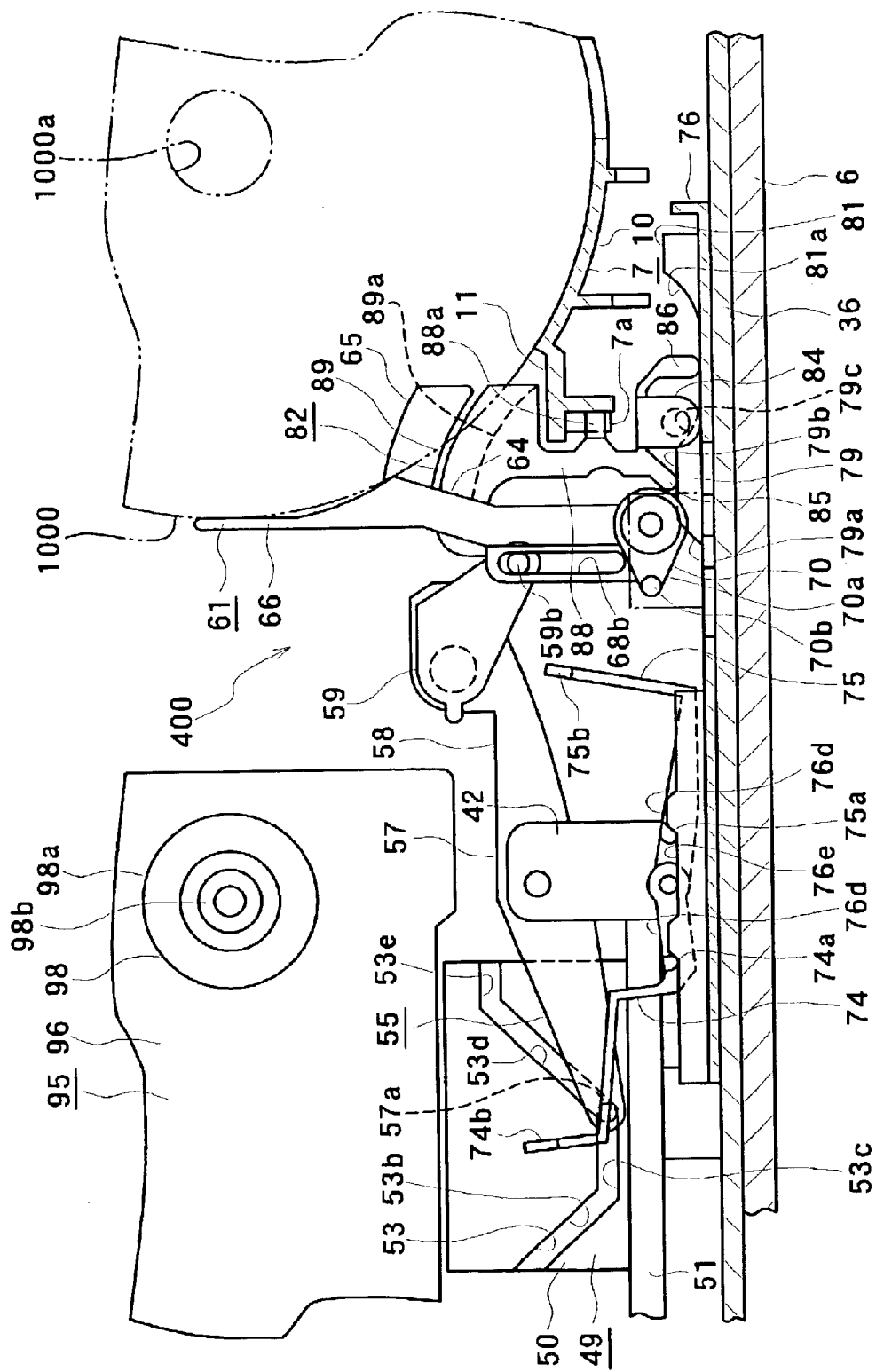
FIG. 32 is a schematic side elevational view showing the disk-type recording medium held by and between the first and second handling levers through further rotation of the cam gear from the position shown in FIG. 30.
Figure 33:
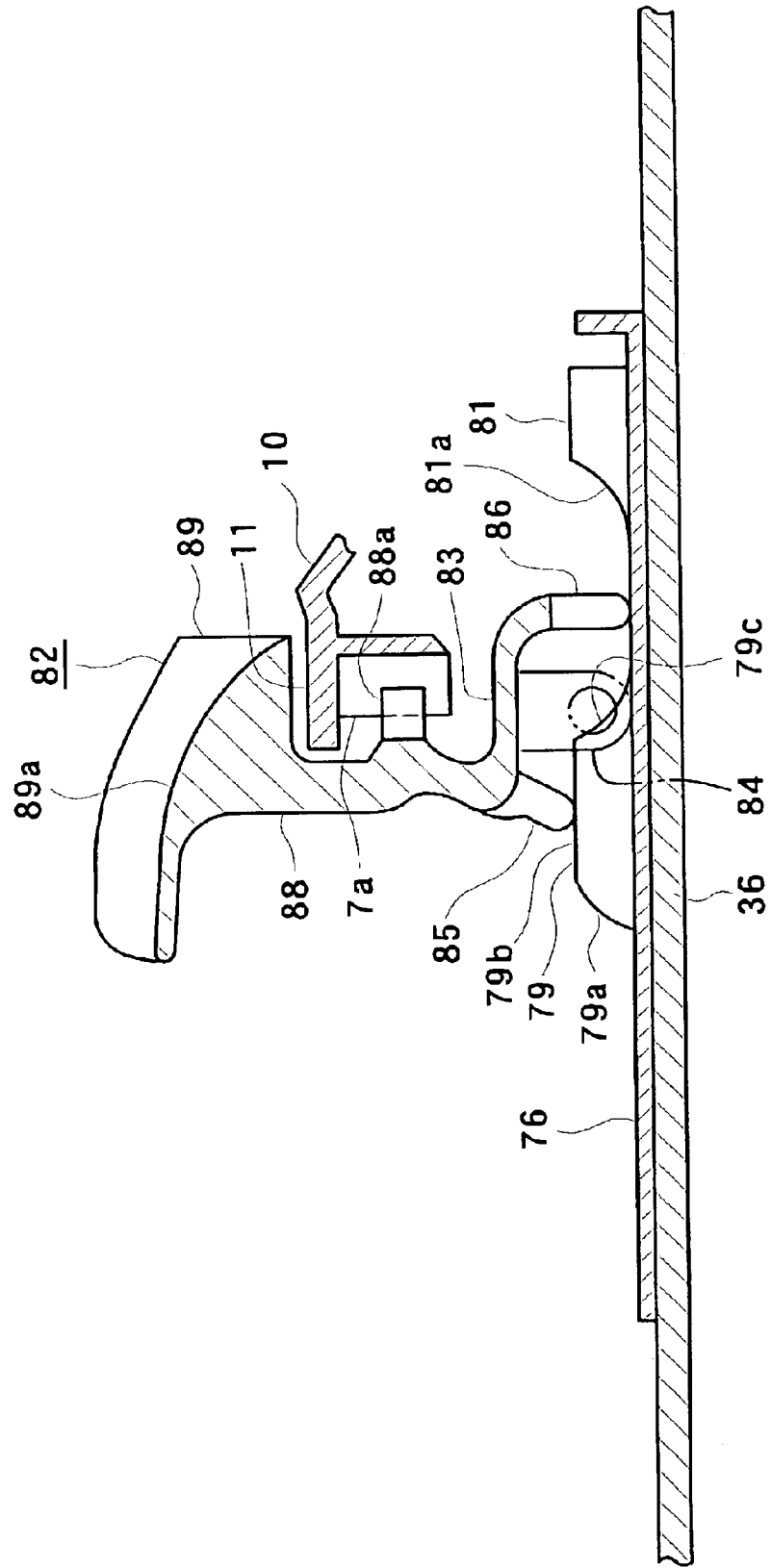
FIG. 33 is a schematic enlarged side elevational sectional view showing the rotatable tray locked by the lock lever when the slider is further rotated rearwardly from the position shown in FIG. 28.

As described above, even if the cam gear 49 is rotated and the sliding shaft 76f of the slider 76 is moved relatively within the second operation portion 54d, the arm lever 55 is not pivoted because the engaging shaft 57a is moved relatively within the lower side horizontal portion 53c of the lever cam groove 53 of the cam gear 49 toward the second inclined portion 53d (refer to FIG. 32).

Also the supporting arms 74 and 75 are not pivoted because the operated pieces 74a and 75a are slidably moved on the no-operation edge 76e of the slider 76 (refer to FIG. 32).

The pulley supporting member 93 remains held at the left side end of the range of movement thereof because the cam engaging shaft 93a is moved relatively within the first straight portion 78a of the plate cam hole 78 of the slider 76 toward the inclined portion 78b (refer to FIG. 31).

The base unit 95 remains held at the right side end of the range of movement thereof because the cam engaging pin 96a is moved relatively within the inner side no-displacement portion 52a of the unit cam groove 52 of the cam gear 49 toward the inclined portion 52b (refer to FIG. 31).

Figure 34:
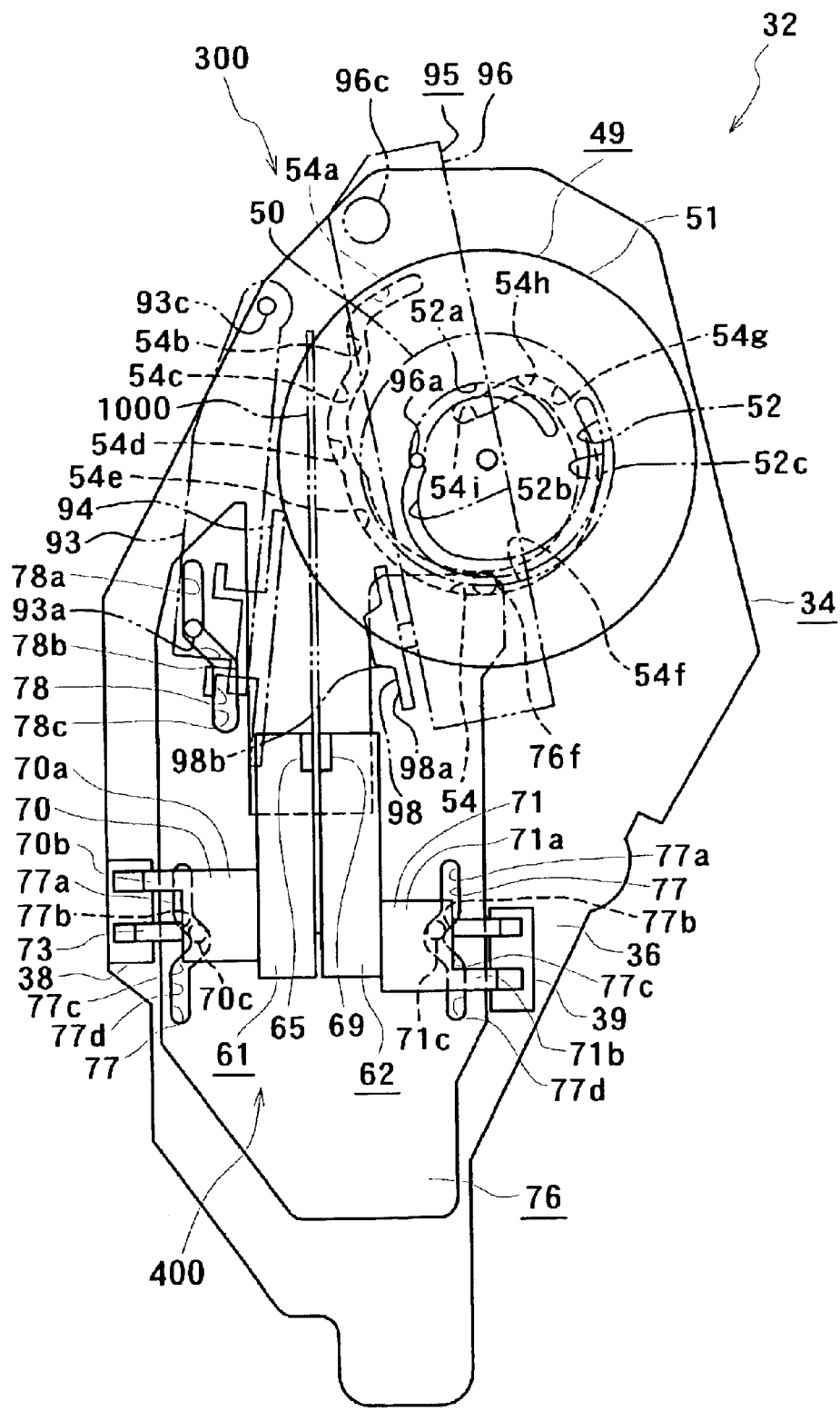
FIG. 34 is a schematic plan view showing the disk-type recording medium taken out by the first and second handling levers through further rotation of the cam gear from the position shown in FIG. 31.

When the driving motor 43 is rotated to rotate the cam gear 49 further, the sliding shaft 76f of the slider 76 is relatively moved within the intermediate side no-operation portion 54e of the slider cam groove 54 of the cam gear 49 from the second operation portion 54d toward the third operation portion 54f and the rearward movement of the slider 76 is stopped (refer to FIG. 34).

At this time, the cam pins 70c and 71c of the holding levers 70 and 71 engage with the lever cam holes 77 of the slider 76 in the proximity of intersecting points between the rear inclined portions 77b and the front inclined portions 77c and the first handling lever 61 and the second handling lever 62 are not moved in the leftward or rightward direction (refer to FIG. 34). Since the supporting arms 74 and 75 engage at the operated pieces 74a and 75a with the no-operation edge 76e of the slider 76, they remain held in their initial state (refer to FIG. 35). Since the lock lever 82 engages at the rear operated pieces 85 thereof with substantially central portions in the forward and rearward direction of the horizontal faces 79b of the rear operating projections 79 and at the front operated pieces 86 thereof with the front sides of the front inclined faces 79c, it remains locking the rotatable tray 7 (refer to FIG. 35). The pulley supporting member 93 is held at the left side end of the range of movement thereof because the cam engaging shaft 93a thereof engages with the front end portion of the first straight portion 78a of the plate cam hole 78 of the slider 76 (refer to FIG. 34).

Figure 35:
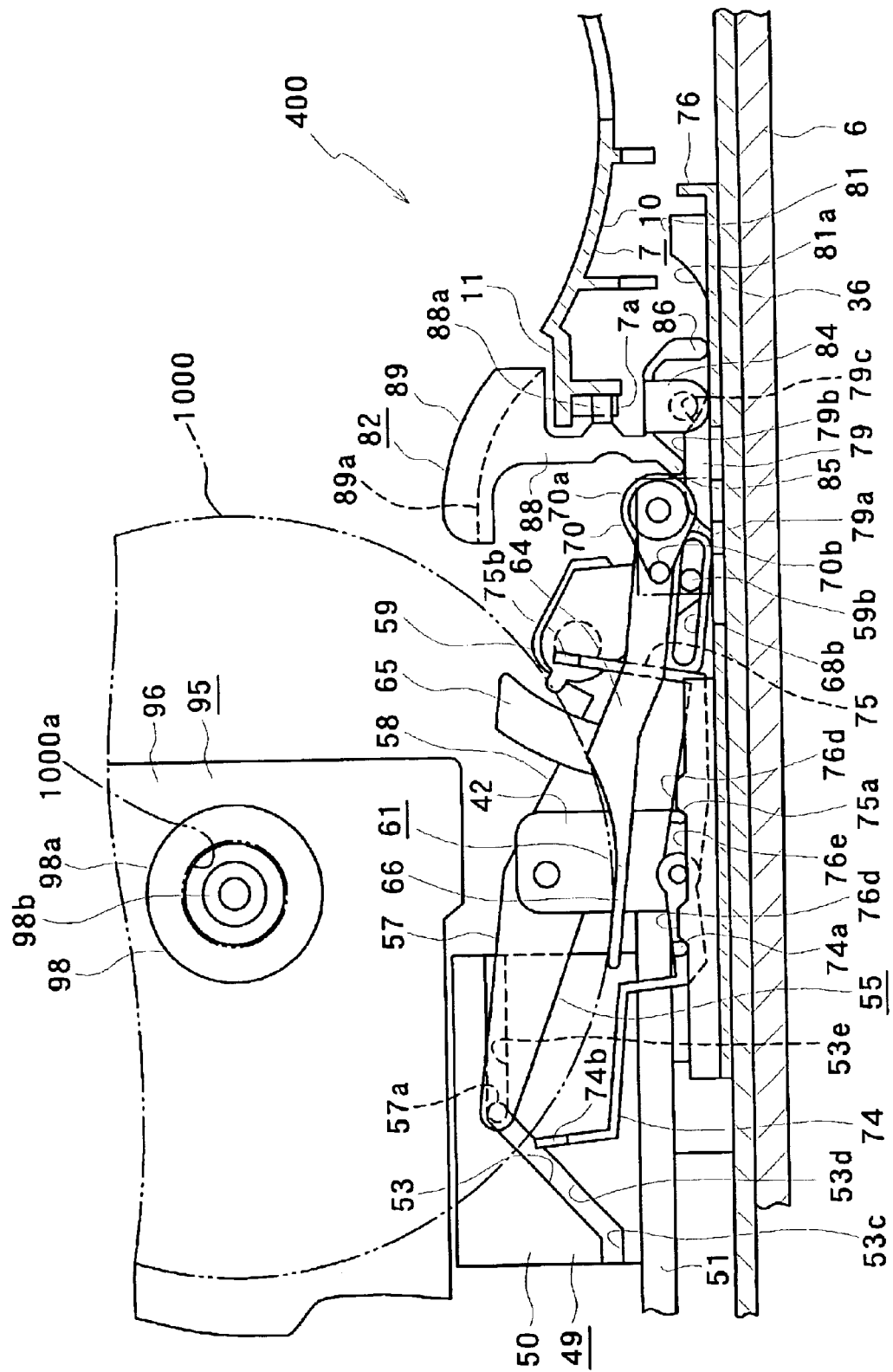
FIG. 35 is a schematic side elevational view showing the disk-type recording medium taken out by the first and second handling levers through further rotation of the cam gear from the position shown in FIG. 32.

When the cam gear 49 rotates and the sliding shaft 76f of the slider 76 moves relatively within the intermediate side no-operation portion 54e as described above, the engaging shaft 57a of the arm lever 55 is relatively moved within the second inclined portion 53d of the lever cam groove 53 of the cam gear 49 from the lower side horizontal portion 53c toward the first upper side horizontal portion 53e (refer to FIG. 35). Accordingly, the arm lever 55 is pivoted in a direction in which the second arm portion 58 is moved substantially downwardly and the engaging pin 59b of the connection lever 59 is moved substantially downwardly, whereupon the second handling lever 62 is inclined rearwardly from its vertical position. The second handling lever 62 is inclined rearwardly integrally with the first handling lever 61 until handling portions 65 and 69 are positioned on the rear side of the supporting portion 75b of the front side supporting arm 75 (refer to FIG. 35). When the first handling lever 61 and the second handling lever 62 are pivoted in this manner, the disk-type recording medium 1000 is taken out from the accommodation portion 14 by the handling portions 65 and 69. Thus, while the disk-type recording medium 1000 is guided at the lower side outer peripheral portion thereof by the guide groove 89a of the lock lever 82 and at the upper side outer peripheral portion thereof by the disk guide groove 92a of the disk guide member 92, it is moved to the recording and reproduction section 300 side together with the first handling lever 61 and the second handling lever 62 (refer to FIG. 35).

At this time, since the cam engaging pin 96a is relatively moved within the inner side no-displacement portion 52a of the unit cam groove 52 of the cam gear 49 toward the displacement portion 52b, the base unit 95 remains held at the right side end of the range of movement thereof (refer to FIG. 34).

As the driving motor 43 is rotated to rotate the cam gear 49 further, the sliding shaft 76f of the slider 76 is moved relatively within the third operation portion 54f of the slider cam groove 54 of the cam gear 49 from the intermediate side no-operation portion 54e toward the inner side no-operation portion 54g and the slider 76 is moved rearwardly again (refer to FIG. 36). When the sliding shaft 76f is moved to a substantially central portion of the third operation portion 54f, the operated pieces 74a and 75a of the supporting arms 74 and 75 ride on and are engaged with the operating projections 76d of the slider 76 (refer to FIG. 37). Accordingly, the supporting arm 74 and the supporting arm 75 are pivoted a little toward each other and the outer periphery of the disk-type recording medium 1000 held by and between the handling portion 65 of the first handling lever 61 and the handling portion 69 of the second handling lever 62 is inserted relatively into the recessed grooves of the supporting portions 74b and 75b (refer to FIG. 37).

When the outer periphery of the disk-type recording medium 1000 is inserted relatively into the recessed grooves of the supporting portions 74b and 75b in this manner, the disk-type recording medium 1000 is held at a position at which a center hole 1000a thereof corresponds to the centering projection 98b of the disk table 98 of the base unit 95. Accordingly, even if the center hole 1000a of the disk-type recording medium 1000 taken out from the accommodation portion 14 by the first handling lever 61 and the second handling lever 62 and moved to the recording and reproduction section 300 side is not at a position corresponding to the centering projection 98b of the disk table 98, the disk-type recording medium 1000 is held with certainty at a position at which the center hole 1000a thereof corresponds to the centering projection 98b of the disk table 98.

Figure 36:
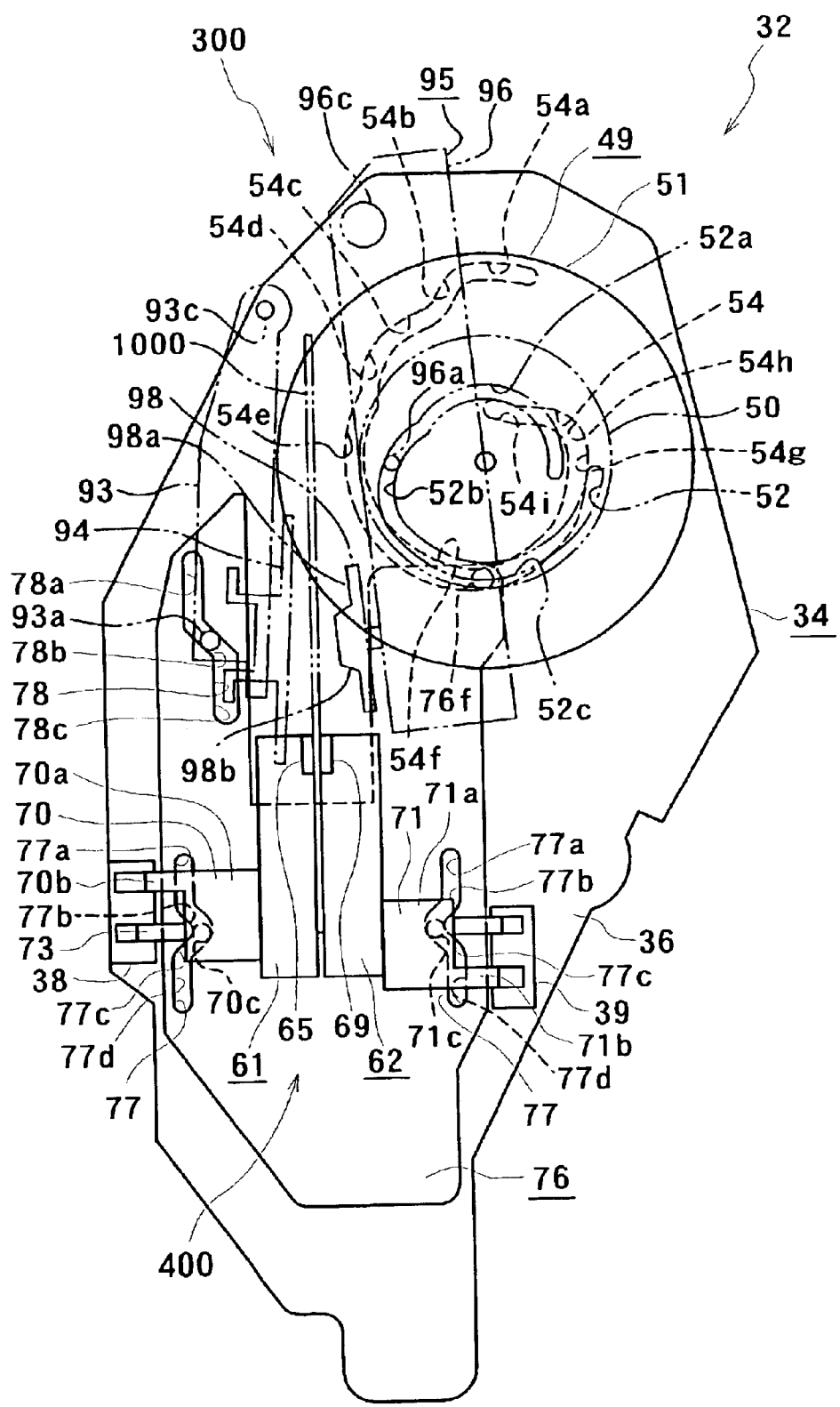
FIG. 36 is a schematic plan view showing the pulley supporting member and the base unit moved toward each other through further rotation of the cam gear from the position shown in FIG. 34.

As the slider 76 is moved rearwardly as described above, the pulley supporting member 93 is pivoted rightwardly from the left side end of the range of movement thereof, that is, in a direction in which the chucking pulley 94 approaches the disk table 98 of the base unit 95, because the cam engaging shaft 93a of the pulley supporting member 93 is relatively moved within the inclined portion 78b of the plate cam hole 78 of the slider 76 from the first straight portion 78a toward the second straight portion 78c (refer to FIG. 36).

The base unit 95 is pivoted leftwardly from the right side end of the range of movement thereof, that is, in a direction in which the disk table 98 approaches the chucking pulley 94 supported on the pulley supporting member 93, because the cam engaging pin 96a is moved relatively within the displacement portion 52b of the unit cam groove 52 of the cam gear 49 from the inner side no-displacement portion 52a toward the outer side no-displacement portion 52c by rotation of the cam gear 49 (refer to FIG. 36).

The cam pins 70c and 71c of the holding levers 70 and 71 on which the first handling lever 61 or the second handling lever 62 is supported are relatively moved along portions of the lever cam holes 77 of the slider 76 in the proximity of intersecting points between the rear inclined portions 77b and the front inclined portions 77c toward the front straight portions 77d. Accordingly, the handling portions 65 and 69 of the first handling lever 61 and the second handling lever 62 remain holding the disk-type recording medium 1000 therebetween (refer to FIG. 37).

Figure 37:
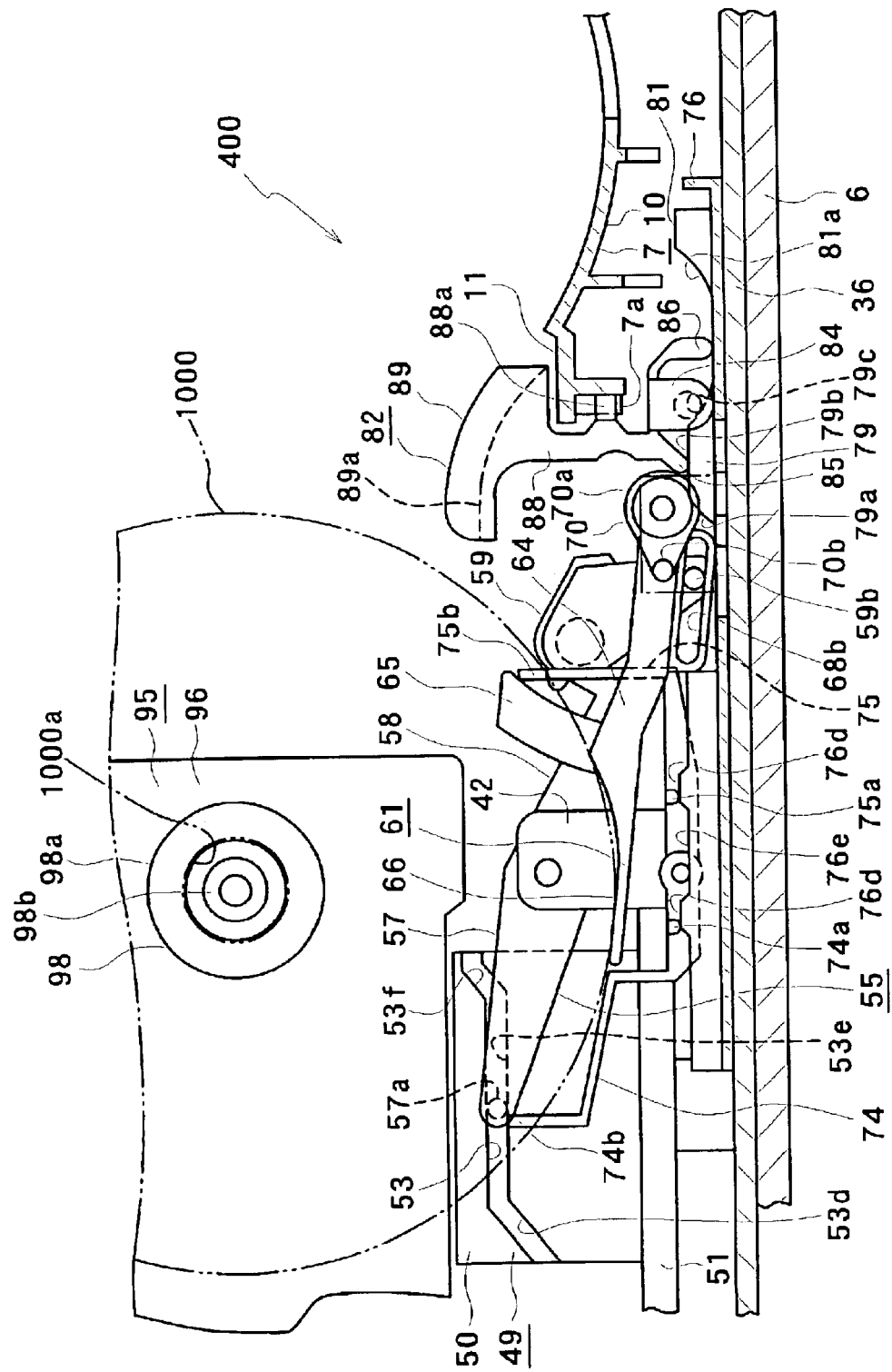
FIG. 37 is a schematic side elevational view showing the disk-type recording medium supported by a supporting arm through further rotation of the cam gear from the position shown in FIG. 35.

The arm lever 55 is not pivoted because the engaging shaft 57a is moved relatively within the first upper side horizontal portion 53e of the lever cam groove 53 of the cam gear 49 from the second inclined portion 53d toward the third inclined portion 53f (refer to FIG. 37).

Figure 38:
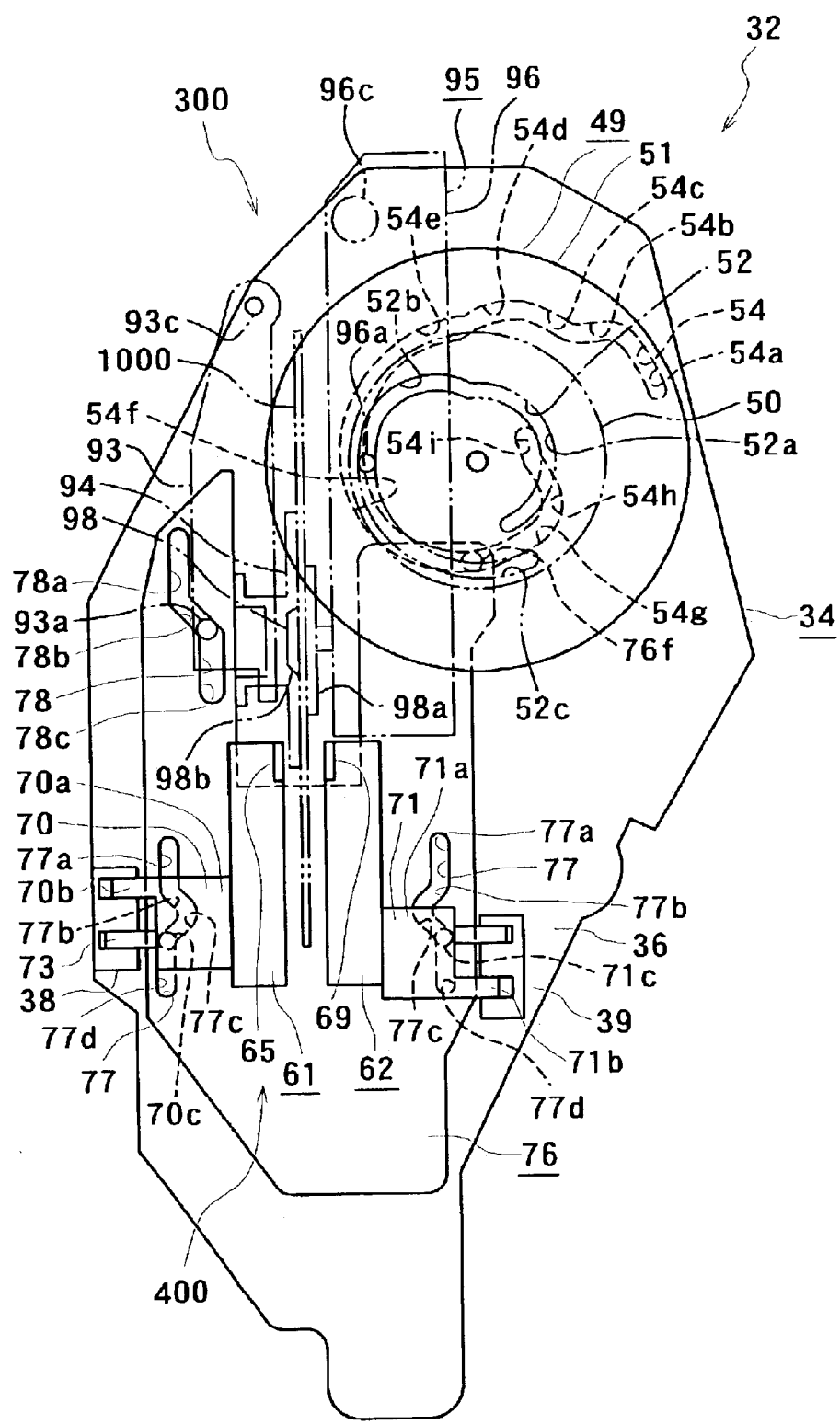
FIG. 38 is a schematic plan view showing the disk-type recording medium chucked and released from the holding by the handling levers through further rotation of the cam gear from the position shown in FIG. 36.
Figure 39:
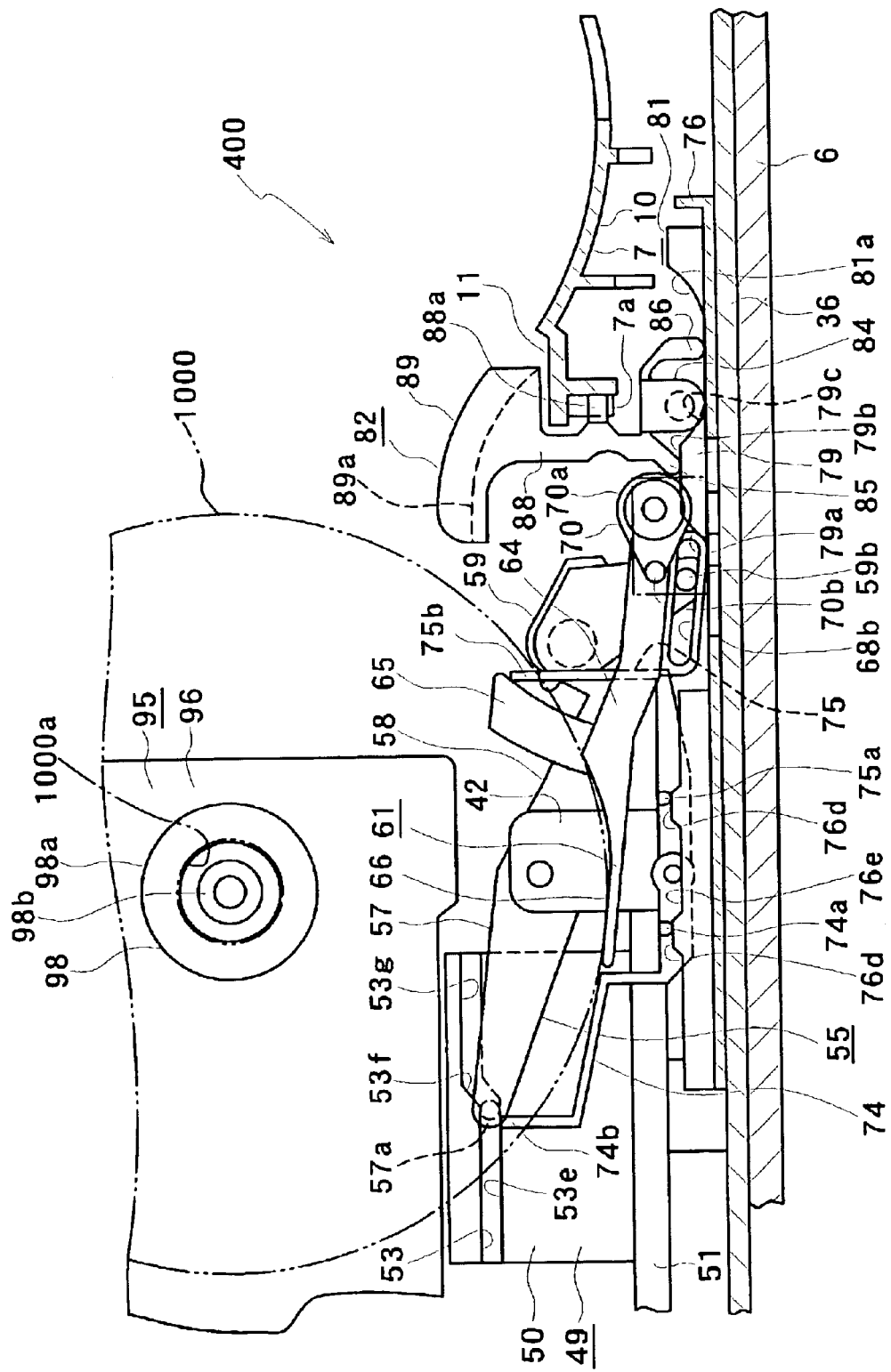
FIG. 39 is a schematic side elevational view showing the disk-type recording medium chucked through further rotation of the cam gear from the position shown in FIG. 37.
Figure 40:
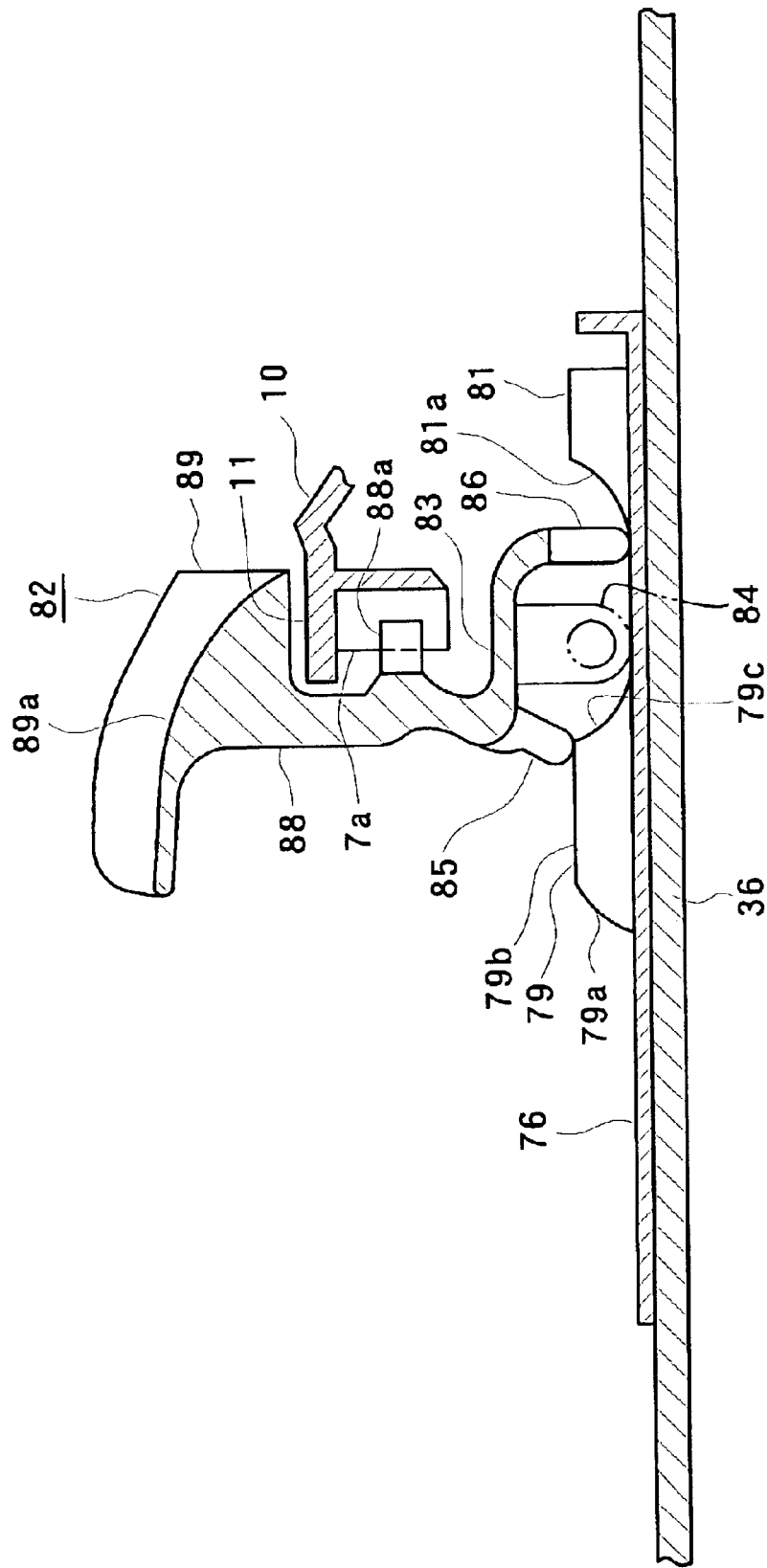
FIG. 40 is a schematic enlarged side elevational sectional view showing a part of the lock lever in a recording mode or a reproduction mode.

As the cam gear 49 is rotated further, the slider 76 is continuously moved rearwardly (refer to FIG. 38), and thereupon, the rear operated pieces 85 of the lock lever 82 are slidably moved on the horizontal faces 79b of the rear operating projections 79 to the front ends of the horizontal faces 79b while the front operated pieces 86 are slidably moved on the front portions of the rear operating projections 79 (refer to FIGS. 39 and 40). Accordingly, the lock lever 82 remains held in the vertical position and the rotatable tray 7 remains held in the locked state.

When the slider 76 is continuously moved rearwardly and the sliding shaft 76f is relatively moved in the third operation portion 54f of the slider cam groove 54 of the cam gear 49 in such a manner as described above, the pulley supporting member 93 is further pivoted rightwardly from the left side end of the range of movement thereof, that is, in a direction in which the chucking pulley 94 approaches the disk table 98 of the base unit 95, because the cam engaging shaft 93a is moved relatively within the inclined portion 78b of the plate cam hole 78 of the slider 76 toward the second straight portion 78c (refer to FIG. 38).

At this time, the base unit 95 is continuously pivoted leftwardly from the right side end of the range of movement thereof, that is, in a direction in which the disk table 98 approaches the chucking pulley 94 supported on the pulley supporting member 93, because the cam engaging pin 96a is continuously moved relatively within the displacement portion 52b of the unit cam groove 52 of the cam gear 49 toward the outer side no-displacement portion 52c by rotation of the cam gear 49 (refer to FIG. 38).

When the pulley supporting member 93 and the base unit 95 are pivoted in the mutually approaching directions in this manner, the centering projection 98b of the disk table 98 is inserted into the center hole 1000a of the disk-type recording medium 1000. Thereupon, the centering projection 98b is attracted to the magnet 94a attached to the chucking pulley 94, and consequently, the disk-type recording medium 1000 is held and chucked by and between the disk table 98 and the chucking pulley 94 (refer to FIG. 38).

At this time, the cam pins 70c and 71c of the holding levers 70 and 71 on which the first handling lever 61 or the second handling lever 62 is supported are relatively moved in the front inclined portions 77c of the lever cam holes 77 of the slider 76 from the rear inclined portions 77b toward the front straight portions 77d (refer to FIG. 38). Accordingly, the first handling lever 61 and the second handling lever 62 are moved away from each other, and the disk-type recording medium 1000 is released from the holding by the handling portions 65 and 69 (refer to FIG. 38).

As the slider 76 moves rearwardly, the operated pieces 74a and 75a of the supporting arms 74 and 75 are slidably moved on the operating projections 76d of the slider 76 (refer to FIG. 39).

The arm lever 55 is not pivoted because the engaging shaft 57a is relatively moved within the first upper side horizontal portion 53e of the lever cam groove 53 of the cam gear 49 toward the third inclined portion 53f.

Figure 41:
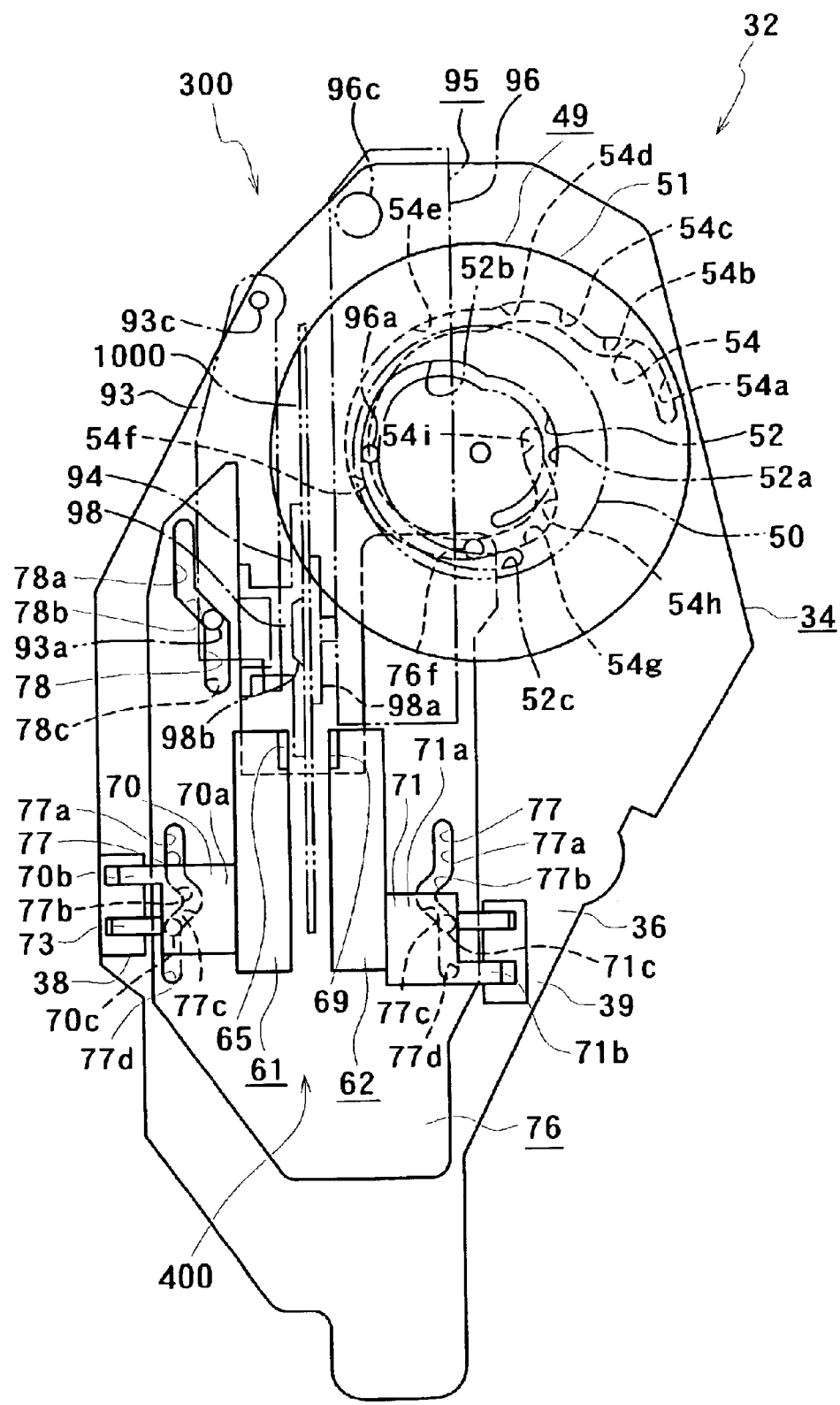
FIG. 41 is a schematic plan view showing the disk-type recording medium still held chucked through further rotation of the cam gear from the position shown in FIG. 38.

The cam gear 49 is rotated continuously, and the sliding shaft 76f of the slider 76 is relatively moved along an end portion of the third operation portion 54f of the slider cam groove 54 of the cam gear 49 adjacent the inner side no-operation portion 54g (refer to FIG. 41).

Figure 42:
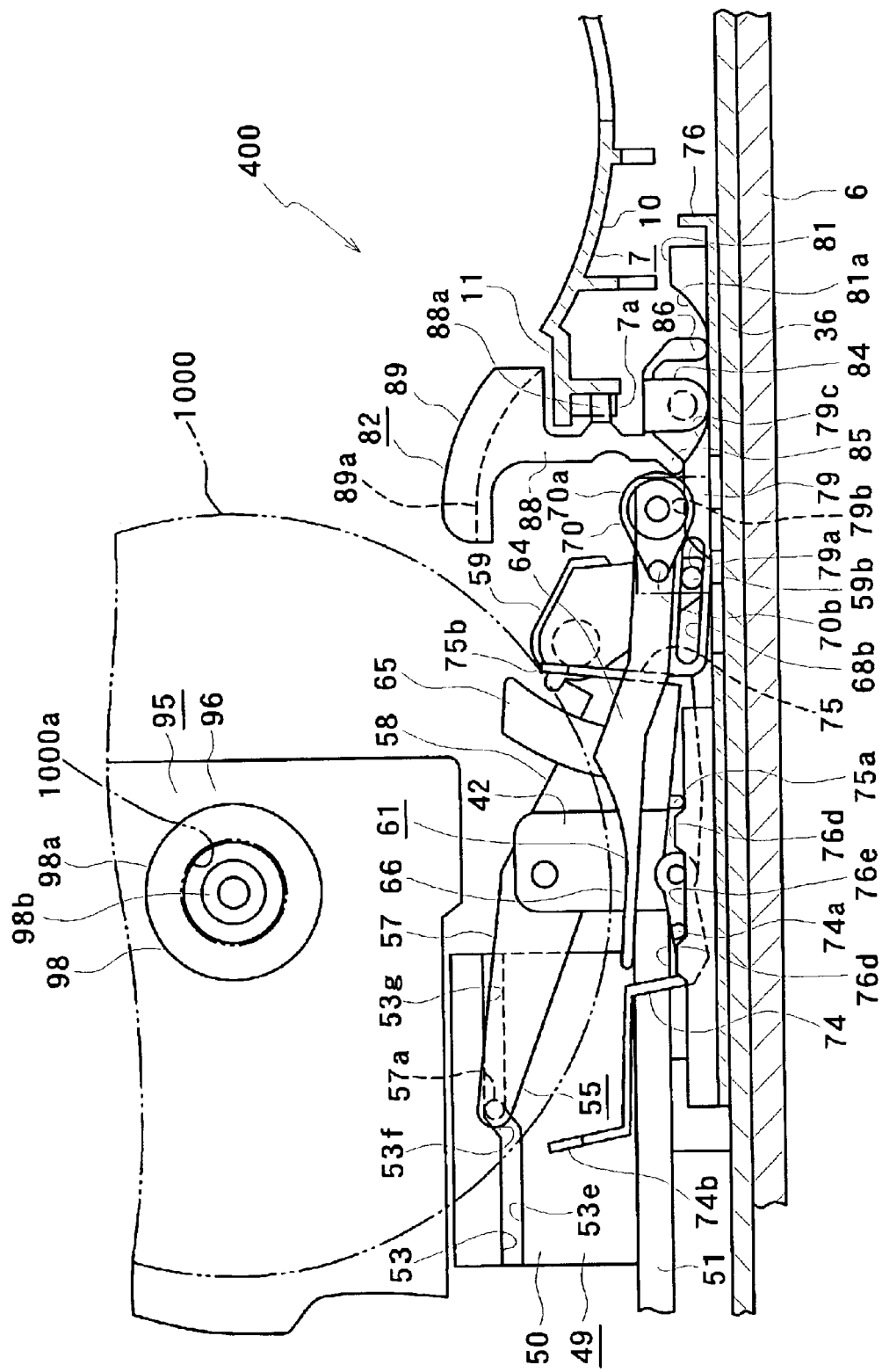
FIG. 42 is a schematic side elevational view showing the handling levers and the supporting lever spaced downwardly away from the disk-type recording medium through further rotation of the cam gear from the position shown in FIG. 39.

At this time, the engaging shaft 57a of the arm lever 55 is relatively moved in the third inclined portion 53f of the lever cam groove 53 of the cam gear 49 toward the second upper side horizontal portion 53g (refer to FIG. 42). Accordingly, the arm lever 55 is pivoted in a direction in which the second arm portion 58 is moved substantially downwardly, whereupon the engaging pin 59b of the connection lever 59 is moved substantially downwardly and the second handling lever 62 is pivoted in a direction in which it is spaced downwardly away from the disk-type recording medium 1000. The second handling lever 62 is pivoted to move substantially downwardly integrally with the first handling lever 61, and the supporting portion 66 of the first handling lever 61 is spaced downwardly away from the disk-type recording medium 1000 in the chucked state (refer to FIG. 42).

Simultaneously, by the rearward movement of the slider 76, the supporting arms 74 and 75 whose operated pieces 74a and 75a ride on the operating projections 76d of the slider 76 are engaged at the operated pieces 74a and 75a thereof with the no-operation edge 76e of the slider 76 and the supporting portions 74b and 75b are spaced downwardly away from the disk-type recording medium 1000 in the chucked state (refer to FIG. 42).

Since the supporting portion 66 of the first handling lever 61 and the supporting portions 74b and 75b of the supporting arms 74 and 75 are spaced downwardly away from the disk-type recording medium 1000 in the chucked state in this manner, the disk-type recording medium 1000 is placed into a state wherein it can rotate smoothly without contacting with any element of the disk takeout mechanism 400.

The pulley supporting member 93 is not pivoted because the cam engaging shaft 93a is relatively moved forwardly in the second straight portion 78c of the plate cam hole 78 of the slider 76 (refer to FIG. 41).

The base unit 95 is not pivoted because the cam engaging pin 96a is relatively moved in the direction opposite to the displacement portion 52b in the unit cam groove 52 of the unit cam groove 52 of the cam gear 49 (refer to FIG. 41).

At this time, if the recording mode or the reproduction mode is selected by the mode selection key, then rotation of the driving motor 43 is stopped and a recording operation or a reproduction operation of an information signal onto or from the disk-type recording medium 1000 is started. Such recording or reproduction of an information onto or from the disk-type recording medium 1000 is performed such that the spindle motor 97 of the base unit 95 is rotated to rotate the disk table 98, thereby rotating the disk-type recording medium 1000 and the optical pickup 99 is moved in a radial direction of the disk-type recording medium 1000 while a laser beam is irradiated upon a recording face of the disk-type recording medium 1000 through the objective lens 101a of the two-axis actuator 101.

In the recording mode and the reproduction mode described above, the rotatable tray 7 remains locked by the lock lever 82 (refer to FIG. 40).

If the exchange mode is selected by the mode selection key 4, then the driving motor 43 is further rotated to rotate the cam gear 49 continuously. When the cam gear 49 rotates further, the sliding shaft 76f of the slider 76 is moved relatively in the inner side no-operation portion 54g and then in the fourth operation portion 54h of the slider cam groove 54 of the cam gear 49 from the third operation portion 54f to the termination edge portion 54i. When the sliding shaft 76f is moved in the fourth operation portion 54h, the slider 76 is moved rearwardly again (refer to FIG. 43). When the slider 76 moves rearwardly, the rear operated pieces 85 of the lock lever 82 are slidably moved on the front inclined faces 79c of the rear operating projections 79 until the rear operated pieces 85 come to the front ends of the front inclined faces 79c while the front operated pieces 86 are slidably moved forwardly on the inclined faces 81a of the front operating projection 81 (refer to FIGS. 44 and 45). Accordingly, the lock lever 82 is placed into a state wherein it is inclined to the rear side, and the locking portion 88a is spaced away from the gear portion 7a of the rotatable tray 7 to cancel the locking of the rotatable tray 7 by the lock lever 82 (refer to FIGS. 44 and 45).

At this time, the chucked disk-type recording medium 1000 is positioned out of the locus of movement of the disk-type recording media 1000 accommodated in the accommodation portions 14 of the rotatable tray 7 upon rotation of the rotatable tray 7. Accordingly, the disk-type recording media 1000 accommodated in the accommodation portions 14 and the disk-type recording medium 1000 in the chucked state do not interfere with each other, and consequently, the rotatable tray 7 unlocked from the lock lever 82 can be rotated smoothly.

Figure 43:
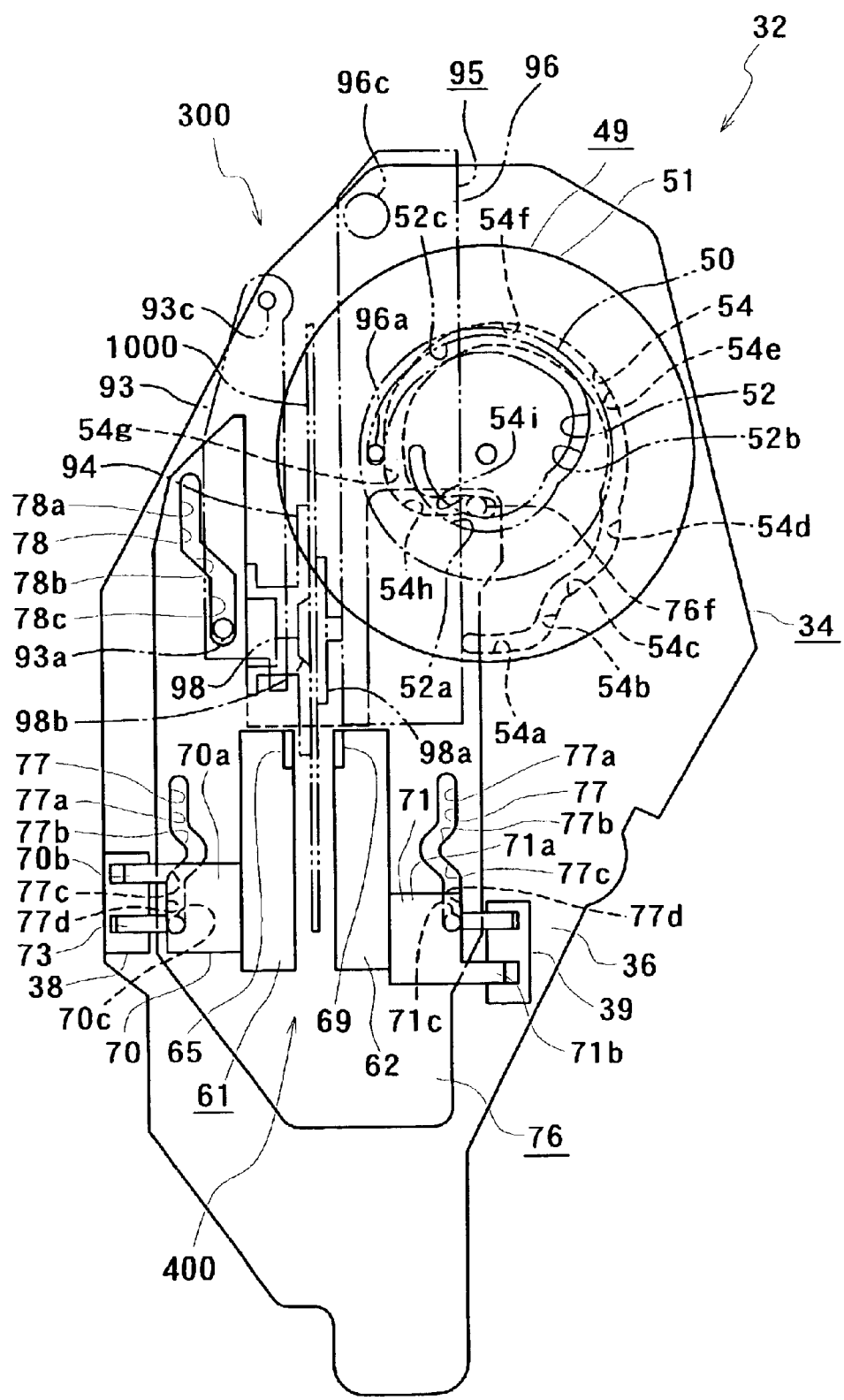
FIG. 43 is a schematic plan view showing a disk takeout mechanism upon completion of its operation through further rotation of the cam gear from the position shown in FIG. 41.

As the slider 76 is moved rearwardly as described above, the cam pins 70c and 71c of the holding levers 70 and 71 on which the first handling lever 61 or the second handling lever 62 is supported are relatively moved forwardly in the front straight portions 77d of the lever cam holes 77 of the slider 76 from the front inclined portions 77c (refer to FIG. 43). Accordingly, the first handling lever 61 and the second handling lever 62 are not moved in the leftward or rightward direction, and the handling portion 65 and the handling portion 69 remain spaced away from each other in the leftward and rightward direction.

Figure 44:
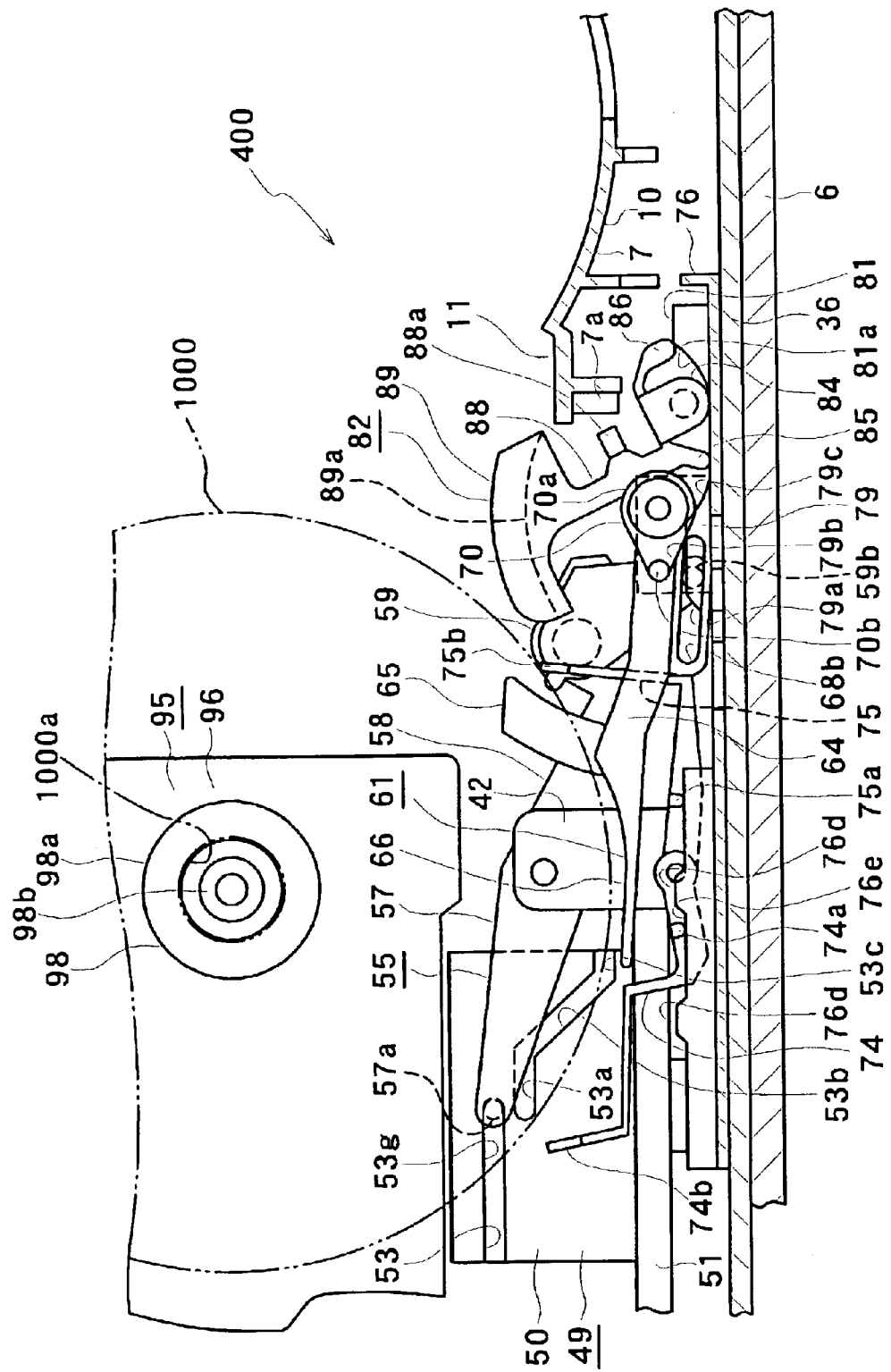
FIG. 44 is a schematic side elevational view showing the disk takeout mechanism upon completion of its operation through further rotation of the cam gear from the position shown in FIG. 42.
Figure 45:
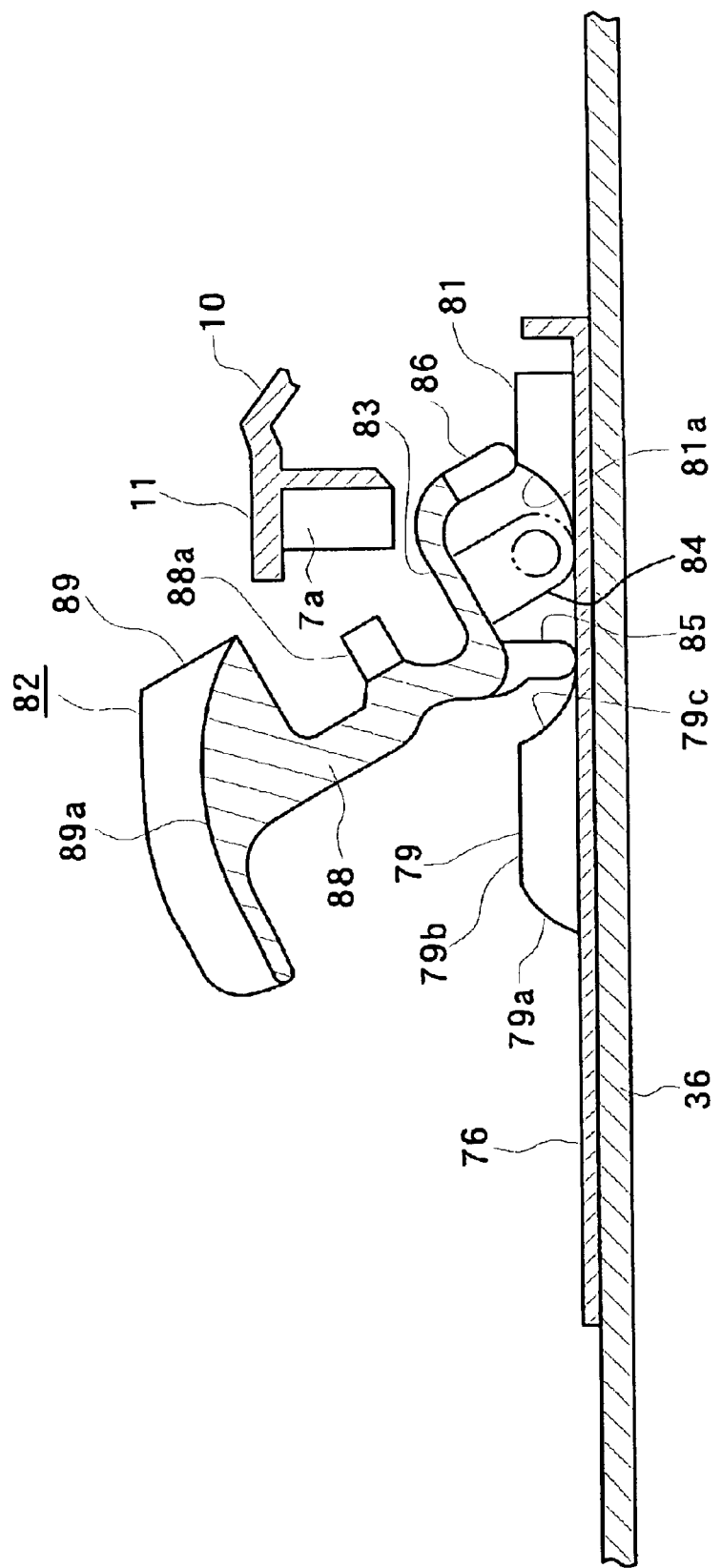
FIG. 45 is a schematic enlarged side elevational sectional view showing the lock lever in an exchange mode.

Even when the cam gear 49 is rotated in such a manner as described above, the arm lever 55 is not pivoted because the engaging shaft 57a is relatively moved in the direction opposite to the third inclined portion 53f in the second upper side horizontal portion 53g of the lever cam groove 53 of the cam gear 49 (refer to FIG. 44).

Also the supporting arms 74 and 75 are not pivoted because the operated pieces 74a and 75a thereof are slidably moved on the no-operation edge 76e of the slider 76 (refer to FIG. 44).

The pulley supporting member 93 is not pivoted because the cam engaging shaft 93a is relatively moved forwardly in the second straight portion 78c of the plate cam hole 78 of the slider 76 (refer to FIG. 43).

The base unit 95 is not pivoted because the cam engaging pin 96a is moved relatively in the opposite direction to the displacement portion 52b in the outer side no-displacement portion 52c of the unit cam groove 52 of the cam gear 49 (refer to FIG. 43).

The driving motor 43 is stopped when the sliding shaft 76f of the slider 76 reaches the termination edge portion 54i of the slider cam groove 54 of the cam gear 49 (refer to FIG. 43).

The state wherein the rotatable tray 7 is released from the locking by the lock lever 82 while the disk-type recording medium 1000 is chucked by the chucking pulley 94 and the disk table 98 as described above is the exchange mode wherein recording or reproduction of an information signal onto or from the disk-type recording medium 1000 can be performed and accommodation, takeout or replacement of the disk-type recording media 1000 into, from or between the accommodation portions 14 of the rotatable tray 7 can be performed.

If the driving motor 43 is rotated in the opposite direction to that described above in the exchange mode, then the disk-type recording medium 1000 in the chucked state is taken out from the recording and reproduction section 300 and transported to an accommodation portion 14 by the disk takeout mechanism 400. Since this operation of the disk takeout mechanism 400 is operation reverse to that for transporting the disk-type recording medium 1000 from the accommodation portion 14 to the recording and reproduction section 300, it is described simply below.

The slider 76 is moved from the rear side end of the range of movement to the front side end of the range of movement, thereby restoring the initial state thereof (refer to FIG. 23).

The arm lever 55 is moved, as the cam gear 49 is rotated in the counterclockwise direction as viewed in plan, relatively from the second upper side horizontal portion 53g to the intermediate side horizontal portion 53a of the lever cam groove 53 of the cam gear 49, thereby restoring the initial state thereof (refer to FIG. 24).

The connection lever 59 is operated by the operation of the arm lever 55, thereby restoring the initial state thereof (refer to FIG. 24).

The holding levers 70 and 71 on which the first handling lever 61 or the second handling lever 62 is supported restore the initial state thereof because the cam pins 70c and 71c are moved from the front ends of the front straight portions 77d to the rear ends of the rear straight portions 77a of the lever cam holes 77 of the slider 76 through the forward movement of the slider 76 (refer to FIG. 23).

The first handling lever 61 and the second handling lever 62 are operated by the movements of the connection lever 59 and the holding levers 70 and 71 and restore their initial state wherein the arm portions 64 and 68 are inclined a little to the rear side (refer to FIG. 24). When the disk-type recording medium 1000 is held by and between the handling portions 65 and 69 of the first handling lever 61 and the second handling lever 62 and taken out from the recording and reproduction section 300, it is lifted while being supported from below by the supporting portion 66.

The supporting arms 74 and 75 are pivoted away from each other by the forward movement of the slider 76, thereby restoring their initial state (refer to FIG. 24).

The lock lever 82 is operated, by the forward movement of the slider 76, from the state wherein the front operated pieces 86 engage with the front ends of the inclined faces 81a of the front operating projections 81 to the state wherein the rear operated pieces 85 engage with portions immediately rearwardly of the rear operating projections 79, thereby restoring its initial state wherein it is inclined a little to the rear side (refer to FIGS. 24 and 25). Accordingly, the locking portion 88a is spaced outwardly away from the rotatable tray 7, thereby canceling the locking of the rotatable tray 7 (refer to FIGS. 24 and 25).

The pulley supporting member 93 is moved to the left side end of the range of movement thereof because the cam engaging shaft 93a is relatively moved from the front end of the second straight portion 78c to the rear end of the first straight portion 78a of the plate cam hole 78 of the slider 76 by the forward movement of the slider 76 (refer to FIG. 23).

The base unit 95 is moved to the right side end of the range of movement thereof because the cam engaging pin 96a is relatively moved from the outer side no-displacement portion 52c to the inner side no-displacement portion 52a of the unit cam groove 52 of the cam gear 49 by the rotation of the cam gear 49 in the counterclockwise direction (refer to FIG. 23).

Consequently, the chucked state of the disk-type recording medium 1000 by the chucking pulley 94 and the disk table 98 is cancelled.

It is to be noted that, when the recording mode or the reproduction mode is set, the operation of the disk takeout mechanism 400 described above is started from its state in the recording mode or the reproduction mode, and the disk-type recording medium 1000 is taken out from the recording and reproduction section 300 and transported to and accommodated into an accommodation portion 14.

In the disk changer 1, since it includes the lock lever 82 which locks the rotatable tray 7 during transportation of the disk-type recording medium 1000 by the disk takeout mechanism 400 and can cancel the locking of the rotatable tray 7 when the disk-type recording medium 1000 is transported to the recording and reproduction section 300 as described above, a taking out operation of the disk-type recording medium 1000 from the rotatable tray 7 or the recording and reproduction section 300 by the disk takeout mechanism 400 and an accommodation operation of the disk-type recording medium 1000 into an accommodation portion 14 are not disturbed at all. Further, when recording or reproduction of an information signal onto or from a disk-type recording medium 1000 is proceeding, accommodation, takeout and replacement of another disk-type recording medium 1000 into, from or to an accommodation portion 14. Consequently, improvement in the convenience in use of the disk changer 1 can be anticipated.

Now, different operations of the disk changer 1 when it is used are described.

When it is intended to perform recording onto or reproduction from a desired disk-type recording medium 1000, if the disk-type recording medium 1000 is not accommodated in an accommodation portion 14 of the rotatable tray 7, then the door 3 is pivoted to open the disk insertion opening 2a of the outer housing 2 and the disk-type recording medium 1000 is accommodated into an accommodation portion 14, and then the door 3 is pivoted back to close up the disk insertion opening 2a of the outer housing 2. Then, the registration key 4 is operated to register contents recorded on the disk-type recording medium 1000 such as title information and register address information of the accommodation portion 14 into which the disk-type recording medium 1000 has been accommodated. Then, if the registered address of the accommodation portion 14 is inputted by means of the inputting keys 4 to perform, for example, reproduction, then the first reproduction key 4 or the second reproduction key 4 is operated.

On the other hand, if the disk-type recording medium 1000 for which recording or reproduction is to be performed is already accommodated in an accommodation portion 14, then the registered address of the accommodation portion 14 is inputted by means of the inputting keys 4, and, for example, if it is intended to perform reproduction, the first reproduction key 4 or the second reproduction key 4 is operated.

The first reproduction key 4 is provided to use the recording and reproduction section 300 provided on the left side mechanism unit 32 to perform reproduction of a disk-type recording medium 1000 while the second reproduction key 4 is provided to use the recording and reproduction section 300 provided on the right side mechanism unit 32 to perform reproduction of a disk-type recording medium 1000.

If the first reproduction key 4 or the second reproduction key 4 is operated, then the rotatable tray 7 is rotated in a predetermined direction, for example, in the clockwise direction as viewed in plan. When the rotatable tray 7 is rotated, the addresses of the accommodation portions 14 are successively detected by the address detection section 24 while presence or absence of the disk-type recording media 1000 in the accommodation portions 14 is detected by the disk detection section 25.

If the address of the accommodation portion 14 in which the disk-type recording medium 1000 to be reproduced is accommodated is detected and it is detected that a disk-type recording medium 1000 is accommodated in the accommodation portion 14 by the address detection section 24 and the disk detection section 25, respectively, then the rotatable tray 7 is continuously rotated until the accommodation portion 14 in which the disk-type recording medium 1000 is accommodated comes to the disk takeout position at which the disk-type recording medium 1000 can be taken out by one of the disk takeout mechanisms 400 based on results of the detection.

If, for example, the first reproduction key 4 has been operated, then when the address of the accommodation portion 14 in which the disk-type recording medium 1000 to be reproduced is accommodated is detected and it is detected that a disk-type recording medium 1000 is accommodated in the accommodation portion 14, then the rotatable tray 7 having been rotated in the clockwise direction is reversed and is now rotated in the counterclockwise direction. Then, the rotatable tray 7 is rotated until the disk-type recording medium 1000 comes to the first disk takeout position at which the disk-type recording medium 1000 is taken out by the disk takeout mechanism 400 of the left side mechanism unit 32. On the other hand, if the second reproduction key 4 has been operated, then when the address of the accommodation portion 14 in which the disk-type recording medium 1000 to be reproduced is accommodated is detected and it is detected that a disk-type recording medium 1000 is accommodated in the accommodation portion 14, then the rotatable tray 7 having been rotated in the clockwise direction is continuously rotated in the clockwise direction. Consequently, the rotatable tray 7 is rotated until the disk-type recording medium 1000 comes to the second disk takeout position at which the disk-type recording medium 1000 is taken out by the disk takeout mechanism 400 of the right side mechanism unit 32.

When the disk-type recording medium 1000 comes to the first disk takeout position or the second disk takeout position, the pertaining disk takeout mechanism 400 is operated to transport the disk-type recording medium 1000 to the recording and reproduction section 300, in which the disk-type recording medium 1000 is chucked by the chucking pulley 94 and the disk table 98 as described hereinabove.

After the disk-type recording medium 1000 is chucked by the chucking pulley 94 and the disk table 98, the spindle motor 97 is rotated to rotate the disk table 98, thereby rotating the disk-type recording medium 1000 while the optical pickup 99 is moved in a radial direction of the disk-type recording medium 1000. Further, a laser beam is irradiated upon the recording face of the disk-type recording medium 1000 through the objective lens 101*a* of the two-axis actuator 101 to effect reproduction of an information signal recorded on the disk-type recording medium 1000.

If reproduction of the information signal from the disk-type recording medium 1000 comes to an end or the stop key 4 is operated during such reproduction, then the rotation of the spindle motor 97 is stopped and the driving of the optical pickup 99 is stopped. Then, the disk-type recording medium 1000 is taken out from the recording and reproduction section 300 by the disk takeout mechanism 400 and then accommodated back into the accommodation portion 14 in which it was accommodated formerly.

It is to be noted that, although reproduction of an information signal from a disk-type recording medium 1000 is described above, the disk changer 1 operates in a similar manner also when it performs recording of an information signal onto a disk-type recording medium 1000. More particularly, if the first recording key 4 is operated, then recording of a disk-type recording medium 1000 can be performed by the recording and reproduction section 300 provided in the left side mechanism unit 32, but if the second recording key 4 is operated, then recording of a disk-type recording medium 1000 can be performed by the recording and reproduction section 300 provided in the right side mechanism unit 32.

As described above, in the disk changer 1, the detection section 23 including the address detection section 24 and the disk detection section 25 is disposed at a substantially middle location between the recording and reproduction sections 300. Accordingly, when the address of an accommodation portion 14 is detected and presence or absence of a disk-type recording medium 1000 in the accommodation portion 14 is detected by the detection section 23, the accessing time for recording or reproduction to the disk-type recording medium 1000 after the detection does not exhibit a variation irrespective of whichever one of the recording and reproduction sections 300 is used to perform recording or reproduction. Consequently, the disk changer 1 is improved in the convenience in use.

Since the two mechanism units 32 are provided in the disk changer 1, recording or reproduction of an information signal onto or from a disk-type recording medium 1000 can be performed by any one of the recording and reproduction sections 300, and also it is possible to perform seamless recording or seamless reproduction wherein recording or reproduction of an information signal by one of the recording and reproduction sections 300 is performed incessantly subsequently to recording or reproduction of an information signal by the other recording and reproduction section 300.

In the following, different operations of a seamless reproduction function (seamless recording function) of the disk changer 1 are described with reference to FIGS. 46 and 47.

Figure 46:
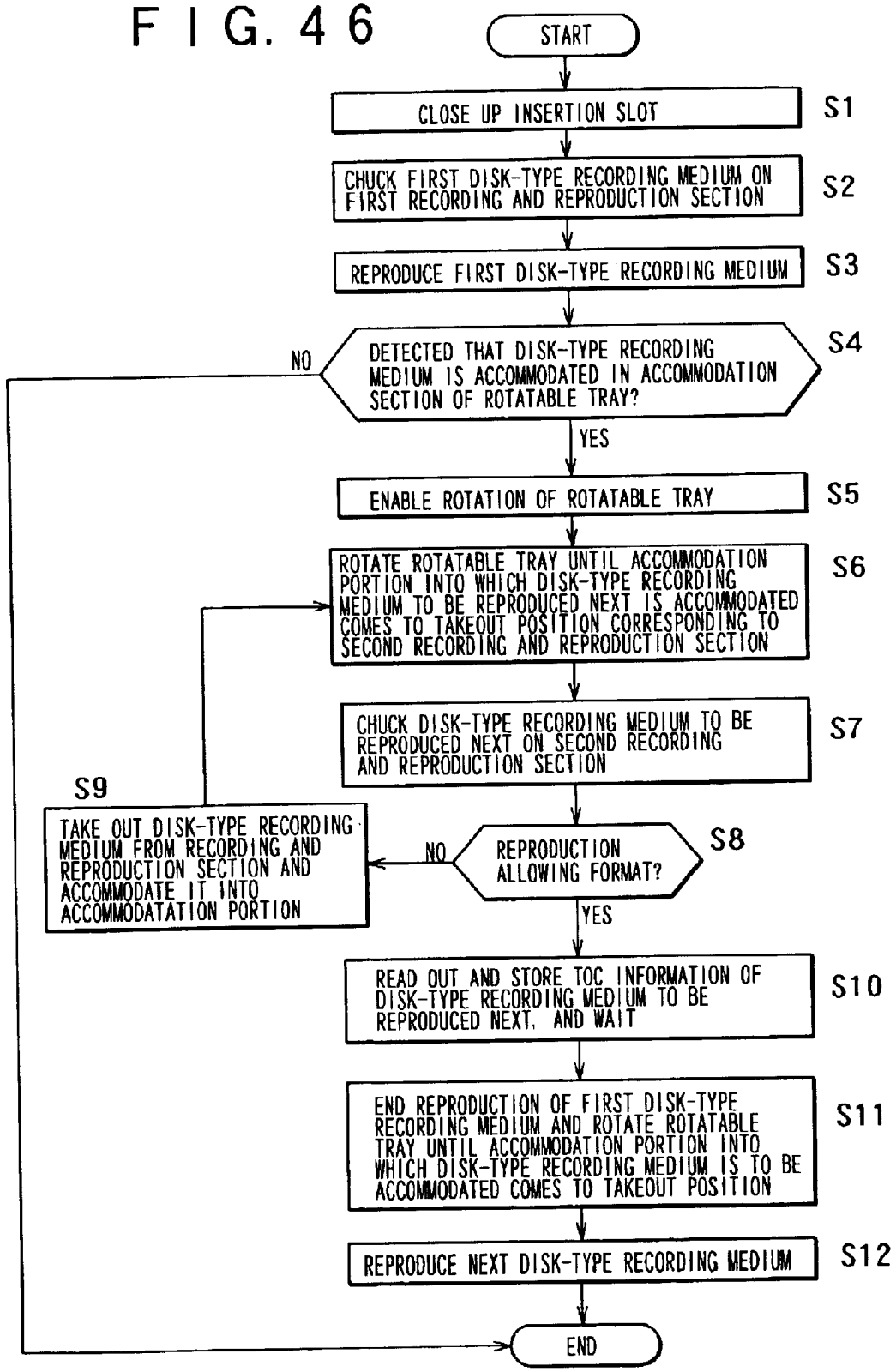
FIG. 46 is a flow chart illustrating a procedure of operation of the disk changer when it performs seamless reproduction (recording)

First, the operation of the seamless reproduction function illustrated in FIG. 46 is described.

At step S1, the disk insertion opening 2*a* is closed up with the door 3.

At step S2, the rotatable tray 7 is rotated, and thereupon, the addresses of the accommodation portions 14 are successively detected by the address detection section 24 and it is detected by the disk detection section 25 whether or not a disk-type recording medium 1000 is present in all of the accommodation portions 14. First, the address of an accommodation portion 14 for which reproduction is designated in response to an operation of a user or in accordance with a default set value and that a first disk-type recording medium 1000 is accommodated in the accommodation portion 14 are detected by the address detection section 24 and the disk detection section 25, respectively. Then, the rotatable tray 7 is rotated based on a result of the detection until the first disk-type recording medium 1000 reaches, for example, a first disk takeout position at which it can be taken out by the first disk takeout mechanism 400. After the accommodation portion 14 in which the first disk-type recording medium 1000 is accommodated comes to the first disk takeout position, the first disk takeout mechanism 400 is rendered operative so that the first disk-type recording medium 1000 is transported to the first recording and reproduction section 300 and then chucked by and between the chucking pulley 94 and the disk table 98.

At step S3, after the first disk-type recording medium 1000 is chucked by the chucking pulley 94 and the disk table 98, reproduction of an information signal from the first disk-type recording medium 1000 is performed by the first recording and reproduction section 300.

At step S4, if it is not detected by the disk detection section 25 that a second disk-type recording medium 1000 to be reproduced next is accommodated in the corresponding accommodation portion 14 of the rotatable tray 7, then the operation of the disk changer 1 is ended because seamless reproduction is impossible. On the other hand, if it is detected by the disk detection section 25 that a second disk-type recording medium 1000 to be produced next is accommodated in the corresponding accommodation portion 14 of the rotatable tray 7, then the processing advances to step S5.

At step S5, if the rotatable tray 7 is locked from rotation by the lock lever 82 of the first disk takeout mechanism 400, then the first disk takeout mechanism 400 is rendered operative to pivot the lock lever 82 away from the rotatable tray 7, thereby canceling the locking of the rotatable tray 7.

At step S6, the rotatable tray 7 is rotated until the accommodation portion 14 in which the second disk-type recording medium 1000 to be reproduced next comes to a second disk takeout position. The second disk-type recording medium 1000 to be reproduced next depends upon a mode selected by means of the mode selection key 4 formerly. For example, if the mode A has been selected, then a disk-type recording medium 1000 positioned nearest to the accommodation portion 14 in which the first disk-type recording medium 1000 being reproduced at present is determined as the second disk-type recording medium 1000 to be reproduced next. If the mode B has been selected, then a programmed predetermined disk-type recording medium 1000 is determined as the second disk-type recording medium 1000 to be reproduced next. If the mode C has been selected, then a disk-type recording medium 1000 selected at random is determined as the second disk-type recording medium 1000 to be reproduced next.

At step S7, the second disk takeout mechanism 400 is rendered operative to transport the second disk-type recording medium 1000 to be reproduced next to the second recording and reproduction section 300, in which the second disk-type recording medium 1000 is chucked by the chucking pulley 94 and the disk table 98.

At step S8, it is discriminated whether or not the second disk-type recording medium 1000 to be reproduced next has a format which allows reproduction by the second recording and reproduction section 300. If the second disk-type recording medium 1000 does not have a reproduction allowing format, then the processing advances to step S9, but if the second disk-type recording medium 1000 has a reproduction allowing format, then the processing advances to step S10.

At step S9, the second disk-type recording medium 1000 is taken out from the second recording and reproduction section 300 by the second disk takeout mechanism 400 and accommodated into the accommodation portion 14 in which it was accommodated originally, whereafter the processing advances to step S6, at which the rotatable tray 7 is rotated until a third disk-type recording medium 1000 to be reproduced further next comes to the second disk takeout position.

At step S10, during reproduction of the first disk-type recording medium 1000 by the first recording and reproduction section 300, TOC information recorded on the second disk-type recording medium 1000 to be reproduced next is read out and stored. After the TOC information is stored, the chucked state of the first disk-type recording medium 1000 being currently reproduced is maintained until the reproduction of the first disk-type recording medium 1000 comes to an end.

At step S11, after reproduction of an information signal from the first disk-type recording medium 1000 comes to an end, the rotatable tray 7 is rotated until the accommodation portion 14 in which the first disk-type recording medium 1000 was accommodated originally comes to the first disk takeout position. The first disk-type recording medium 1000 is taken out from the first recording and reproduction section 300 by the first disk takeout mechanism 400 and accommodated into the accommodation portion 14 positioned already at the first disk takeout position.

At step S12, after the reproduction of an information signal from the first disk-type recording medium 1000 comes to an end, reproduction of an information signal from the second disk-type recording medium 1000 chucked already is performed incessantly, thereby performing seamless reproduction. Thus, the processes at steps S11 and S12 are started substantially simultaneously.

The seamless reproduction described allows successive reproduction of three or more disk-type recording media 1000 through repetitive execution of the processes at steps S4 to S12 described above.

It is to be noted that, while operation of the disk changer 1 for seamless reproduction is described above, also operation of the disk changer 1 for seamless recording wherein recording onto disk-type recording media 1000 is performed successively is similar to the operation described above.

Figure 47:
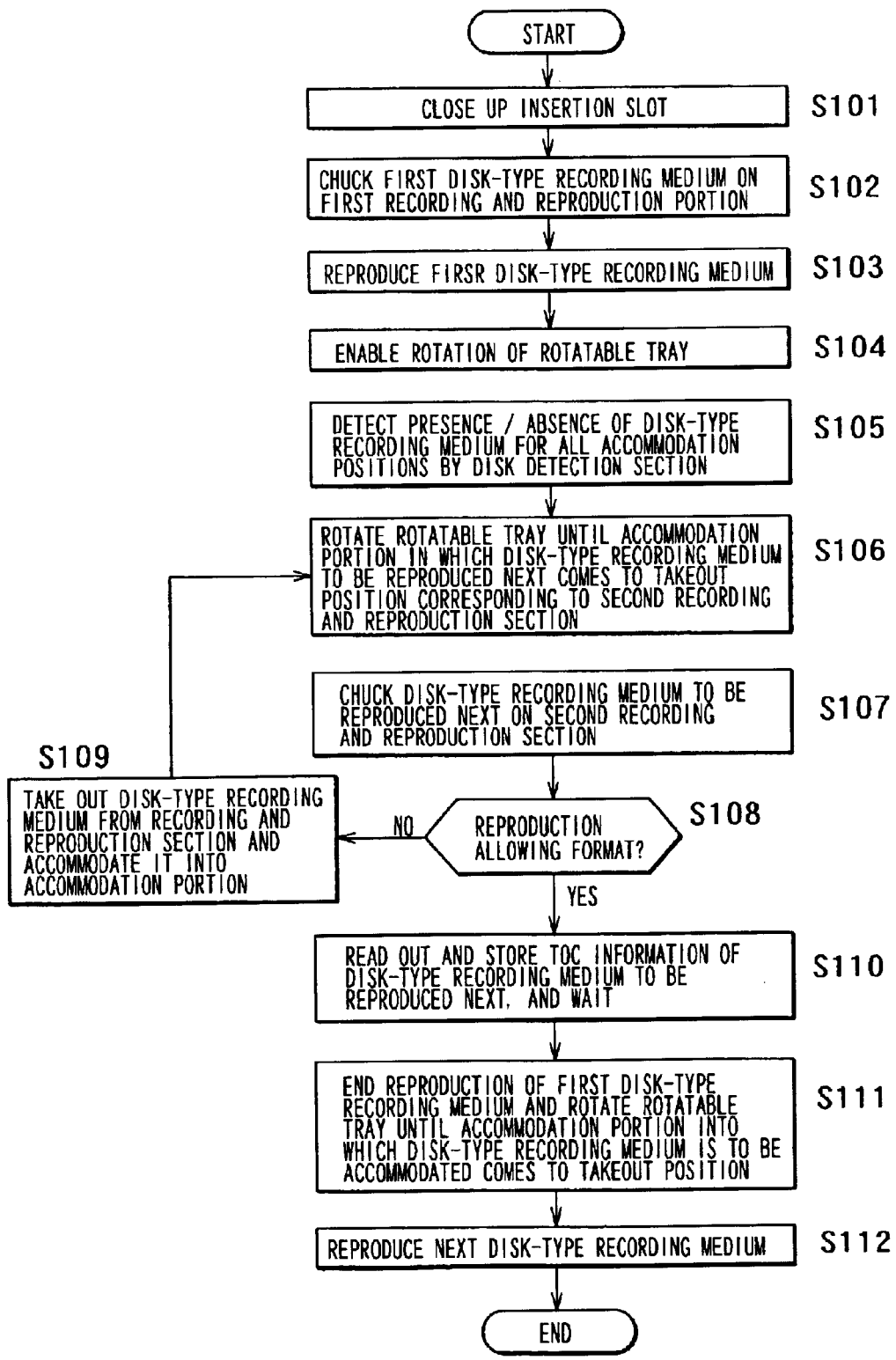
FIG. 47 is a flow chart illustrating another procedure of operation of the disk changer when it performs seamless reproduction (recording)

Now, the seamless operation of the disk changer 1 illustrated in FIG. 47 is described.

At step S101, the disk insertion opening 2*a* is closed up with the door 3.

At step S102, the rotatable tray 7 is rotated, and thereupon, the addresses of the accommodation portions 14 are successively detected by the address detection section 24 and it is detected by the disk detection section 25 whether or not a disk-type recording medium 1000 is present in all of the accommodation portions 14 as described hereinabove. If the address of an accommodation portion 14 for which reproduction is designated in response to an operation of a user or in accordance with a default set value and that a first disk-type recording medium 1000 is accommodated in the accommodation portion 14 are detected by the address detection section 24 and the disk detection section 25, respectively, then the rotatable tray 7 is rotated based on a result of the detection until the first disk-type recording medium 1000 comes to, for example, the first disk takeout position at which it can be taken out by the first disk takeout mechanism 400. After the first disk-type recording medium 1000 comes to the first disk takeout position, the first disk takeout mechanism 400 is rendered operative so that the first disk-type recording medium 1000 is transported to the first recording and reproduction section 300 and then chucked by and between the chucking pulley 94 and the disk table 98.

At step S103, after the first disk-type recording medium 1000 is chucked by the chucking pulley 94 and the disk table 98, reproduction of an information signal from the first disk-type recording medium 1000 is performed by the first recording and reproduction section 300.

At step S104, if the rotatable tray 7 is locked from rotation by the lock lever 82 of the first disk takeout mechanism 400, then the first disk takeout mechanism 400 is rendered operative to pivot the lock lever 82 away from the rotatable tray 7, thereby canceling the locking of the rotatable tray 7.

At step S105, the disk detection section 25 detects it for all of the accommodation portions 14 of the rotatable tray 7 whether or not a disk-type recording medium 1000 is present.

At step S106, the rotatable tray 7 is rotated until the second disk-type recording medium 1000 to be reproduced next comes to the second disk takeout position. The second disk-type recording medium 1000 to be reproduced next depends upon the mode selected by means of the mode selection key 4 formerly. For example, if the mode A has been selected, then a disk-type recording medium 1000 positioned nearest to the accommodation portion 14 in which the first disk-type recording medium 1000 being reproduced at present is determined as the second disk-type recording medium 1000 to be reproduced next. If the mode B has been selected, then a programmed predetermined disk-type recording medium 1000 is determined as the second disk-type recording medium 1000 to be reproduced next. If the mode C has been selected, then a disk-type recording medium 1000 selected at random is determined as the second disk-type recording medium 1000 to be reproduced next. It is to be noted that the second disk-type recording medium 1000 to be reproduced next may be a disk-type recording medium 1000 designated by the user. In order to designate a disk-type recording medium 1000 as the second disk-type recording medium 1000 to be reproduced, for example, the reproduction reservation key 4 is used to reserve reproduction and then the inputting keys 4 are used to input the address of the accommodation portion 14 in which the disk-type recording medium 1000 is accommodated.

At step S107, the second disk takeout mechanism 400 is rendered operative to transport the second disk-type recording medium 1000 to be reproduced next to the second recording and reproduction section 300, in which the second disk-type recording medium 1000 is chucked by the chucking pulley 94 and the disk table 98.

At step S108, it is discriminated whether or not the second disk-type recording medium 1000 to be reproduced next has a format which allows reproduction by the second recording and reproduction section 300. If the second disk-type recording medium 1000 does not have a reproduction allowing format, then the processing advances to step S109, but if the second disk-type recording medium 1000 has a reproduction allowing format, then the processing advances to step S110.

At step S109, the second disk-type recording medium 1000 is taken out from the second recording and reproduction section 300 by the second disk takeout mechanism 400 and accommodated into the accommodation portion 14 in which it was accommodated originally, whereafter the processing advances to step S106. Further, the rotatable tray 7 is rotated until a third disk-type recording medium 1000 to be reproduced further next comes to the second disk takeout position. It is to be noted that, if no disk-type recording medium 1000 is designated as the third disk-type recording medium 1000 to be reproduced next at step S106, then, for example, a disk-type recording medium 1000 accommodated in the accommodation portion 14 nearest to the accommodation portion 14 in which the second disk-type recording medium 1000 designated formerly is accommodated is automatically designated as the third disk-type recording medium 1000 to be reproduced next.

At step S110, while the first disk-type recording medium 1000 is reproduced by the first recording and reproduction section 300, TOC information recorded on the second disk-type recording medium 1000 to be reproduced next is read out and stored. After the TOC information is stored, the chucked state of the first disk-type recording medium 1000 being currently reproduced is maintained until the reproduction of the first disk-type recording medium 1000 comes to an end.

At step S111, when reproduction of an information signal from the first disk-type recording medium 1000 comes to an end, the rotatable tray 7 is rotated until the accommodation portion 14 in which the first disk-type recording medium 1000 was accommodated originally comes to the first disk takeout position. The first disk-type recording medium 1000 is taken out from the first recording and reproduction section 300 by the first disk takeout mechanism 400 and accommodated back into the accommodation portion 14 positioned already at the first disk takeout position.

At step S112, after the reproduction of an information signal from the first disk-type recording medium 1000 comes to an end, reproduction of an information signal from the second disk-type recording medium 1000 chucked already is performed incessantly, thereby performing seamless reproduction.

The seamless reproduction described allows successive reproduction of three or more disk-type recording media 1000 through repetitive execution of the operations at steps S106 to S112 described above.

It is to be noted that, while operation of the disk changer 1 for seamless reproduction is described above, also operation of the disk changer 1 for seamless recording wherein recording onto disk-type recording media 1000 is performed successively is similar to the operation described above.

As described above, since the disk changer 1 includes a plurality of recording and reproduction sections 300 and a plurality of disk takeout mechanisms 400 and the rotatable tray 7 can be rotated during recording or reproduction of an information signal by one of the recording and reproduction sections 300, recording onto or reproduction from different disk-type recording media 1000 can be performed incessantly. Therefore, the disk changer 1 is superior in convenience in use.

Further, by operating the dubbing key 4, an information signal recorded on a disk-type recording medium 1000 chucked by one of the recording and reproduction sections 300 can be recorded onto another disk-type recording medium 1000 chucked by the other of the recording and reproduction section 300.

Furthermore, since the rotatable tray 7 can be rotated during recording or reproduction for a disk-type recording medium 1000, a new disk-type recording medium 1000 can be accommodated into a desired one of the accommodation portions 14 of the rotatable tray 7, and also replacement of disk-type recording media 1000 between different ones of the accommodation portions 14 of the rotatable tray 7 can be performed readily.

In addition, since the disk changer 1 includes an address detection section 24 for detecting the addresses of the accommodation portions 14 and a disk detection section 25 for detecting whether or not a disk-type recording medium 1000 is present in each of the accommodation portions 14, the accommodation position of each disk-type recording medium 1000 and presence or absence of a disk-type recording medium 1000 in each of the accommodation portions 14 can be detected with certainty. Consequently, the disk changer 1 has improved reliability in operation.

In the disk changer 1, even when reproduction or recording of an information signal is proceeding on one of the recording and reproduction sections 300, TOC information recorded on a disk-type recording medium 1000 can be read out and stored by the other recording and reproduction section 300. Accordingly, even if a new disk-type recording medium 1000 is accommodated into an accommodation portion 14 while reproduction or recording of an information is proceeding on one of the recording and reproduction sections 300, by storing TOC information of the disk-type recording medium 1000 accommodated newly by the other recording and reproduction section 300, recording or reproduction of the newly accommodated disk-type recording medium 1000 can be performed incessantly after recording or reproduction of the disk-type recording medium 1000 for which recording or reproduction is currently proceeding comes to an end. Consequently, the disk changer 1 achieves augmentation in convenience in use.

Further, by successively storing TOC information of a plurality of disk-type recording media 1000 concurrently while reproduction or recording of an information signal is proceeding on one of the recording and reproduction sections 300, improvement in efficiency in operation can be anticipated.

Furthermore, if TOC information of all disk-type recording media 1000 is stored, then the total reproduction time with regard to all of the accommodated disk-type recording media 1000 can be grasped, which is convenient for operation of the disk changer 1.

The disk changer 1 has a sorting function of accommodating a disk-type recording medium 1000 accommodated in an arbitrary one of the accommodation portions 14 of the rotatable tray 7 into another designated one of the accommodation portions 14 or rearranging the disk-type recording media 1000.

In the following, the sorting function of the disk changer 1 is described with reference to FIGS. 48 to 53.

Figure 48:
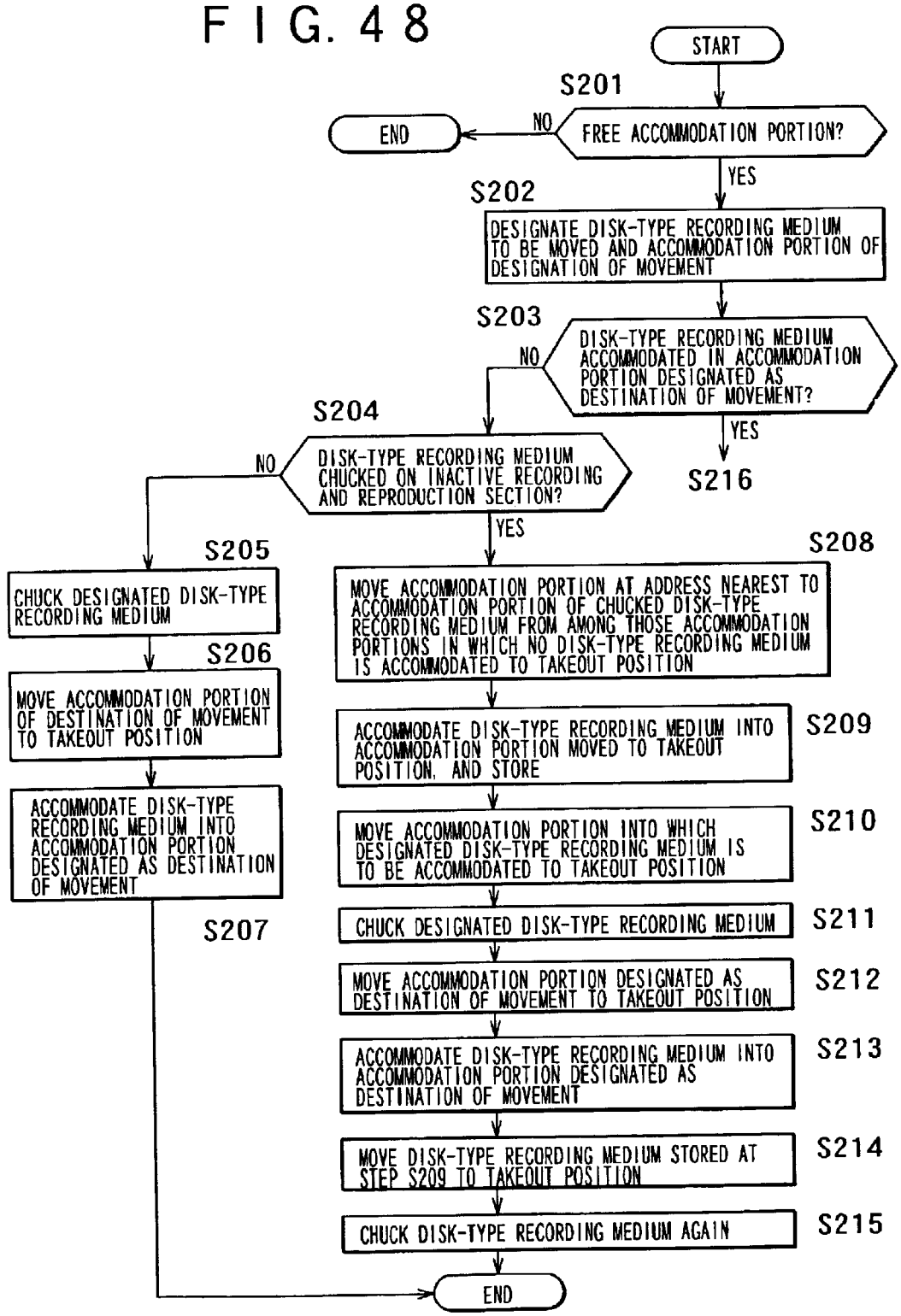
FIGS. 48 and 49 are flow charts illustrating a procedure of sorting operation of the disk changer when a disk-type recording medium is accommodated into another accommodation portion designated by a user.
Figure 49:
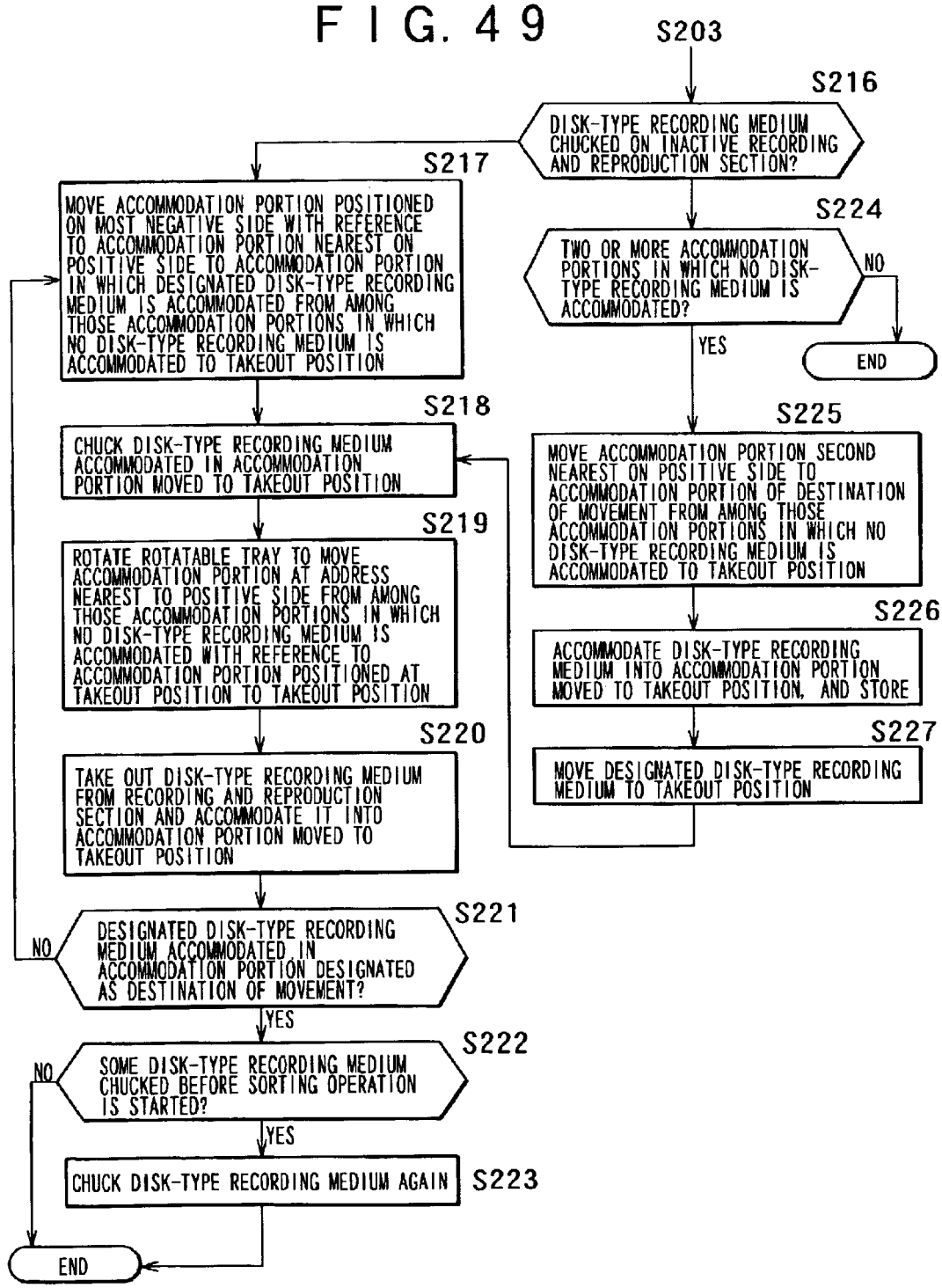

First, the sorting function of the disk changer 1 when a disk-type recording medium 1000 accommodated in one of the accommodation portions 14 is accommodated into another one of the accommodation portions 14 designated by the user is described with reference to FIG. 48.

At step S201, in response to an operation of the sort key 4, the rotatable tray 7 is rotated, and during the rotation, the addresses of the accommodation portions 14 are successively detected by the address detection section 24 and it is detected by the disk detection section 25 whether or not a disk-type recording medium 1000 is present in all of the accommodation portions 14. If a result of the detection indicates that an accommodation portion 14 in which no disk-type recording medium 1000 is accommodated is not detected, then since execution of the sorting function is impossible, the operation of the disk changer 1 is ended. On the other hand, if the result of the detection indicates that an accommodation portion 14 in which no disk-type recording medium 1000 is accommodated is found out, then since execution of the sorting function is possible, the processing advances to step S202.

At step S202, for example, the inputting keys 4 are operated to designate a disk-type recording medium 1000 to be moved and an accommodation portion 14 of the destination of the movement. The disk-type recording medium 1000 to be moved here may be moved from the accommodation portion 14 in which it is currently accommodated to another accommodation portion 14 which neighbors in a positive direction hereinafter described with the former accommodation portion 14 and is designated as the destination of the movement.

At step S203, if the result of the detection by the address detection section 24 at step S201 indicates that no disk-type recording medium 1000 is accommodated in the accommodation portion 14 designated as the destination of the movement at step S202, then the processing advances to step S204. On the other hand, if the result of the detection by the address detection section 24 at step S201 indicates that a different disk-type recording medium 1000 is accommodated in the accommodation portion 14 designated as the destination of the movement at step S202, then the processing advances to step S216.

At step S204, it is detected whether or not a disk-type recording medium 1000 is chucked by that one of the recording and reproduction sections 300 on which recording or reproduction is not proceeding (such a recording and reproduction section is hereinafter referred to as "inactive recording and reproduction section") If a result of the detection indicates that no disk-type recording medium 1000 is chucked by the inactive recording and reproduction section 300, then the processing advances to step S205. On the other hand, if the result of the detection indicates that a disk-type recording medium 1000 is chucked by the inactive recording and reproduction section 300, then the processing advances to step S208.

At step S205, the designated disk-type recording medium 1000 is moved to the disk takeout position corresponding to the inactive recording and reproduction section 300, and the corresponding disk takeout mechanism 400 is rendered operative to transport the disk-type recording medium 1000 to the inactive recording and reproduction section 300, by which the disk-type recording medium 1000 is chucked.

At step S206, the rotatable tray 7 is rotated until the accommodation portion 14 designated as the destination of the movement comes to the disk takeout position corresponding to the inactive recording and reproduction section 300.

At step S207, the designated disk-type recording medium 1000 is taken out from the inactive recording and reproduction section 300 by the disk takeout mechanism 400 and is accommodated into the accommodation portion 14 designated as the destination of the movement. After the disk-type recording medium 1000 is accommodated into the accommodation portion 14 designated as the destination of the movement, the fact that the disk-type recording medium 1000 is accommodated in the accommodation portion 14 designated as the destination of the movement is registered and displayed on the display section 5 provided on the outer housing 2, whereafter the operation is ended.

When it is detected at step S204 that a disk-type recording medium 1000 is chucked by the inactive recording and reproduction section 300, the processing advances from step S204 to step S208 as described above. At step S208, the rotatable tray 7 is rotated until an accommodation portion 14 nearest to the accommodation portion 14 in which the disk-type recording medium 1000 chucked by the inactive recording and reproduction section 300 was accommodated originally from among those accommodation portions 14 in which no disk-type recording medium 1000 is accommodated comes to the disk takeout position corresponding to the inactive recording and reproduction section 300.

At step S209, the disk-type recording medium 1000 is taken out from the inactive recording and reproduction section 300 by the disk takeout mechanism 400 and accommodated into the accommodation portion 14 positioned already at the disk takeout position. At this time, the fact that the disk-type recording medium 1000 is accommodated in the accommodation portion 14 is stored.

At step S210, the rotatable tray 7 is rotated until the accommodation portion 14 in which the designated disk-type recording medium 1000 is accommodated comes to the disk takeout position corresponding to the inactive recording and reproduction section 300.

At step S211, the disk takeout mechanism 400 is rendered operative to transfer the disk-type recording medium 1000 to the inactive recording and reproduction section 300, by which the disk-type recording medium 1000 is chucked.

At step S212, the rotatable tray 7 is rotated until the accommodation portion 14 designated as the destination of the movement comes to the disk takeout position.

At step S213, the designated disk-type recording medium 1000 is taken out from the inactive recording and reproduction section 300 by the disk takeout mechanism 400 and accommodated into the designated accommodation portion 14. After the disk-type recording medium 1000 is accommodated into the designated accommodation portion 14, the fact that the disk-type recording medium 1000 is accommodated in the designated accommodation portion 14 is registered and displayed on the display section 5 provided on the outer housing 2.

At step S214, the rotatable tray 7 is rotated until the accommodation portion 14 of the address stored at step S209 comes to the disk takeout position corresponding to the inactive recording and reproduction section 300.

At step S215, the disk takeout mechanism 400 is rendered operative to transport the disk-type recording medium 1000, which was accommodated in the accommodation portion 14 at the address stored at step S209, to the inactive recording and reproduction section 300 which is not in a chucking state, and the disk-type recording medium 1000 is chucked by the inactive recording and reproduction section 300 again. Then, the operation is ended.

On the other hand, when it is discriminated at step S203 that a disk-type recording medium 1000 is accommodated in the accommodation portion 14 designated as the destination of movement, the processing advances from step S203 to step S216 as described above. At step S216, it is detected whether or not a disk-type recording medium 1000 is chucked by the inactive recording and reproduction section 300. If a result of the detection indicates that no disk-type recording medium 1000 is chucked by the inactive recording and reproduction section 300, then the processing advances to step S217. However, if the result of the detection indicates that a disk-type recording medium 1000 is chucked by the inactive recording and reproduction section 300, then the processing advances to step S224.

At step S217, the rotatable tray 7 is rotated until, where, from among those accommodation portions 14 in which no disk-type recording medium 1000 is accommodated, that accommodation portion 14 whose address number is nearest on the positive direction side to the accommodation portion 14 in which the designated disk-type recording medium 1000 is accommodated is designated as a reference, the disk-type recording medium 1000 accommodated in the accommodation portion 14 having an address smaller by one address number than that of the reference accommodation portion 14 is moved to the disk takeout position corresponding to the inactive recording and reproduction section 300.

At step S218, the disk takeout mechanism 400 is rendered operative to transport the disk-type recording medium 1000 having been moved to the disk takeout position at step S217 to the inactive recording and reproduction section 300, by which the disk-type recording medium 1000 is chucked.

At step S219, the rotatable tray 7 is rotated until that one of the accommodation portions 14 having no disk-type recording medium 1000 accommodated therein which has an address nearest on the positive side with reference to the accommodation portion 14 in which the disk-type recording medium 1000 chucked at step S218 was accommodated comes to the disk takeout position corresponding to the inactive recording and reproduction section 300.

At step S220, the disk-type recording medium 1000 chucked at step S218 is taken out from the inactive recording and reproduction section 300 by the disk takeout mechanism 400 and accommodated into the accommodation portion 14 moved to the disk takeout position at step S219.

At step S221, it is detected whether or not the designated disk-type recording medium 1000 is accommodated in the accommodation portion 14 designated as the destination of the movement. If a result of the detection indicates that the designated disk-type recording medium 1000 is not accommodated in the accommodation portion 14 designated as the destination of the movement, then the processing returns to step S217. However, if the result of the detection indicates that the designated disk-type recording medium 1000 is accommodated in the accommodation portion 14 designated as the destination of the movement, then the processing advances to step S222. After the disk-type recording medium 1000 is accommodated into the accommodation portion 14 designated as the destination of the movement, the fact that the disk-type recording medium 1000 is accommodated in the accommodation portion 14 designated as the destination of the movement is registered and displayed on the display section 5 provided on the outer housing 2.

At step S222, it is detected that whether or not a disk-type recording medium 1000 was chucked by the inactive recording and reproduction section 300 before starting of the sorting operation. If a result of the detection indicates that no disk-type recording medium 1000 was chucked, then the operation is ended. On the other hand, if the result of the detection indicates that a disk-type recording medium 1000 was chucked, then the processing advances to step S223. It is to be noted that, if the processing advances through step S217 to step S222 as a result of the detection at step S216, then the operation is ended after the detection at step S222, but if the processing advances through step S224, which is hereinafter described, to step S222 as a result of the detection at step S216, the processing advances from step S222 to step S223.

At step S223, the disk takeout mechanism 400 is rendered operative to transport the disk-type recording medium 1000, which was chucked before starting of the sorting operation, to the inactive recording and reproduction section 300 which is not in a chucking state, and the disk-type recording medium 1000 is chucked by the inactive recording and reproduction section 300 again, whereafter the operation is ended.

When it is detected at step S216 that a disk-type recording medium 1000 is chucked by the inactive recording and reproduction section 300, the processing advances from step S216 to step S224 as described above. At step S224, it is detected whether or not the rotatable tray 7 includes two or more accommodation portions 14 in which no disk-type recording medium 1000 is accommodated. If a result of the detection indicates that the rotatable tray 7 does not include two or more accommodation portions 14 in which no disk-type recording medium 1000 is accommodated, then since execution of the sorting function is impossible, the operation is ended. However, if the result of the detection indicates that the rotatable tray 7 includes two or more accommodation portions 14 in which no disk-type recording medium 1000 is accommodated, then since execution of the sorting function is possible, the processing advances to step S225.

At step S225, the rotatable tray 7 is rotated until, from among those accommodation portions 14 in which no disk-type recording medium 1000 is accommodated, the accommodation portion 14 whose address number is second nearest on the positive direction side with respect to the accommodation portion 14 designated as the destination of the movement is moved to the disk takeout position corresponding to the inactive recording and reproduction section 300.

At step S226, the disk-type recording medium 1000 is taken out from the inactive recording and reproduction section 300 by the disk takeout mechanism 400 and accommodated into the accommodation portion 14 positioned already at the disk takeout position. At this time, the fact that the disk-type recording medium 1000 is accommodated in the accommodation portion 14 is stored.

At step S227, the rotatable tray 7 is rotated to move the designated disk-type recording medium 1000 to the disk takeout position corresponding to the inactive recording and reproduction section 300. Thereafter, the processing advances to step S218, and the processes at steps S218 to S223 described above are performed and the operation is ended after the step S223.

In the disk changer 1 described above, since a designated disk-type recording medium 1000 can be moved to a designated accommodation portion 14 as described above, the disk-type recording media 1000 can be managed readily and the disk changer 1 can be used in improved convenience.

It is to be noted that, while the description above relates to movement of a disk-type recording medium 1000 from an accommodation portion 14 of a source of movement to another accommodation portion 14 of a destination of movement which neighbors with the accommodation portion 14 of the source of movement, the locations of the accommodation portions 14 of the source of movement and the destination of movement are not limited specifically to those described above.

For example, also the following movement is possible. In particular, a disk-type recording medium 1000 accommodated in an accommodation portion 14 designated as the destination of movement is moved once to another accommodation portion 14 nearest on the positive side to a further accommodation portion 14 designated at step S217 in which a designated disk-type recording medium 1000 is stored. Then, a disk-type recording medium 1000 accommodated in an accommodation portion 14 of the source of movement is transported to the accommodation portion 14 designated as the destination of movement. Through the process, a disk-type recording medium 1000 can be transmitted to an accommodation portion 14 at any position.

Figure 50:
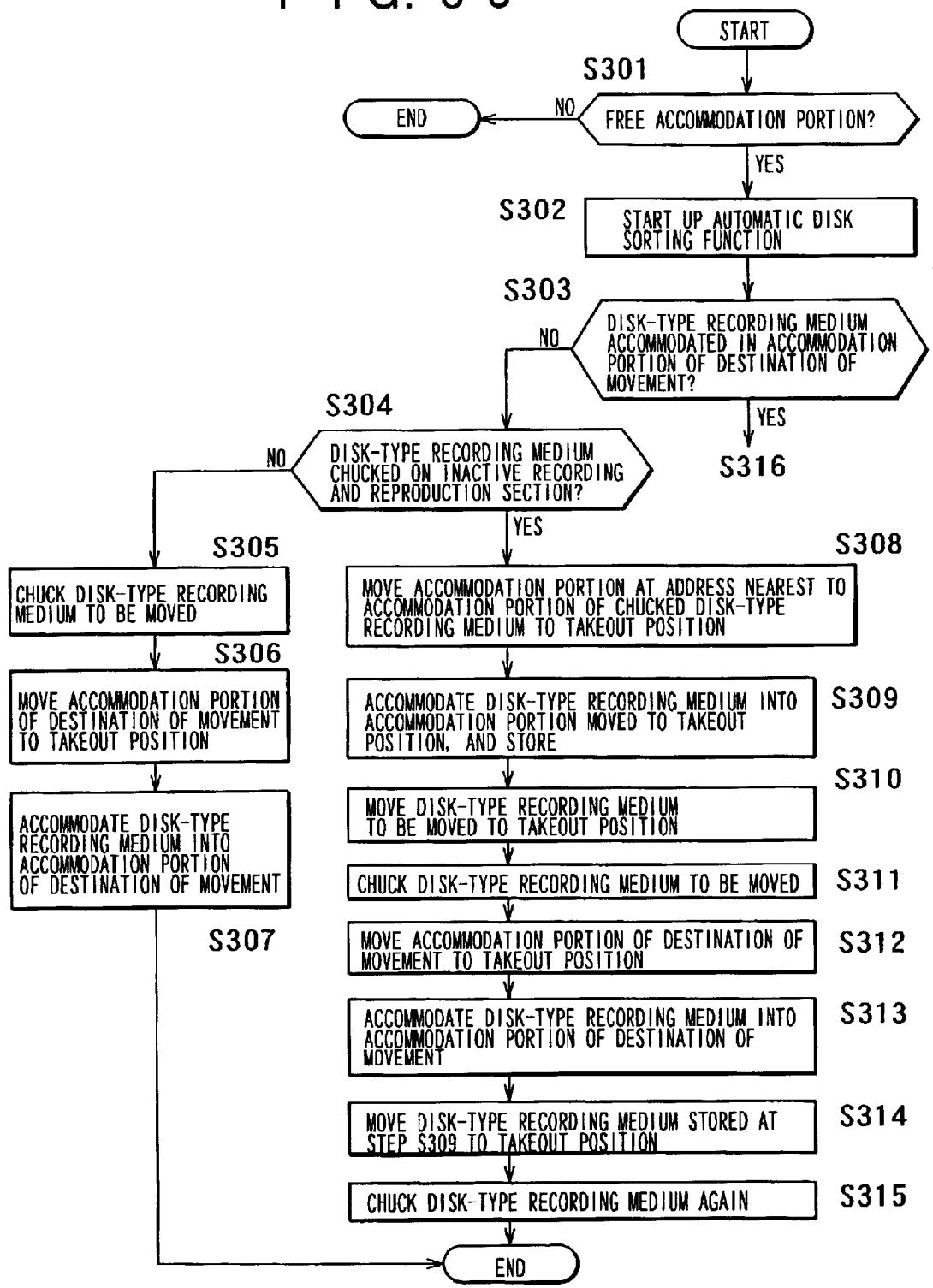
FIGS. 50 and 51 are flow charts illustrating a procedure of sorting operation of the disk changer when disk-type recording media are re-arranged for individual kinds of predetermined disk information.
Figure 51:
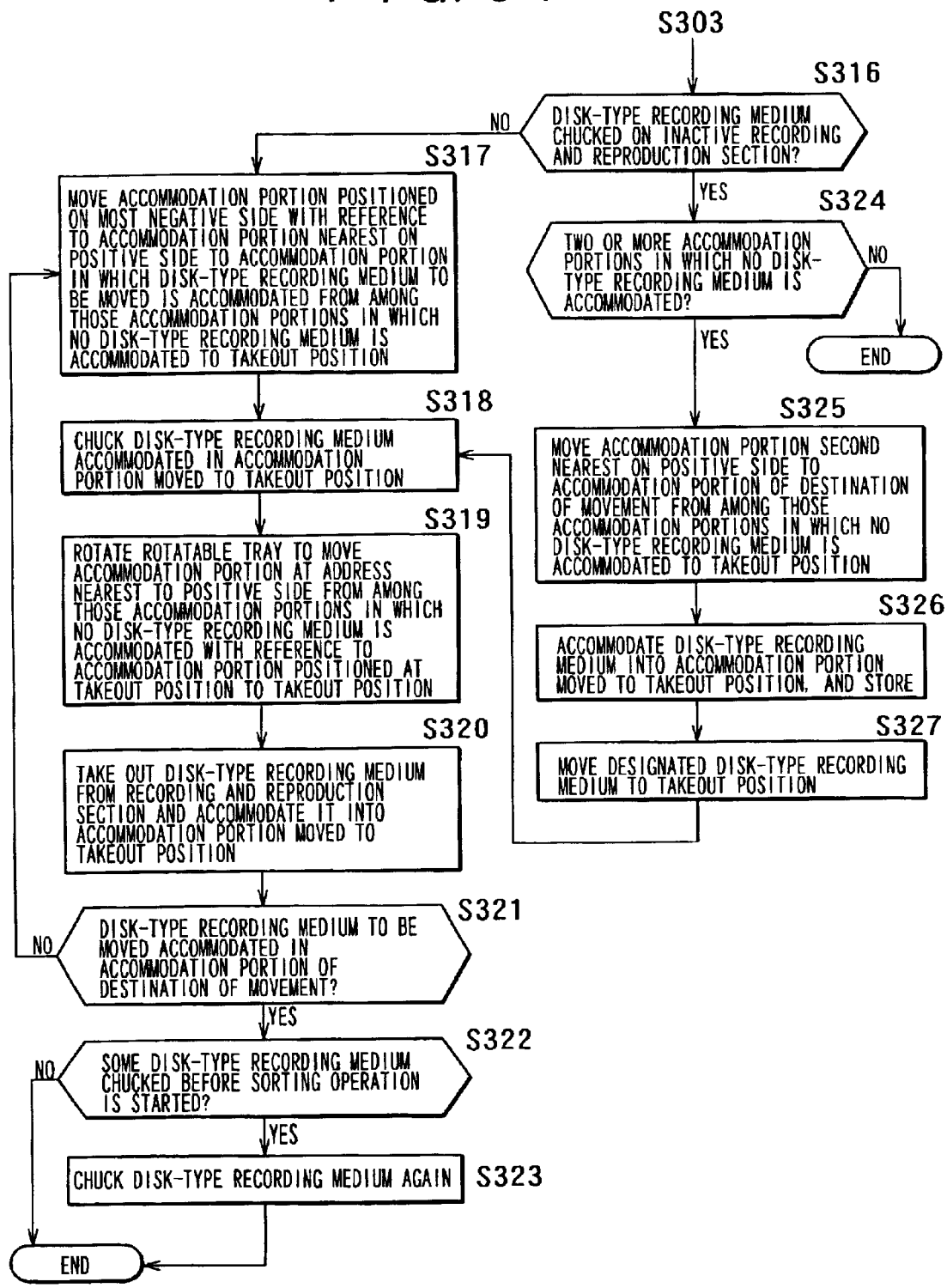

Now, a different sequence of operation of the sorting function of the disk changer 1 is described with reference to FIGS. 50 and 51. In the operation of FIGS. 50 and 51, disk-type recording media 1000 are replaced for different types of disk information registered by the user such as, for example, groups of title names or artist names of the disk-type recording media 1000, or the disk-type recording media 1000 are re-arranged so as to be positioned closely to each other. In those cases, operation is executed when a predetermined automatic sorting mode is selected by an operation of the mode selection key 4.

At step S301, in response to an operation of the sort key 4, the rotatable tray 7 is rotated, and during the rotation, the addresses of the accommodation portions 14 are successively detected by the address detection section 24 and it is detected by the disk detection section 25 whether or not a disk-type recording medium 1000 is present in all of the accommodation portions 14. If a result of the detection indicates that an accommodation portion 14 in which no disk-type recording medium 1000 is accommodated is not detected, then since execution of the sorting function is impossible, the operation of the disk changer 1 is ended. On the other hand, if the result of the detection indicates that an accommodation portion 14 in which no disk-type recording medium 1000 is accommodated is found out, then since execution of the sorting function is possible, the processing advances to step S302.

At step S302, the automatic disk sorting function is started.

At step S303, if the result of the detection by the address detection section 24 at step S301 indicates that another disk-type recording medium 1000 is not accommodated in the accommodation portion 14 of the destination of movement, then the processing advances to step S304. On the other hand, if the result of the detection by the address detection section 24 at step S301 indicates that another disk-type recording medium 1000 is accommodated in the accommodation portion 14 of the destination of the movement, then the processing advances to step S316.

At step S304, it is detected whether or not a disk-type recording medium 1000 is chucked by the inactive recording and reproduction section 300. If a result of the detection indicates that no disk-type recording medium 1000 is chucked by the inactive recording and reproduction section 300, then the processing advances to step S305. On the other hand, if the result of the detection indicates that a disk-type recording medium 1000 is chucked by the inactive recording and reproduction section 300, then the processing advances to step S308.

At step S305, the disk-type recording medium 1000 to be moved is moved to the disk takeout position corresponding to the inactive recording and reproduction section 300, and the disk takeout mechanism 400 is rendered operative to transport the disk-type recording medium 1000 to the inactive recording and reproduction section 300, by which the disk-type recording medium 1000 is chucked.

At step S306, the rotatable tray 7 is rotated until the accommodation portion 14 of the destination of the movement comes to the disk takeout position corresponding to the inactive recording and reproduction section 300.

At step S307, the disk-type recording medium 1000 to be moved is taken out from the inactive recording and reproduction section 300 by the disk takeout mechanism 400 and is accommodated into the accommodation portion 14 of the destination of movement. After the disk-type recording medium 1000 is accommodated into the accommodation portion 14 of the destination of movement, this fact is registered and displayed on the display section 5 provided on the outer housing 2, whereafter the operation is ended.

When it is detected at step S304 that a disk-type recording medium 1000 is chucked by the inactive recording and reproduction section 300, the processing advances from step S304 to step S308 as described above. At step S308, the rotatable tray 7 is rotated until an accommodation portion 14 nearest to the accommodation portion 14 in which the disk-type recording medium 1000 chucked by the inactive recording and reproduction section 300 was accommodated originally from among those accommodation portions 14 in which no disk-type recording medium 1000 is accommodated comes to the disk takeout position corresponding to the inactive recording and reproduction section 300.

At step S309, the disk-type recording medium 1000 is taken out from the inactive recording and reproduction section 300 by the disk takeout mechanism 400 and accommodated into the accommodation portion 14 positioned already at the disk takeout position. At this time, the fact that the disk-type recording medium 1000 is accommodated in the accommodation portion 14 is stored.

At step S310, the rotatable tray 7 is rotated until the accommodation portion 14 in which the disk-type recording medium 1000 to be moved is accommodated comes to the disk takeout position corresponding to the inactive recording and reproduction section 300.

At step S311, the disk takeout mechanism 400 is rendered operative to transfer the disk-type recording medium 1000 to the inactive recording and reproduction section 300, by which the disk-type recording medium 1000 is chucked.

At step S312, the rotatable tray 7 is rotated until the accommodation portion 14 of the destination of movement corresponding to the predetermined mode selected by the user comes to the disk takeout position.

At step S313, the disk-type recording medium 1000 to be moved is taken out from the inactive recording and reproduction section 300 by the disk takeout mechanism 400 and accommodated into the accommodation portion 14 of the destination of movement. After the disk-type recording medium 1000 is accommodated into the accommodation portion 14 of the destination of movement, the fact that the disk-type recording medium 1000 is accommodated in the accommodation portion 14 of the destination of movement is registered and displayed on the display section 5 provided on the outer housing 2.

At step S314, the rotatable tray 7 is rotated until the accommodation portion 14 of the address stored at step S309 comes to the disk takeout position corresponding to the inactive recording and reproduction section 300.

At step S315, the disk takeout mechanism 400 is rendered operative to transport the disk-type recording medium 1000, which was accommodated in the accommodation portion 14 at the address stored at step S309, to the inactive recording and reproduction section 300 which is not in a chucking state, and the disk-type recording medium 1000 is chucked by the inactive recording and reproduction section 300 again. Thereafter, the operation is ended.

On the other hand, when it is discriminated at step S303 that a disk-type recording medium 1000 is accommodated in the accommodation portion 14 designated as the destination of movement, the processing advances from step S303 to step S316 as described above. At step S316, it is detected whether or not a disk-type recording medium 1000 is chucked by the inactive recording and reproduction section 300. If a result of the detection indicates that no disk-type recording medium 1000 is chucked by the inactive recording and reproduction section 300, then the processing advances to step S317. However, if the result of the detection indicates that a disk-type recording medium 1000 is chucked by the inactive recording and reproduction section 300, then the processing advances to step S324.

At step S317, the rotatable tray 7 is rotated until, where, from among those accommodation portions 14 in which no disk-type recording medium 1000 is accommodated, that accommodation portion 14 whose address number is nearest on the positive direction side to the accommodation portion 14 in which the disk-type recording medium 1000 to be moved is accommodated is designated as a reference, the disk-type recording medium 1000 accommodated in the accommodation portion 14 having an address smaller by one address number than that of the reference accommodation portion 14 is moved to the disk takeout position corresponding to the inactive recording and reproduction section 300.

At step S318, the disk takeout mechanism 400 is rendered operative to transport the disk-type recording medium 1000 having been moved to the disk takeout position at step S317 to the inactive recording and reproduction section 300, by which the disk-type recording medium 1000 is chucked.

At step S319, the rotatable tray 7 is rotated until that one of the accommodation portions 14 having no disk-type recording medium 1000 accommodated therein which has an address nearest on the positive side with reference to the accommodation portion 14 in which the disk-type recording medium 1000 chucked at step S318 was accommodated comes to the disk takeout position corresponding to the inactive recording and reproduction section 300.

At step S320, the disk-type recording medium 1000 chucked at step S318 is taken out from the inactive recording and reproduction section 300 by the disk takeout mechanism 400 and accommodated into the accommodation portion 14 moved to the disk takeout position at step S319.

At step S321, it is detected whether or not the disk-type recording medium 1000 to be moved is accommodated in the accommodation portion 14 of the destination of movement. If a result of the detection indicates that the disk-type recording medium 1000 to be moved is not accommodated in the accommodation portion 14 of the destination of movement, then the processing returns to step S317. However, if the result of the detection indicates that the disk-type recording medium 1000 to be moved is accommodated in the accommodation portion 14 of the destination of movement, then the processing advances to step S322. After the disk-type recording medium 1000 is accommodated into the accommodation portion 14 of the destination of movement, the fact that the disk-type recording medium 1000 is accommodated in the accommodation portion 14 of the destination of movement is registered and displayed on the display section 5 provided on the outer housing 2.

At step S322, it is detected that whether or not a disk-type recording medium 1000 was chucked by the inactive recording and reproduction section 300 before starting of the sorting operation. If a result of the detection indicates that no disk-type recording medium 1000 was chucked, then the operation is ended. On the other hand, if the result of the detection indicates that a disk-type recording medium 1000 was chucked, then the processing advances to step S323. It is to be noted that, if the processing advances through step S317 to step S322 as a result of the detection at step S316, then the operation is ended after the detection at step S322, but if the processing advances through step S324, which is hereinafter described, to step S322 as a result of the detection at step S316, the processing advances from step S322 to step S323.

At step S323, the disk takeout mechanism 400 is rendered operative to transport the disk-type recording medium 1000, which was chucked before starting of the sorting operation, to the inactive recording and reproduction section 300 which is not in a chucking state, and the disk-type recording medium 1000 is chucked by the inactive recording and reproduction section 300 again, whereafter the operation is ended.

On the other hand, at step 324 after the processing advances from step S316, it is detected whether or not the rotatable tray 7 includes two or more accommodation portions 14 in which no disk-type recording medium 1000 is accommodated. If a result of the detection indicates that the rotatable tray 7 does not include two or more accommodation portions 14 in which no disk-type recording medium 1000 is accommodated, then since execution of the sorting function is impossible, the operation is ended. However, if the result of the detection indicates that the rotatable tray 7 includes two or more accommodation portions 14 in which no disk-type recording medium 1000 is accommodated, then since execution of the sorting function is possible, the processing advances to step S325.

At step S325, the rotatable tray 7 is rotated until, from among those accommodation portions 14 in which no disk-type recording medium 1000 is accommodated, the accommodation portion 14 whose address number is second nearest on the positive direction side with respect to the accommodation portion 14 of the destination of movement is moved to the disk takeout position corresponding to the inactive recording and reproduction section 300.

At step S326, the disk-type recording medium 1000 is taken out from the inactive recording and reproduction section 300 by the disk takeout mechanism 400 and accommodated into the accommodation portion 14 positioned already at the disk takeout position. At this time, the fact that the disk-type recording medium 1000 is accommodated in the accommodation portion 14 is stored.

At step S327, the rotatable tray 7 is rotated to move the designated disk-type recording medium 1000 to be moved to the disk takeout position corresponding to the inactive recording and reproduction section 300. Thereafter, the processing advances to step S318, and the processes at steps S318 to S323 described above are performed and the operation is ended after the step S323.

In the disk changer 1 described above, since the disk-type recording media 1000 can be moved for individual types thereof or for predetermined orders to the accommodation portions 14, the disk-type recording media 1000 can be managed readily and the disk changer 1 can be used in improved convenience.

Particularly, since the disk-type recording media 1000 can be grouped for each type or can be accommodated for each predetermined order into the accommodation portions 14, when it is intended to newly accommodate disk-type recording media 1000 of the same type or the like into the accommodation portions 14, the accommodation can be performed very readily.

Further, since the disk-type recording media 1000 can be accommodated closely to each other into the accommodation portions 14, the disk-type recording media 1000 can be managed readily and the disk changer 1 can be used in improved convenience.

Particularly, an operation for replacement of the disk-type recording media 1000 can be performed rapidly.

Furthermore, when the disk-type recording media 1000 are accommodated closely to each other into the accommodation portions 14, they can be accommodated closely to each other in order from the address number 1 to the address number n. Where the disk-type recording media 1000 are accommodated closely to each other in this manner, the accommodation situation of the disk-type recording media 1000 and the occupation situation of the accommodation portions 14 can be grasped readily by searching for the disk-type recording medium 1000 accommodated at the accommodation portion 14 of the last address number.

It is to be noted that, while the description above relates to movement of a disk-type recording medium 1000 from an accommodation portion 14 of a source of movement to another accommodation portion 14 of a destination of movement which neighbors with the accommodation portion 14 of the source of movement similarly as in the foregoing description, the locations of the accommodation portions 14 of the source of movement and the destination of movement are not limited specifically to those described above.

Figure 52:
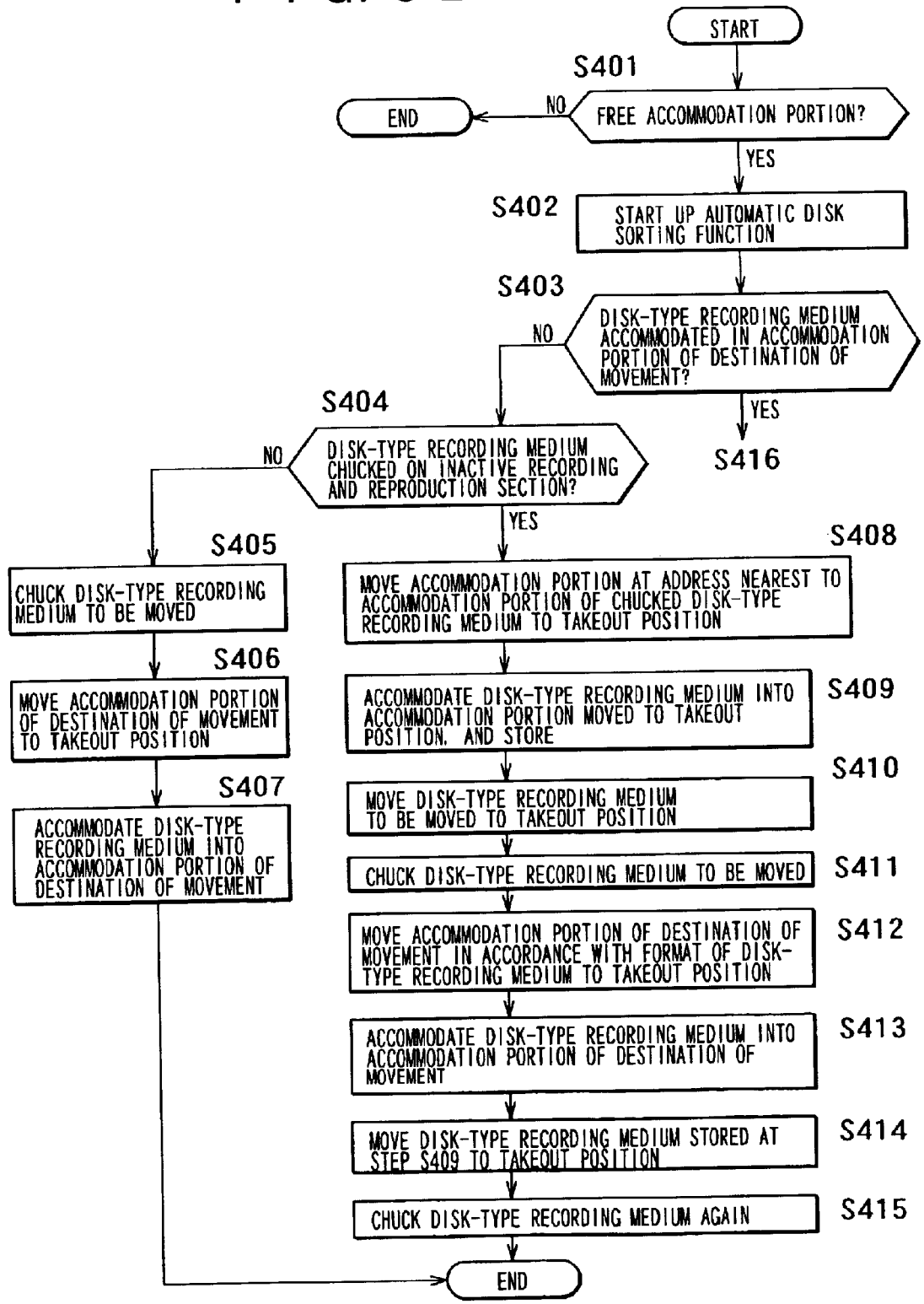
FIGS. 52 and 53 are flow charts illustrating a procedure of sorting operation of the disk charger when disk-type recording media are re-arranged for different formats.
Figure 53:
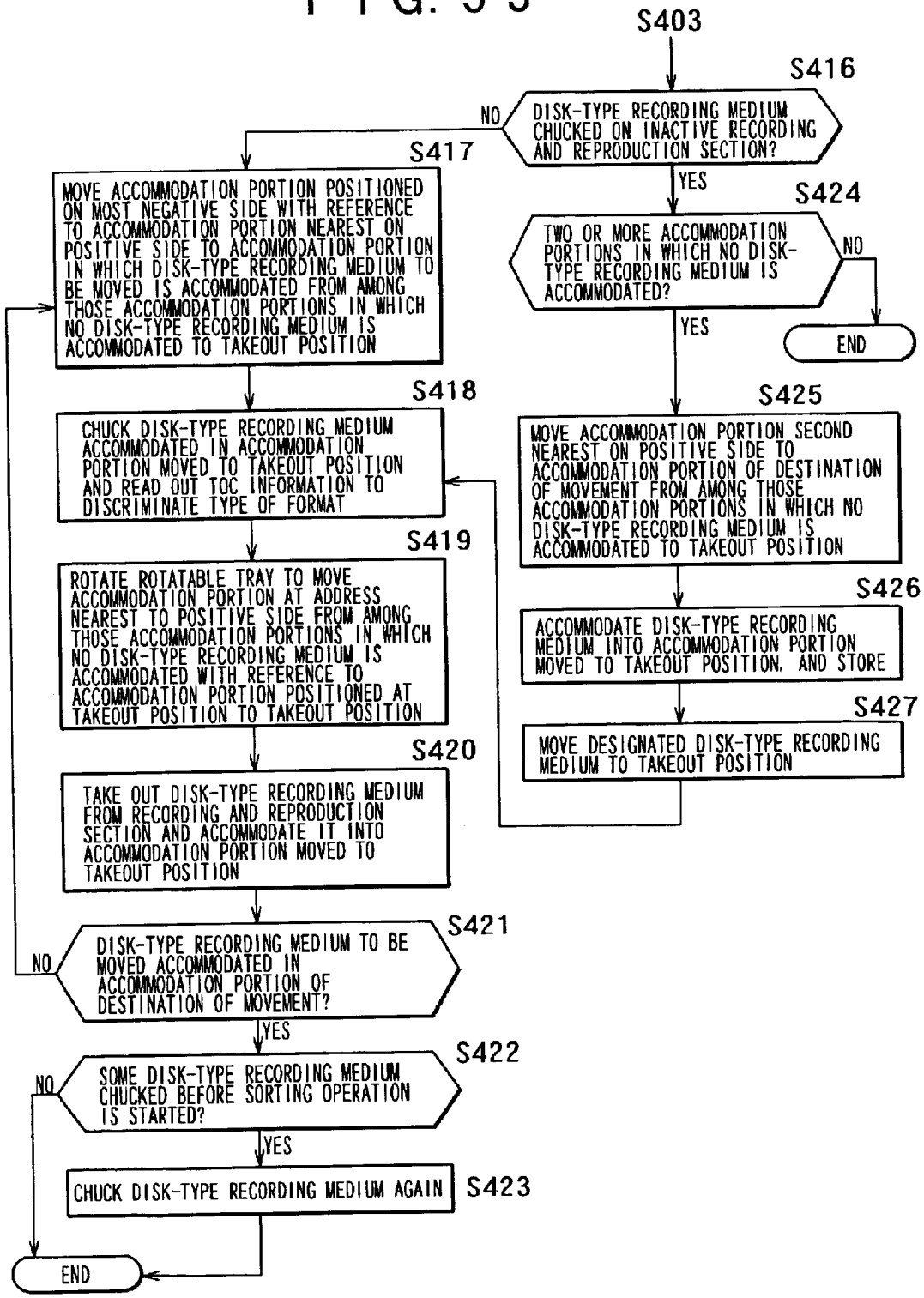

Now, another different sequence of operation of the sorting function of the disk changer 1 is described with reference to FIGS. 52 and 53. In the operation of FIGS. 52 and 53, disk-type recording media 1000 are replaced and re-arranged for different formats thereof. Also in this case, operation is executed when a predetermined automatic sorting mode is selected by an operation of the mode selection key 4.

It is to be noted that, since the flow charts of FIGS. 52 and 53 include steps at which similar operations to those executed at the steps of the flow charts of FIGS. 50 and 51 following the step S301 are executed, where operations similar to those at the steps in FIGS. 50 and 51 are executed, only this is mentioned and detailed description of the operations is omitted herein to avoid redundancy.

At steps S401 to S407, similar operations to those executed at steps S301 to S307 of FIG. 50 are executed. After the operation at step S407 is executed, the operation of the sorting function of the disk changer 1 is ended.

At steps S408 to S411, similar operations to those executed at steps S308 to S311 of FIG. 50 are executed.

At step S412, the rotatable tray 7 is rotated until the accommodation portion 14 of the destination of movement corresponding to the predetermined sort mode selected by the user, that is, the accommodation portion 14 to which a disk-type recording medium 1000 having a predetermined format is to be moved, is moved to the disk takeout position.

At steps S413 to S415, similar operations to those executed at steps S313 to S315 of FIG. 50 are executed. After the operation at step S415 is executed, the operation of the sorting function of the disk changer 1 is ended.

At steps S416 and S417, similar operations to those executed at steps S316 and S317 of FIG. 51 are executed.

At step S418, the disk takeout mechanism 400 is rendered operative to transport the disk-type recording medium 1000 having moved to the disk takeout position at step S417 to the inactive recording and reproduction section 300 which is not in a chucking state, and the disk-type recording medium 1000 is chucked by the inactive recording and reproduction section 300. Then, TOC information recorded on the disk-type recording medium 1000 is read out and the type of the format of the disk-type recording medium 1000 is discriminated.

At step S419, the rotatable tray 7 is rotated until, from among those accommodation portions 14 in which no disk-type recording medium 1000 is accommodated, the accommodation portion 14 having an address nearest on the positive side with respect to the accommodation portion 14 in which the disk-type recording medium 1000 chucked at step S418 was accommodated comes to the disk takeout position corresponding to the inactive recording and reproduction section 300.

At steps S420 to S423, similar operations to those executed at steps S320 to S323 of FIG. 51 are executed. After the operation at step S423 is executed, the operation of the sorting function of the disk changer 1 is ended.

At steps S424 to S427, similar operations to those executed at steps S324 to S327 of FIG. 51 are executed. Thereafter, the processing advances to step S418, and the processes at steps S418 to S423 described above are performed and the operation is ended after the step S423.

In the disk changer 1 described above, since the disk-type recording media 1000 can be re-arranged by replacing them in dependence on the format, the disk-type recording media 1000 can be managed readily and the disk changer 1 can be used in improved convenience through such simplified management.

In the disk changer 1 described above, since the disk-type recording media 1000 can be re-arranged by replacing them in accordance with a predetermined sorting rule selected by the user, the disk-type recording media 1000 can be managed in accordance with a will of the user readily and the disk changer 1 can be used in improved convenience through such simplified management.

It is to be noted that, while the description above relates to movement of a disk-type recording medium 1000 from an accommodation portion 14 of a source of movement to another accommodation portion 14 of a destination of movement which neighbors with the accommodation portion 14 of the source of movement, the locations of the accommodation portions 14 of the source of movement and the destination of movement are not limited specifically.

Further, in the disk changer 1, since it includes two disk takeout mechanisms 400, takeout of a disk-type recording medium 1000 from an accommodation portion 14 and accommodation of another disk-type recording medium 1000 taken out into an accommodation portion 14 can be performed concurrently by the two disk takeout mechanisms 400. Consequently, augmentation of the efficiency in sorting operation and reduction of the operating time can be achieved.

Furthermore, in the disk changer 1, since it includes two recording and reproduction sections 300, reading of TOC information of a disk-type recording medium 1000 can be performed concurrently by the two recording and reproduction sections 300. Consequently, further augmentation of the efficiency in sorting operation and further reduction of the operating time can be anticipated.

Besides, in the disk changer 1, since the fact that a disk-type recording medium 1000 re-arranged is accommodated into an accommodation portion 14 of the destination of movement is registered, the disk-type recording media 1000 after such re-arrangement can be managed without any trouble.

In addition, in the disk changer 1, since the fact that a disk-type recording medium 1000 re-arranged is accommodated into an accommodation portion 14 of the destination of movement is displayed on the display section 5, completion of the sorting operation for each of the disk-type recording media 1000 can be confirmed.

In the disk changer 1, while recording or reproduction of an information signal onto or from a disk-type recording medium 1000 by one of the recording and reproduction sections 300 is proceeding, the rotatable tray 7 can be rotated to perform exchange of a disk-type recording medium 1000 from an accommodation portion 14, accommodation of a new disk-type recording medium 1000 into the accommodation portion 14, sorting operation and so forth can be performed. Accordingly, for example, while recording or reproduction of an information signal onto or from a disk-type recording medium 1000 by one of the recording and reproduction sections 300 is proceeding, if the rotatable tray 7 is rotated and a new disk-type recording medium 1000 is accommodated into an accommodation portion 14, then there is the possibility that the accommodation portion 14 in which the disk-type recording medium 1000 is accommodated may be the accommodation portion 14 in which the disk-type recording medium 1000 for which recording or reproduction is proceeding was accommodated formerly.

In such an instance, such a trouble occurs that the accommodation portion 14 into which the disk-type recording medium 1000 whose recording or reproduction comes to an end should originally be accommodated is occupied and the disk-type recording medium 1000 cannot be accommodated into the accommodation portion 14.

In order to eliminate such a disadvantage as just described, the disk changer 1 has an overlap error preventing function of accommodating the disk-type recording medium 1000, which has been accommodated newly into the accommodation portion 14, into another accommodation portion 14 or moving the accommodation portion 14 to the external takeout position, at which the disk-type recording medium 1000 having been accommodated newly into the accommodation portion 14 can be externally taken out from the disk insertion opening 2a, to prevent an overlap with regard to the accommodation portion 14.

In the following, the overlap error preventing function is described with reference to FIGS. 54 to 56.

Figure 54:
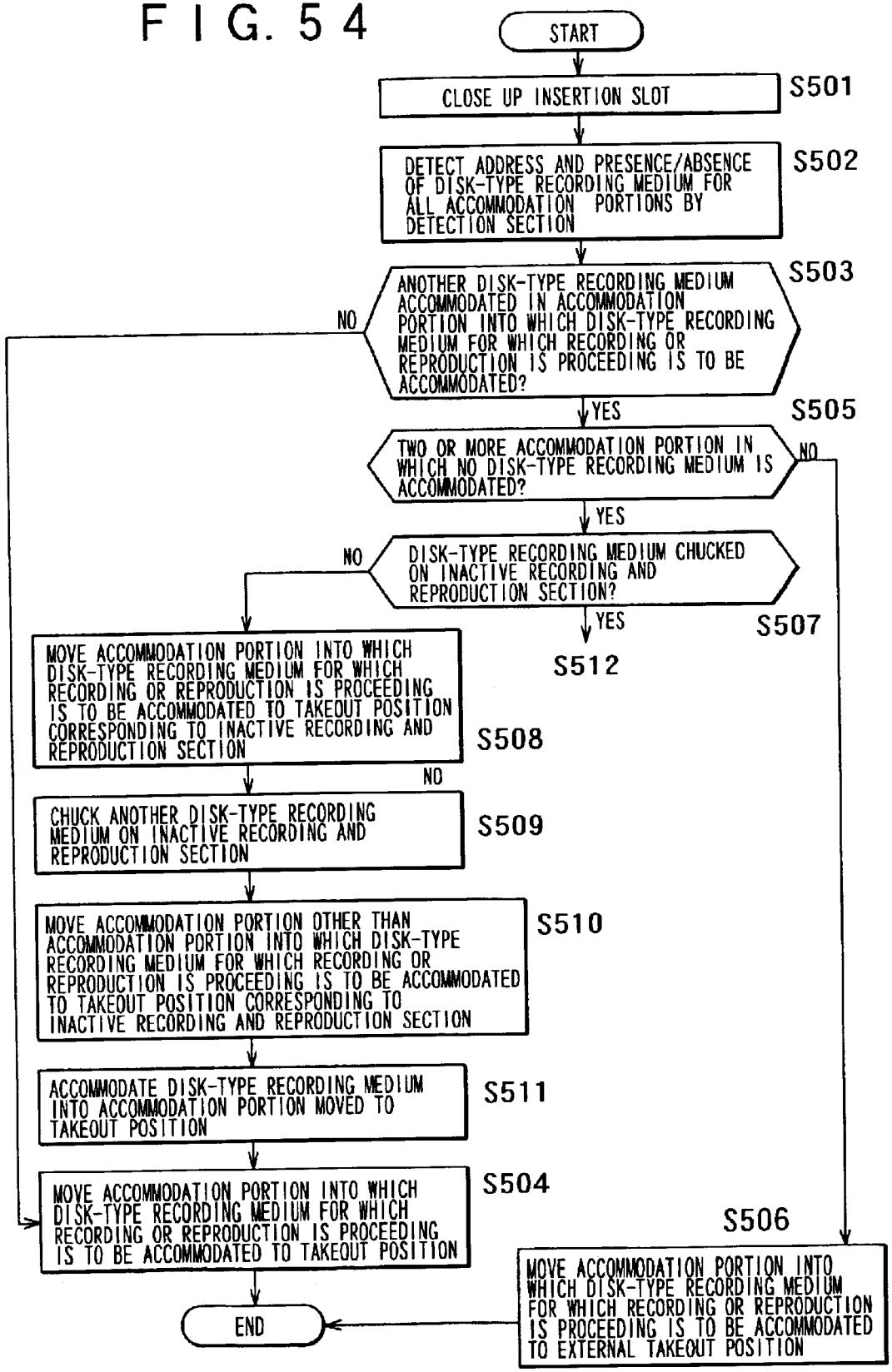
FIGS. 54 and 55 are flow charts illustrating a procedure of operation of the disk changer when it prevents an overlapping error with regard to an accommodation portion.
Figure 55:
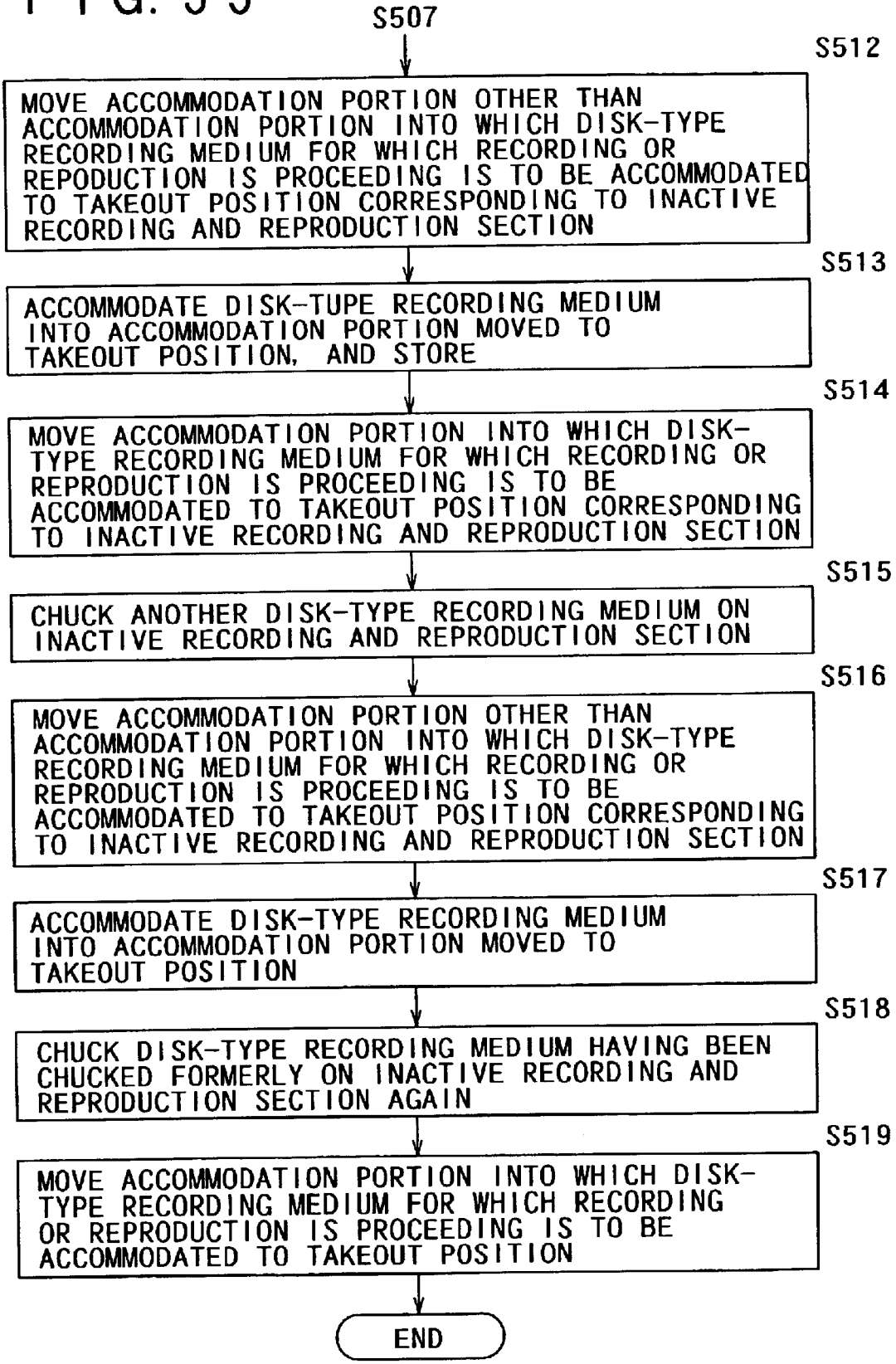

First, operation of the overlap error preventing operation illustrated in FIGS. 54 and 55 is described.

At step S501, the disk insertion opening 2a is closed up with the door 3.

At step S502, the rotatable tray 7 is rotated, and during the rotation, the addresses of all of the accommodation portion 14 are successively detected by the address detection section 24 and it is detected by the disk detection section 25 whether or not a disk-type recording medium 1000 is present in all of the accommodation portions 14.

At step S503, it is discriminated whether or not a different disk-type recording medium 1000 is accommodated in an accommodation portion 14 into which a disk-type recording medium 1000 for which recording or reproduction by the recording and reproduction section 300 is proceeding is to be accommodated. If a result of the detection indicates that a different disk-type recording medium 1000 is not accommodated in the accommodation portion 14, then the processing advances to step S504. However, if the result of the detection indicates that a different disk-type recording medium 1000 is accommodated in the accommodation portion 14, then the processing advances to step S505.

At step S504, the rotatable tray 7 is rotated until the accommodation portion 14 into which the disk-type recording medium 1000 for which recording or reproduction by the recording and reproduction section 300 is proceeding is to be accommodated comes to the disk takeout position corresponding to the recording and reproduction section 300.

At step S505 to which the processing advances from step S503, it is detected whether or not there are two or more accommodation portions 14 in which no disk-type recording medium 1000 is accommodated. If a result of the detection indicates that two or more accommodation portion 14 in which no disk-type recording medium 1000 is accommodated are not detected, then the processing advances to step S506. However, if the result of the detection indicates that two or more accommodation portion 14 in which no disk-type recording medium 1000 is accommodated are detected, then the processing advances to step S507.

At step S506, the rotatable tray 7 is rotated until the disk-type recording medium 1000 into which the disk-type recording medium 1000 for which recording or reproduction is proceeding is to be accommodated but in which a different disk-type recording medium 1000 is accommodated is moved to the external takeout position at which the disk-type recording medium 1000 can be externally taken out from the disk insertion opening 2a. The different disk-type recording medium 1000 is externally taken out from the disk insertion opening 2a, and then the operation is ended.

At step S507 to which the processing advances from step S505, it is detected whether or not a disk-type recording medium 1000 is chucked by the inactive recording and reproduction section 300. If a result of the detection indicates that no disk-type recording medium 1000 is chucked by the inactive recording and reproduction section 300, then the processing advances to step S508. On the other hand, if the result of the detection indicates that a disk-type recording medium 1000 is chucked by the inactive recording and reproduction section 300, then the processing advances to step S512.

At step S508, the rotatable tray 7 is rotated until the accommodation portion 14 into which the disk-type recording medium 1000 for which recording or reproduction is proceeding is to be accommodated comes to the disk takeout position corresponding to the inactive recording and reproduction section 300.

At step S509, the disk takeout mechanism 400 is rendered operative to transport the disk-type recording medium 1000 accommodated in the accommodation portion 14 moved to the disk takeout position at step S508 to the inactive recording and reproduction section 300, by which the disk-type recording medium 1000 is chucked.

At step S510, the rotatable tray 7 is rotated until, from among those accommodation portions 14 in which no disk-type recording medium 1000 is accommodated, an accommodation portion 14 other than the accommodation portion 14 into which the disk-type recording medium 1000 for which recording or reproduction is proceeding is to be accommodated is moved to the disk takeout position corresponding to the inactive recording and reproduction section 300.

At step S511, the disk-type recording medium 1000 is taken out from the inactive recording and reproduction section 300 by the disk takeout mechanism 400 and accommodated into the accommodation portion 14 positioned already at the disk takeout position. After the disk-type recording medium 1000 is accommodated into the accommodation portion 14, the fact that the disk-type recording medium 1000 is accommodated in the accommodation portion 14 is registered and displayed on the display section 5 provided on the outer housing 2. Thereafter, the processing advances to step S504 and then the operation is ended.

At step S512 to which the processing advances from step S507, the rotatable tray 7 is rotated until one of those accommodation portions 14 in which no disk-type recording medium 1000 is accommodated comes to the disk takeout position corresponding to the inactive recording and reproduction section 300.

At step S513, the disk-type recording medium 1000 is taken out from the inactive recording and reproduction section 300 by the disk takeout mechanism 400 and stored into the accommodation portion 14 positioned already at the disk takeout position. At this time, the fact that the disk-type recording medium 1000 is accommodated in the accommodation portion 14 is stored.

At step S514, the rotatable tray 7 is rotated until the accommodation portion 14 in which the different disk-type recording medium 1000 detected at step S503 is accommodated comes to the disk takeout position corresponding to the inactive recording and reproduction section 300.

At step S515, the disk takeout mechanism 400 is rendered operative to transport the different disk-type recording medium 1000 accommodated in the accommodation portion 14 moved to the disk takeout position at step S514 to the inactive recording and reproduction section 300, by which the disk-type recording medium 1000 is chucked.

At step S516, the rotatable tray 7 is rotated until one of those accommodation portions 14 in which no disk-type recording medium 1000 is accommodated is moved to the disk takeout position corresponding to the inactive recording and reproduction section 300.

At step S517, the disk-type recording medium 1000 is taken out from the recording and reproduction section 300 by the disk takeout mechanism 400 and accommodated into the accommodation portion 14 positioned already at the disk takeout position. After the disk-type recording medium 1000 is accommodated into the accommodation portion 14, the fact that the disk-type recording medium 1000 is accommodated in the accommodation portion 14 is registered and displayed on the display section 5 provided on the outer housing 2.

At step S518, the rotatable tray 7 is rotated until the accommodation portion 14 in which the disk-type recording medium 1000 stored at step S513 which was chucked first by the inactive recording and reproduction section 300 is moved to the disk takeout position corresponding to the inactive recording and reproduction section 300, and the disk takeout mechanism 400 is rendered operative to take out the disk-type recording medium 1000 from the accommodation portion 14, whereafter the disk-type recording medium 1000 is chucked by the inactive recording and reproduction section 300 again.

At step S519, the rotatable tray 7 is rotated until the accommodation portion 14 into which the disk-type recording medium 1000 whose recording or reproduction is proceeding on the recording and reproduction section 300 is to be accommodated is moved to the disk takeout position corresponding to the inactive recording and reproduction section 300, and then the operation is ended.

Now, operation of the overlap error preventing operation illustrated in FIG. 56 is described.

At step S601, the disk insertion opening 2*a* is closed up with the door 3.

At step S602, the rotatable tray 7 is rotated, and thereupon, the addresses of all of the accommodation portions 14 are successively detected by the address detection section 24 and it is detected by the disk detection section 25 whether or not a disk-type recording medium 1000 is present in all of the accommodation portions 14.

At step S603, it is detected whether or not a different disk-type recording medium 1000 is accommodated in an accommodation portion 14 into which a disk-type recording medium 1000 whose recording or reproduction is proceeding on the recording and reproduction section 300 is to be accommodated. If a result of the detection indicates that a different disk-type recording medium 1000 is not accommodated in the accommodation portion 14, then the processing advances to step S604. On the other hand, if the result of the detection indicates that a different disk-type recording medium 1000 is accommodated in the accommodation portion 14, then the processing advances to step S605.

At step S604, the rotatable tray 7 is rotated until the disk-type recording medium 1000 whose recording or reproduction is proceeding on the recording and reproduction section 300 is to be accommodated is moved to the disk takeout position corresponding to the recording and reproduction section 300, and then the operation is ended.

At step S605 to which the processing advances from step S603, the rotatable tray 7 is rotated until the accommodation portion 14 of the different disk-type recording medium 1000 accommodated in the accommodation portion 14 into which the disk-type recording medium 1000 whose recording or reproduction is proceeding on the recording and reproduction section 300 is to be accommodated is moved to the external takeout position at which the disk-type recording medium 1000 can be externally taken out from the disk insertion opening 2a. Then, the different disk-type recording medium 1000 is externally taken out from the disk insertion opening 2a, and then the processing is ended.

As described above, in the disk changer 1, even when an accommodation portion 14 into which a disk-type recording medium 1000 whose recording or reproduction comes to an end is to be accommodated originally is occupied, by accommodating the disk-type recording medium 1000 accommodated in the accommodation portion 14 into another accommodation portion 14 or by moving the accommodation portion 14 to the external takeout position and externally taking out the disk-type recording medium 1000 from the disk insertion opening 2a, an overlap with regard to the accommodation portion 14 can be prevented and appropriate operation can be anticipated.

Further, since the disk changer 1 includes two recording and reproduction sections 300, even when recording or reproduction of an information signal is performed by one of the recording and reproduction sections 300, TOC information of a new disk-type recording medium 1000 can be stored by the other recording and reproduction section 300.

Furthermore, in the disk changer 1, since the fact that a new disk-type recording medium 1000 is accommodated into an accommodation portion 14 different from the accommodation portion 14 in which the disk-type recording medium 1000 was accommodated initially is registered, there is no trouble with management of the disk-type recording medium 1000 after the re-arrangement.

In addition, in the disk changer 1, since the fact that a new disk-type recording medium 1000 is accommodated into an accommodation portion 14 different from the accommodation portion 14 in which the disk-type recording medium 1000 was accommodated initially is displayed on the display section 5, completion of the operation can be confirmed.

It is to be noted that, while two countermeasures for preventing an overlap error with regard to an accommodation portion 14 are described in connection with FIGS. 54 and 55 and FIG. 56, also the following countermeasures are available for preventing an overlap error with regard to an accommodation portion 14.

As a first countermeasure, a lifting mechanism is provided which lifts, when it is tried to accommodate a new disk-type recording medium 1000 into an accommodation portion 14 into which a disk-type recording medium 1000 whose recording or reproduction is proceeding is to be accommodated after the accommodation portion 14 is moved to a position at which a new disk-type recording medium 1000 can be inserted from the disk insertion opening 2a, the new disk-type recording medium 1000 so that it may not be accommodated into the accommodation portion 14.

As a second countermeasure, for example, the display section 5 is used to display that it is inhibited to accommodate a new disk-type recording medium 1000 into an accommodation portion 14 into which a disk-type recording medium 1000 whose recording or reproduction is proceeding is to be accommodated.

As a third countermeasure, the rotatable tray 7 is controlled so that an accommodation portion 14 into which a disk-type recording medium 1000 whose recording or reproduction is proceeding is to be accommodated cannot be moved to a position at which a new disk-type recording medium 1000 can be inserted from the disk insertion opening 2a.

It is to be noted that, in the disk changer 1 described above, since it includes two mechanism units 32, it is possible to render the disk takeout mechanisms 400 of the mechanism units 32 operative simultaneously to transport two disk-type recording media 1000 between the two accommodation portions 14 and the recording and reproduction sections 300 simultaneously.

Where the disk takeout mechanisms 400 are rendered operatively simultaneously, reduction of the operation time and augmentation of the efficiency of the disk changer 1 can be anticipated.

It is to be noted that, while the disk changer 1 described above includes two mechanism units 32, it may otherwise include three or more mechanism units 32. In the latter case, the detection section 23 should be disposed at a substantially middle location between those two of the mechanism units 32 which are spaced by the greatest distance from each other in the circumferential direction.

Further, while the disk changer 1 described above includes two recording and reproduction sections 300 and two disk takeout mechanisms 400, if it is intended to execute the sorting function or to execute the overlap error preventing function, then the disk changer 1 may be modified such that it includes two disk takeout mechanisms 400 and only one recording and reproduction section 300 which operate such that a disk-type recording medium 1000 is taken out and held by that one of the disk takeout mechanisms 400 for which the recording and reproduction section 300 is not provided and the disk-type recording medium 1000 held by the disk takeout mechanism 400 is accommodated back into the accommodation portion 14 of the rotatable tray 7. In this instance, TOC information cannot be read out from the disk-type recording medium 1000 taken out by the disk takeout mechanism 400 for which the recording and reproduction section 300 is not provided.

While preferred embodiments of the present invention have been described using specific terms, such description is for illustrative purposes only, and it is to be understood that changes and variations may be made without departing from the spirit or scope of the following claims.

What is claimed is:

1. A disk changer, comprising:
   a rotatable tray configured to rotate on a chassis and having a plurality of accommodation portions arranged in a ring-like configuration to accommodate a plurality of disk-type recording media therein such that major faces of said disk-type recording media oppose each other;
   a tray rotating mechanism configured to rotate said rotatable tray;
   a first recording and/or reproduction section configured to record and/or reproduce an information signal onto and/or from one of the disk-type recording media;
   a second recording and/or reproduction section configured to record and/or reproduce an information signal onto and/or from one of the disk-type recording media;
   a first disk takeout mechanism configured to take out one of the disk-type recording media accommodated in said accommodation portions of said rotatable tray and transport the disk-type recording medium to said first recording and/or reproduction section and to take out the disk-type recording medium from said first recording and/or reproduction section and transport the disk-type recording medium to one of said accommodation portions;
   a second disk takeout mechanism configured to take out one of the disk-type recording media accommodated in said accommodation portions of said rotatable tray and transport the disk-type recording medium to said second recording and/or reproduction section and to take out the disk-type recording medium from said second recording and/or reproduction section and transport the disk-type recording medium to one of said accommodation portions;

an address detection section configured to detect an address of the accommodating portions of the rotatable tray; and a disk detection section configured to detect whether one of the disk-type recording media is disposed in the accommodating portion corresponding to the address, wherein the first and second recording and/or reproduction sections are disposed apart from each other in a circumferential direction of the rotatable tray, and the address detection section and the disk detection section are disposed opposite each another at a position corresponding to a position of one of the accommodating portions positioned between the first and second recording and/or reproducing sections along the circumferential direction of the rotatable tray.

2. A disk changer according to claim 1, wherein any of the disk-type recording media transported to the first and second recording and/or reproduction sections by the first and second disk takeout mechanisms are disposed at a position offset from a locus of movement of the disk-type recording media accommodated in the accommodation portions when the rotatable tray rotates.

3. A disk changer, comprising:

a rotatable tray configured to rotate on a chassis and having a plurality of accommodation portions arranged in a ring-like configuration to accommodate a plurality of disk-type recording media therein such that major faces of said disk-type recording media oppose each other;

detection section configured to detect whether or not one of the disk-type recording media is present in each of said accommodation portions of said rotatable tray and detect an address of each of said accommodation portions;

a tray rotating mechanism configured to rotate said rotatable tray;

a plurality of recording and/or reproduction sections each configured to record and/or reproduce an information signal onto and/or from one of the disk-type recording media; and a plurality of disk takeout mechanisms each each configured to take out one of the disk-type recording media accommodated in said accommodation portions of said rotatable tray and transport the disk-type recording medium to one of said recording and/or reproduction sections and to take out the disk-type recording medium from the recording and/or reproduction section and transport the disk-type recording medium to one of said accommodation portions;

said detection section being disposed at a substantially middle position between two of said recording and/or reproduction sections which are disposed in a spaced relationship by a greatest distance from each other.

4. A disk changer according to claim 3, further comprising control means for controlling said tray rotating mechanism to rotate said rotatable tray until one of said accommodation portions in which one of the disk-type recording media designated by a user is accommodated comes to a position at which the accommodation portion opposes said detection section, controlling, when said detection section detects that the disk-type recording medium is accommodated in the accommodation portion, said tray rotating mechanism to rotate said rotatable tray until the accommodation portion comes to a position at which the accommodation portion opposes one of said recording and/or reproduction sections, and controlling one of said disk takeout mechanisms to transport the disk-type recording medium accommodated in the accommodation portion to one of said recording and/or reproduction sections and controlling the recording and/or reproduction section to start recording and/or reproduction of the disk-type recording medium.

5. A disk changer according to claim 3, wherein said recording and/or reproduction sections include first and second recording and/or reproduction sections while said disk takeout mechanisms include first and second disk takeout mechanisms, said disk changer further comprising control means for controlling, while said first recording and/or reproduction section records and/or produces a first one of the disk-type recording media, said tray rotating mechanism to rotate said rotatable tray until one of said accommodation portions in which a second one of the disk-type recording media designated by a user is accommodated comes to a position at which the accommodation portion opposes said second disk takeout mechanism and controlling said second disk takeout mechanism to transport the second disk-type recording medium to said second recording and/or reproduction section and then controlling said second recording and/or reproduction section to start recording and/or reproduction of the second disk-type recording medium immediately after the recording and/or the reproduction of the first disk-type recording medium by said first recording and/or reproduction section come to an end.

6. A disk changer according to claim 5, wherein said control means controls said first recording and/or reproduction section to reproduce an information signal recorded on the first disk-type recording medium and controls said second recording and/or reproduction section to record the information signal reproduced by said first recording and/or reproduction section onto the second disk-type recording medium.

7. A disk changer according to claim 3, further comprising a lock lever provided in said disk takeout mechanisms and configured to lock said rotatable tray from rotation while any of the disk-type recording media is transported from one of said accommodation portions to any of said recording and/or reproduction sections by any of said disk takeout mechanisms and unlock said rotatable tray after the disk-type recording medium is transported to the recording and/or reproduction section.

8. A disk changer, comprising:

a tray comprising a plurality of accommodation portions configured to support a plurality of disks;

a detection section configured to detect an address of one of the accommodation portions and to determine whether one of the plurality of disks is disposed in the one of the accommodation portions;

a plurality of reading or writing sections configured to read from or write to one of the plurality of the disks; and a plurality of takeout mechanisms configured to provide one of the plurality of the disks to the plurality of reading or writing sections;

wherein the detection section is disposed between two reading or writing sections of the plurality of reading or writing sections.

9. The disk changer according to claim 8, wherein the detection section is disposed a same distance from the two reading or writing sections.

10. The disk changer according to claim 8, wherein the detection section is disposed equidistant from the two reading or writing sections which are disposed on a circumference of the tray.

11. The disk changer according to claim 5, detection section comprises an address detector configured to detect the address and a presence detector configured to determine whether the one of the plurality of disks is disposed in the one of the accommodating portions.

12. The disk changer according to claim 11, wherein the address detector is disposed opposite the presence detector.

13. A disk changer, comprising:

means for supporting a plurality of disks in a plurality of accommodation portions;

means for detecting an address of one of the accommodation portions and for determining whether one of the plurality of disks is disposed in the one of the accommodation portions;

first and second means for reading from or writing to one of the plurality of the disks; and first and second means for providing one of the plurality of the disks to the first and second means for reading or writing;

wherein the means for detecting is disposed between the first and second means for reading or writing.

* * * * *

UNITED STATES PATENT AND TRADEMARK OFFICE
CERTIFICATE OF CORRECTION

PATENT NO. : 6,940,787 B2
DATED : September 6, 2005
INVENTOR(S) : Yoshihiro Kajiyama et al.

It is certified that error appears in the above-identified patent and that said Letters Patent is hereby corrected as shown below:

Column 55,
Line 11, change "5" to -- 8 --.

Signed and Sealed this

Twenty-eighth Day of March, 2006

JON W. DUDAS
*Director of the United States Patent and Trademark Office*